FIG.12

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

THRU

FIG.59

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13,1967

FIG.61

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG.67

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 68 I UNIT SCAN

FIG. 69

E UNIT SCAN

CONTROL TRIGGERS (SEE CHART IN TEXT)

FIG.70

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG.71

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 73  E UNIT DATA FLOW (2)

I UNIT

FIG. 75  GR & ADR

FIG. 76

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

THRU

FIG. 307

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO 609,238 FILED ON JANUARY 13, 1967

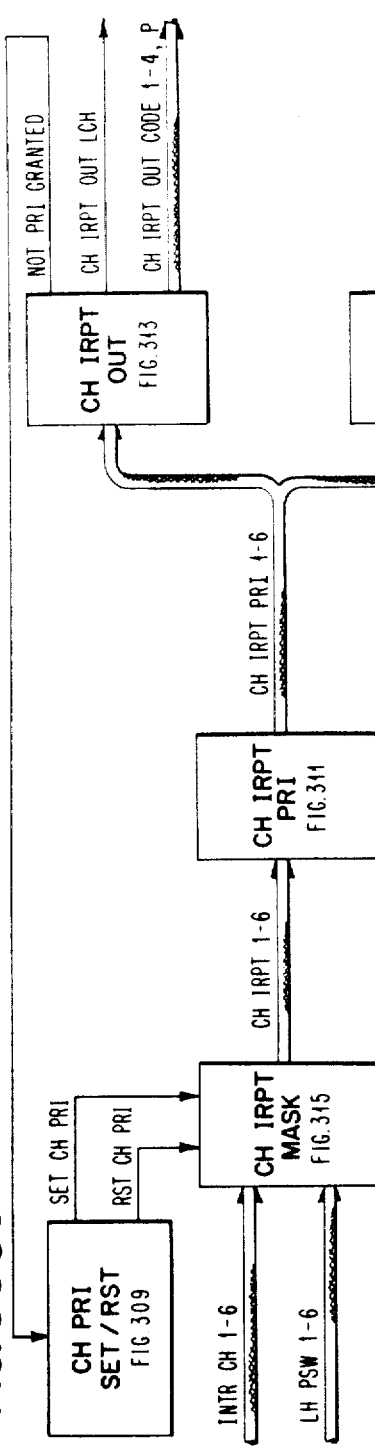
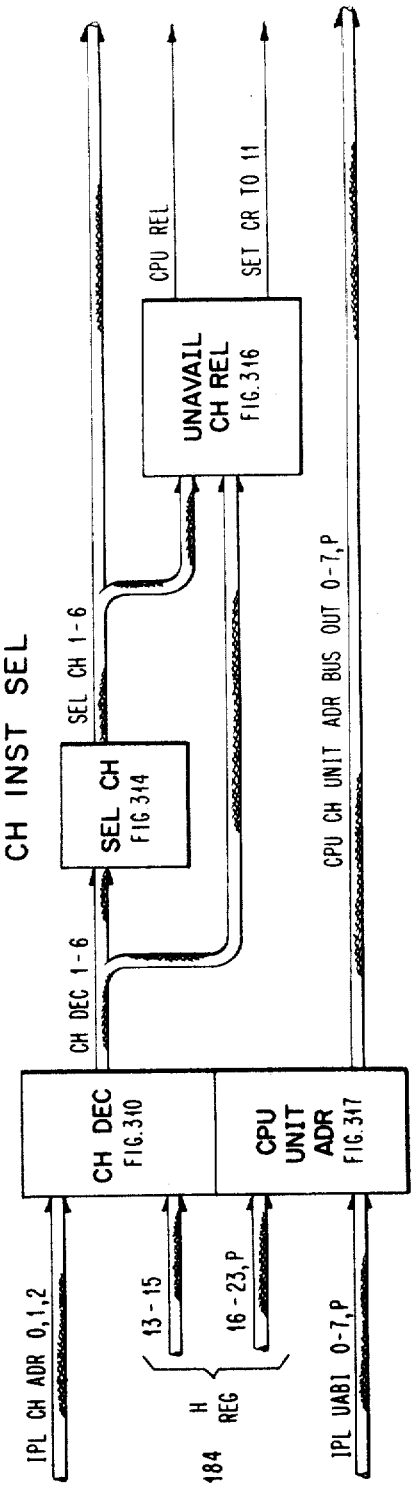

FIG. 309  CH PRI CTRL
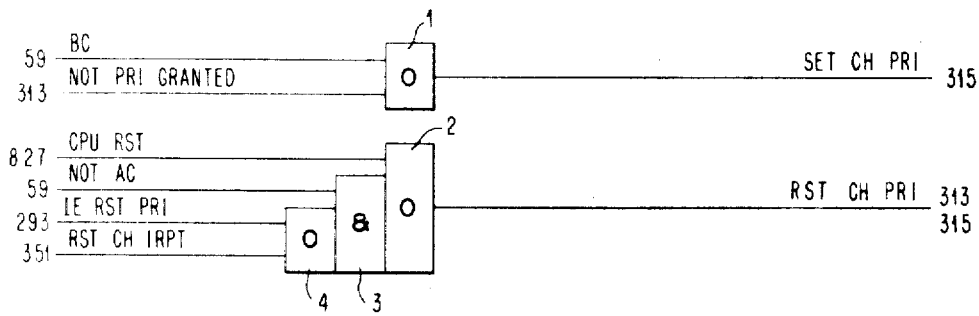
FIG. 310  CH DEC
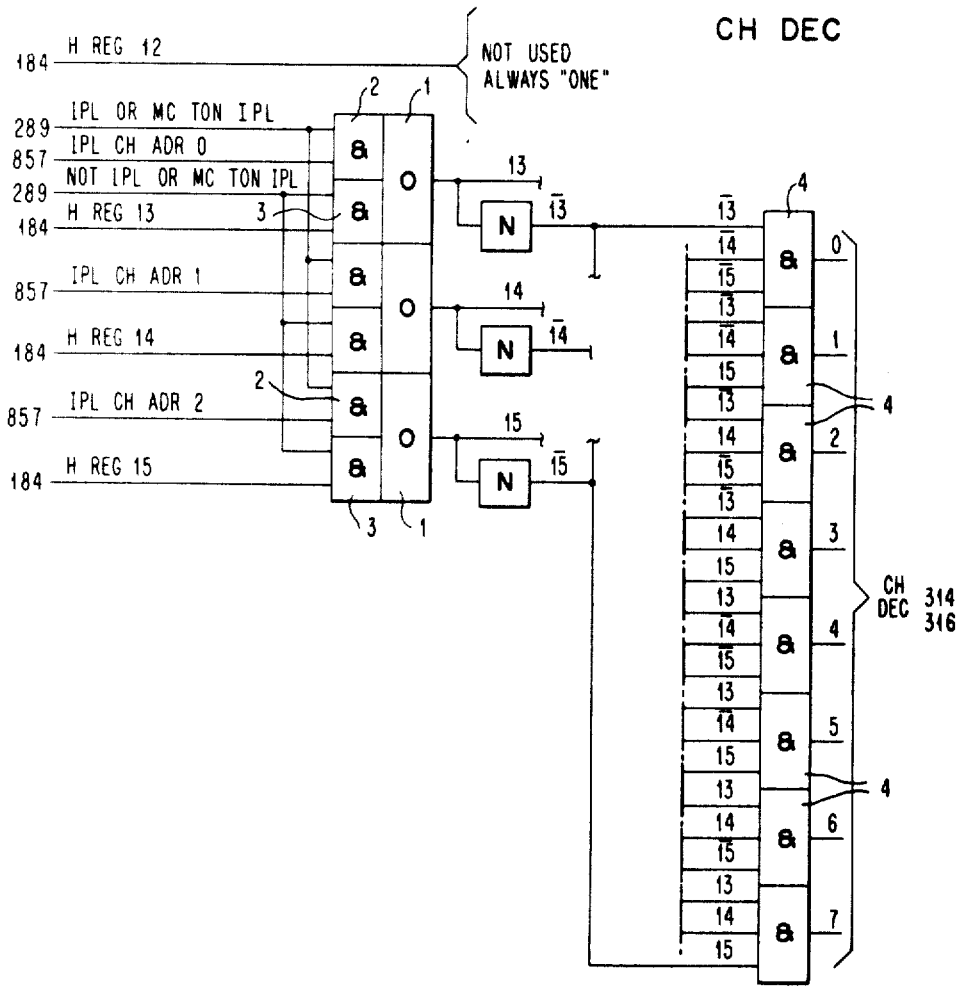

FIG. 311 CH IRPT PRI
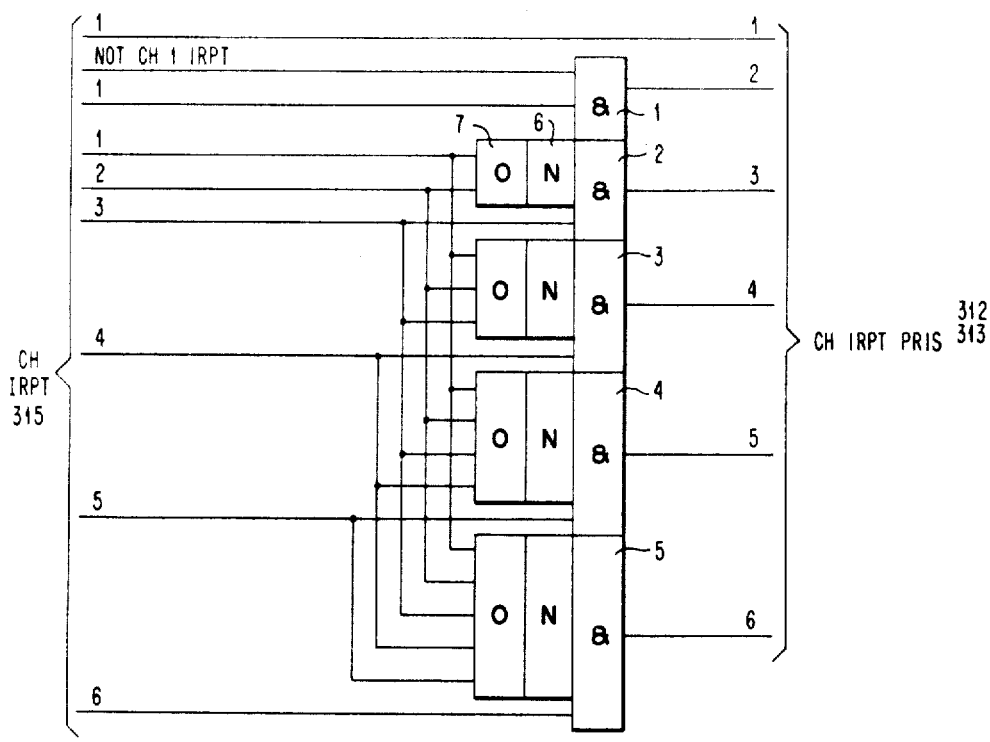
FIG. 312 CH IRPT RSPS
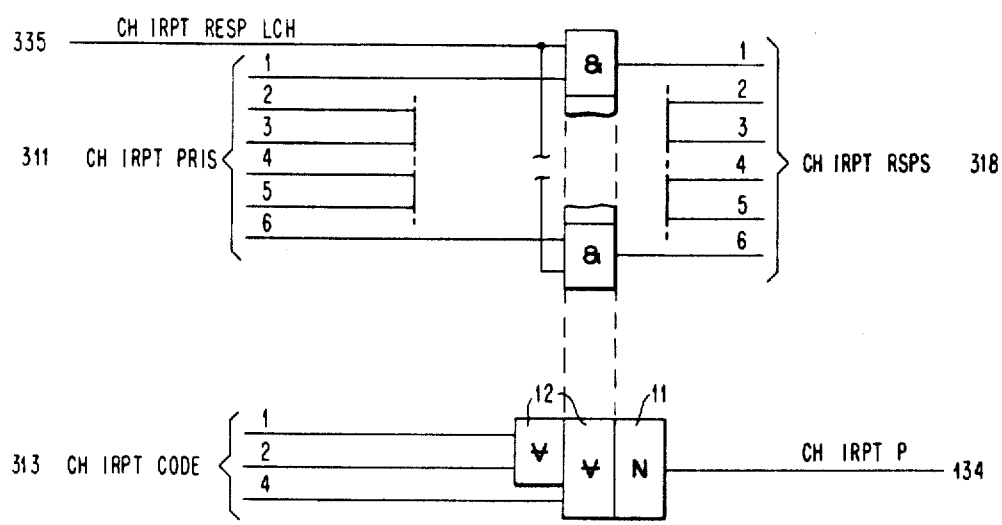

FIG. 314  SEL CH
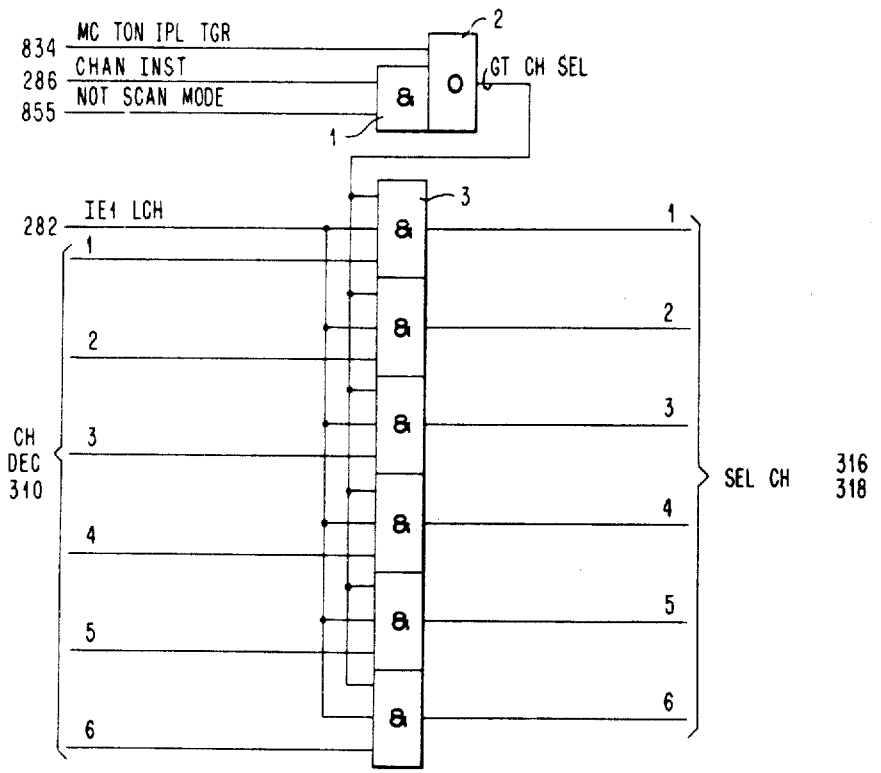
FIG. 315  CH IRPT MASK
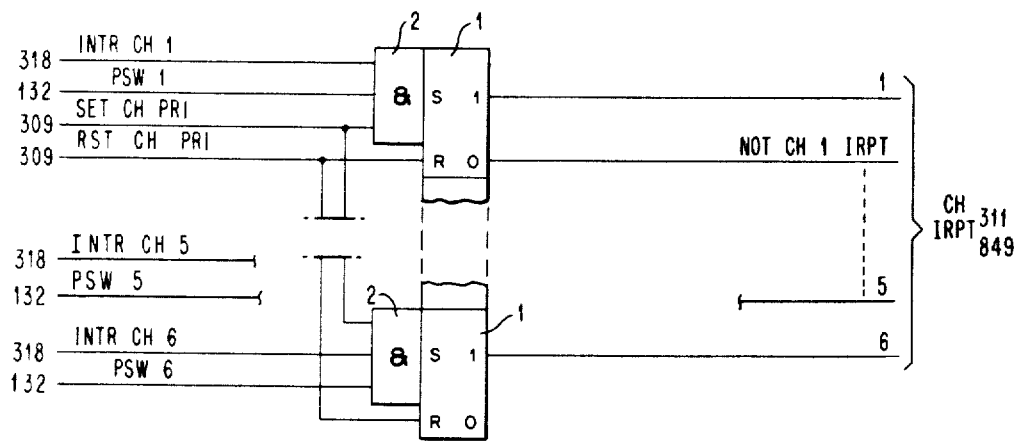

FIG. 319 MODAR
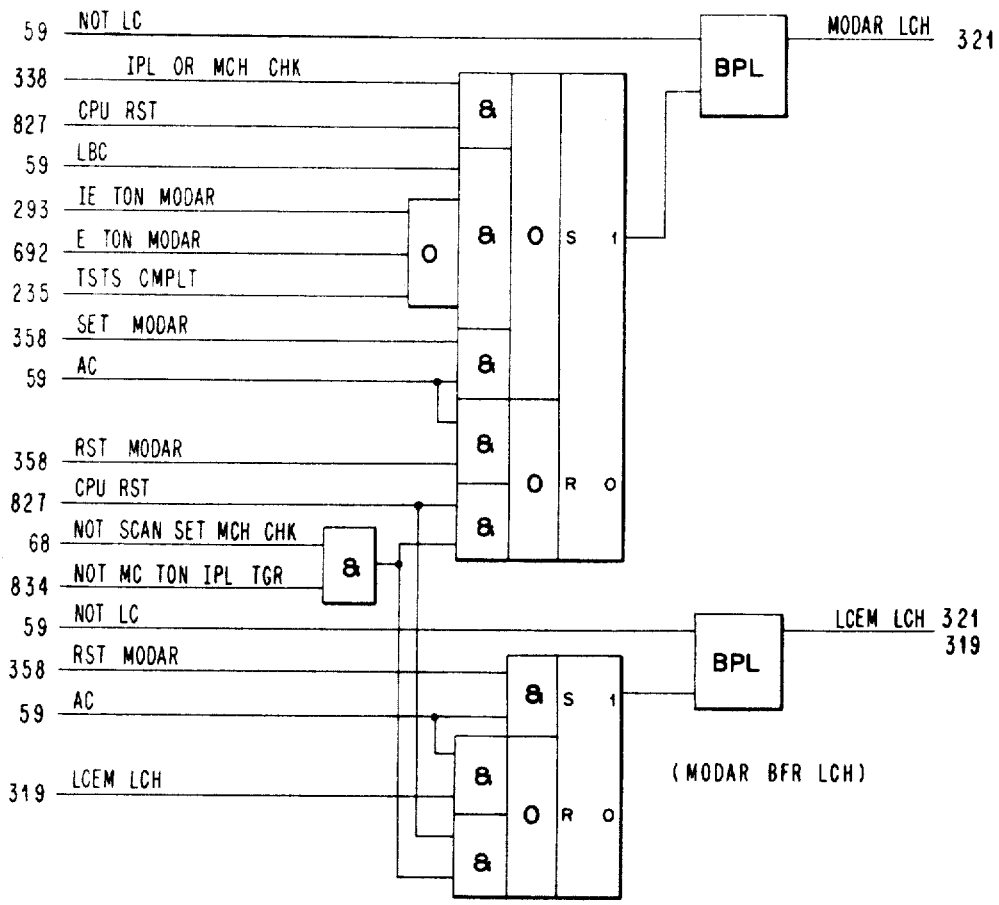
FIG. 320 TIM-CH PRI
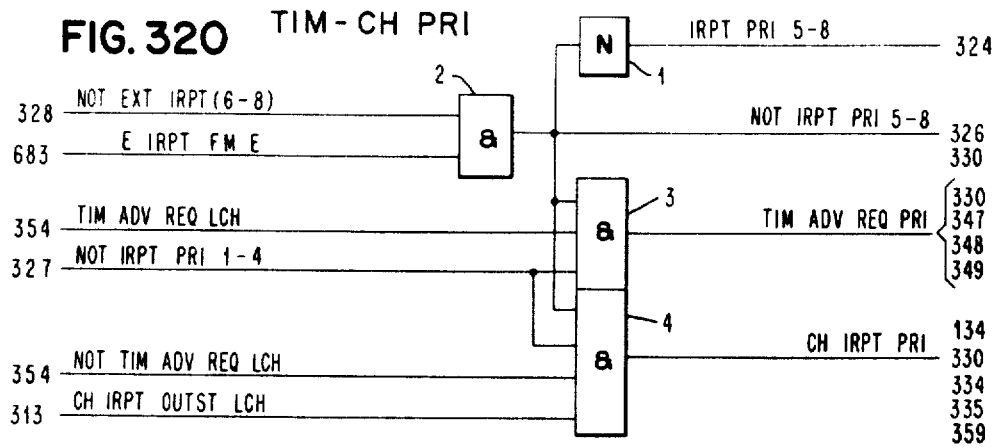

FIG. 321 RETRY
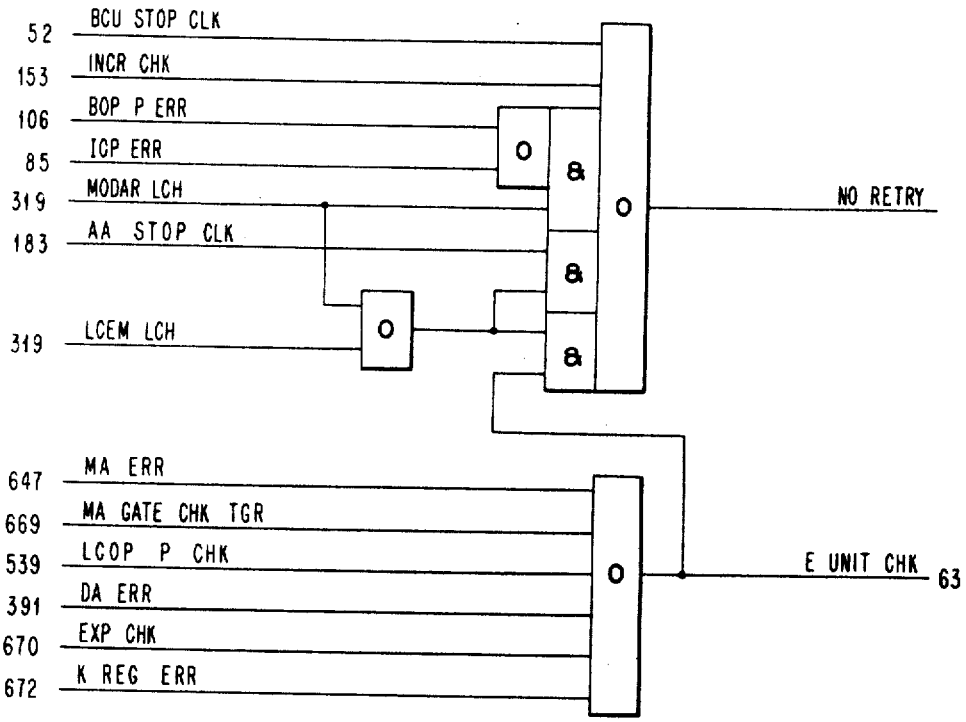
FIG. 322 SAP/STR PRI
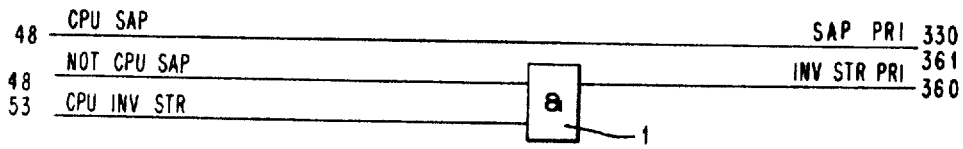
FIG. 323 SUP CALL PRI
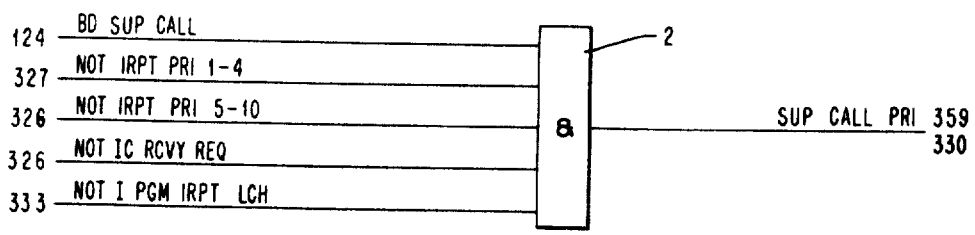

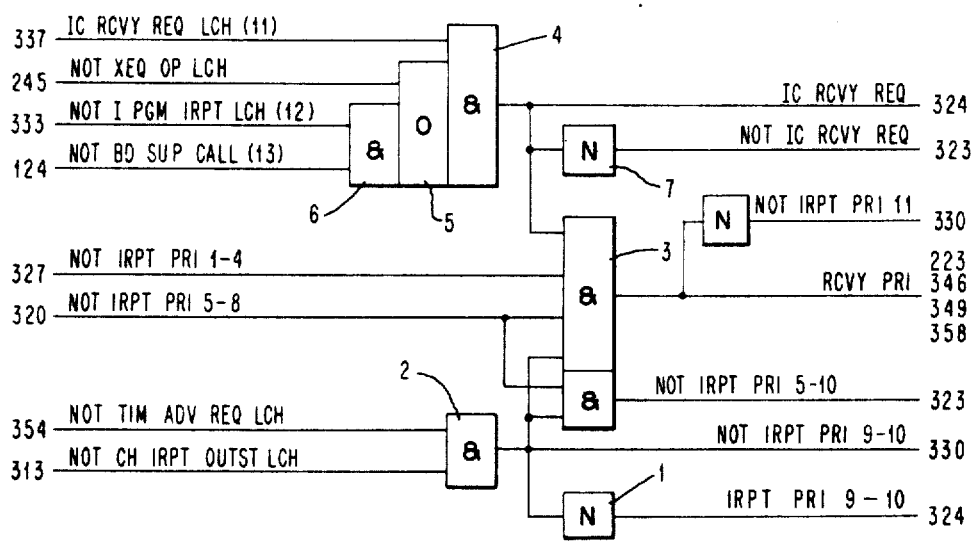
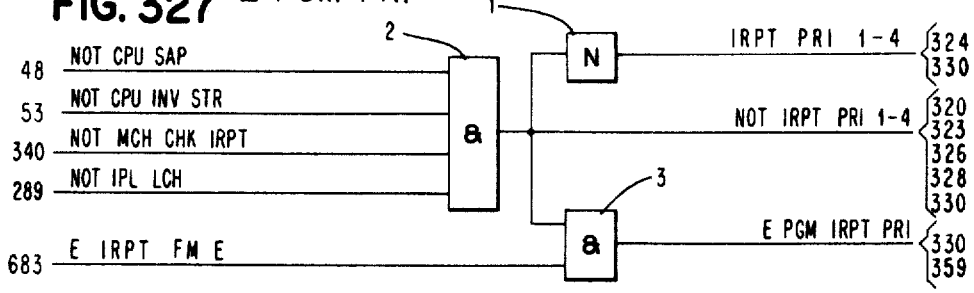
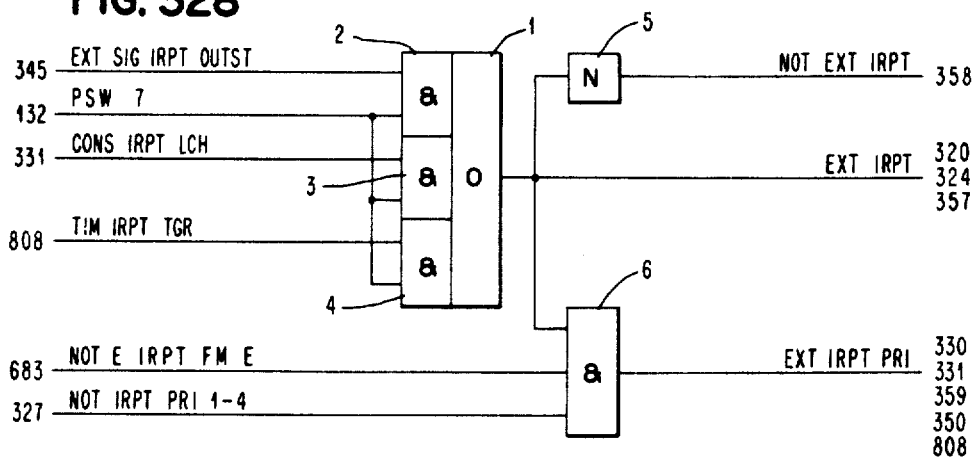

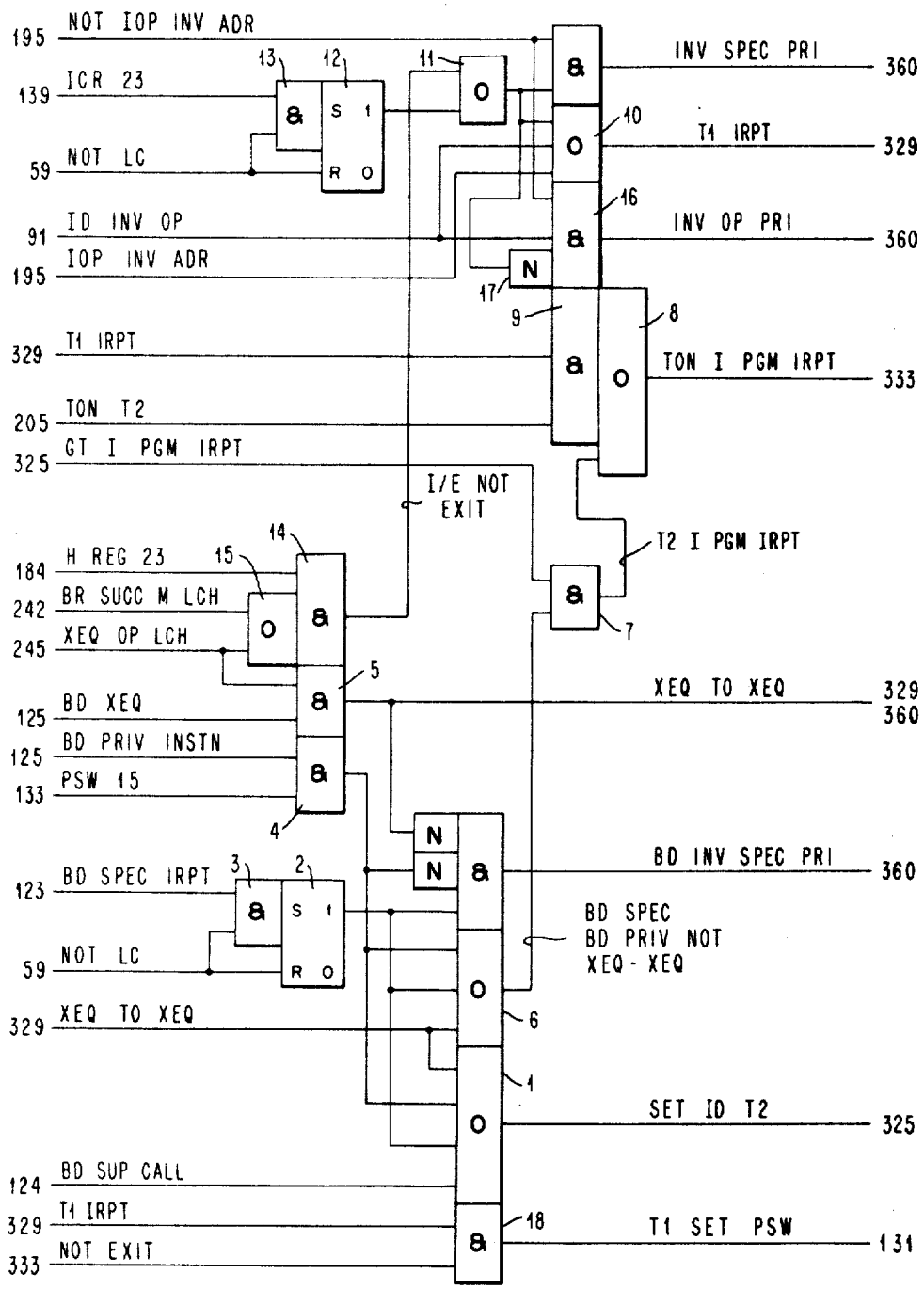
FIG. 329 IRPT PRI LOGIC

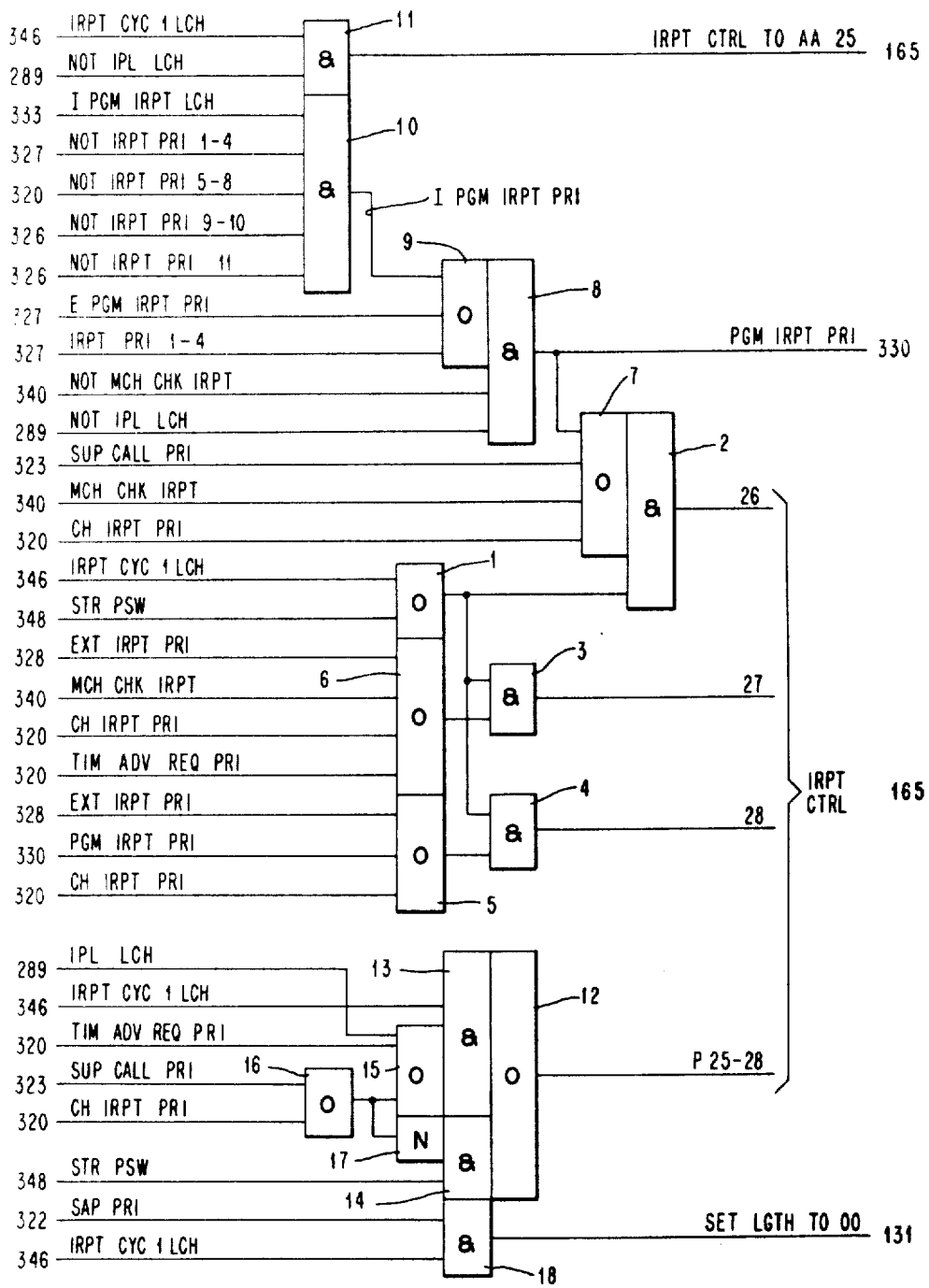

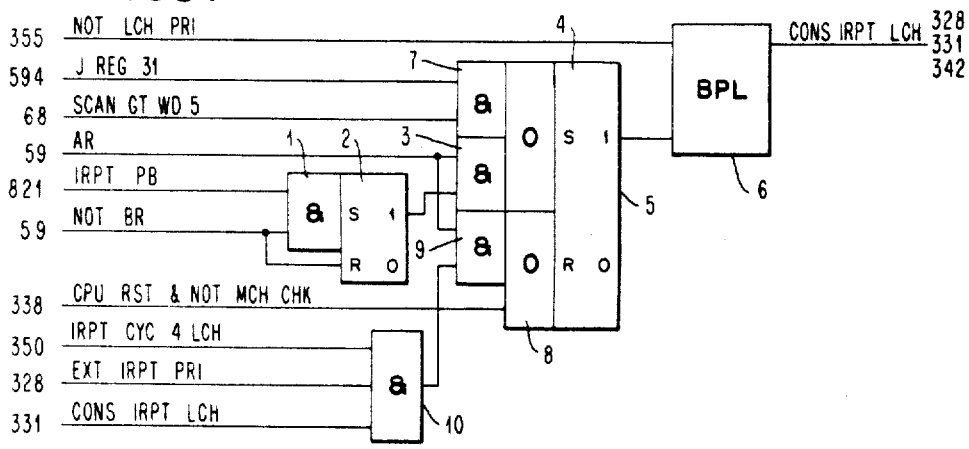
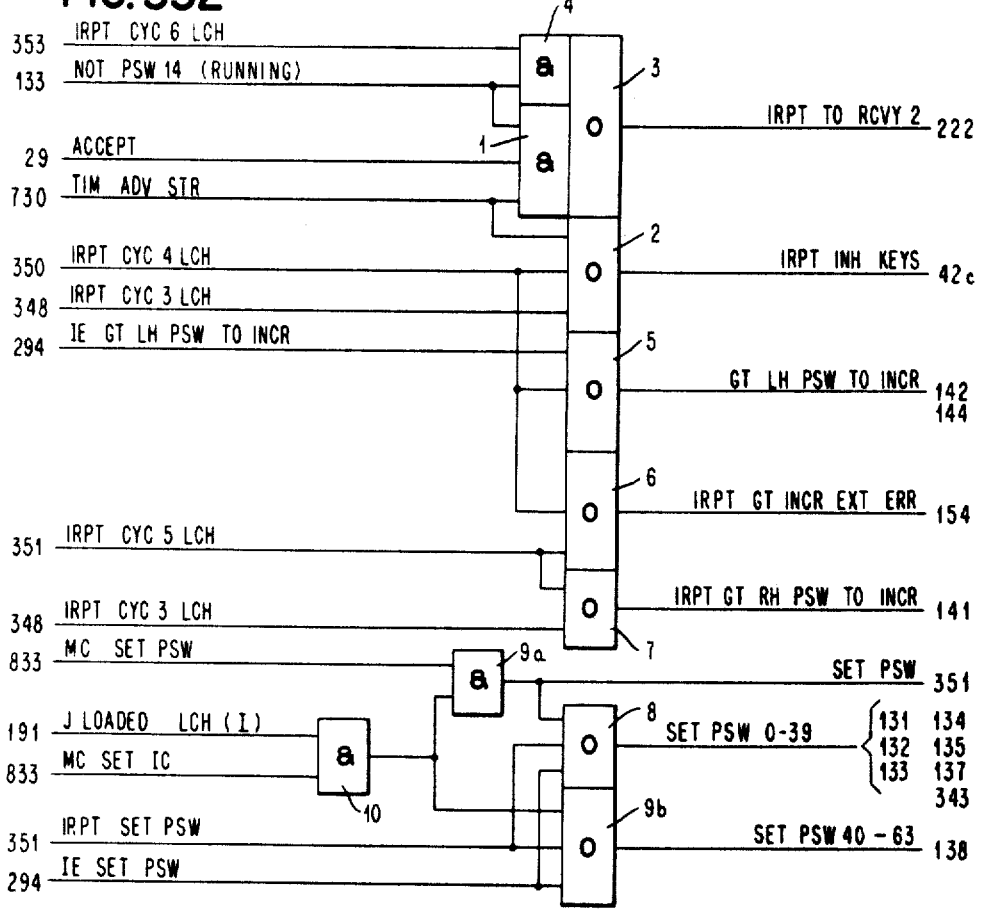

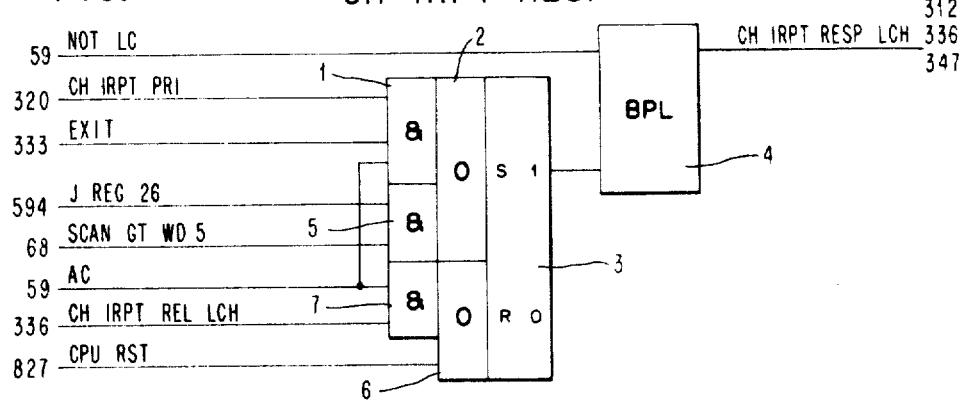
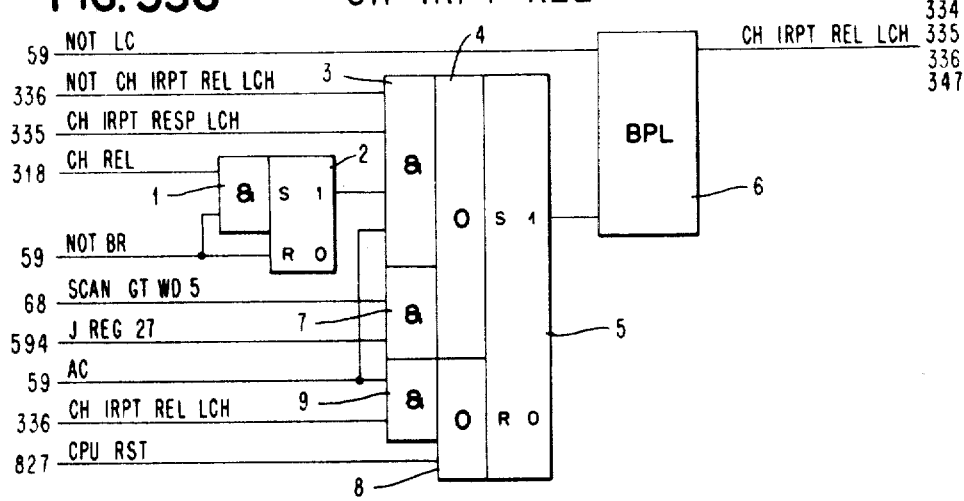
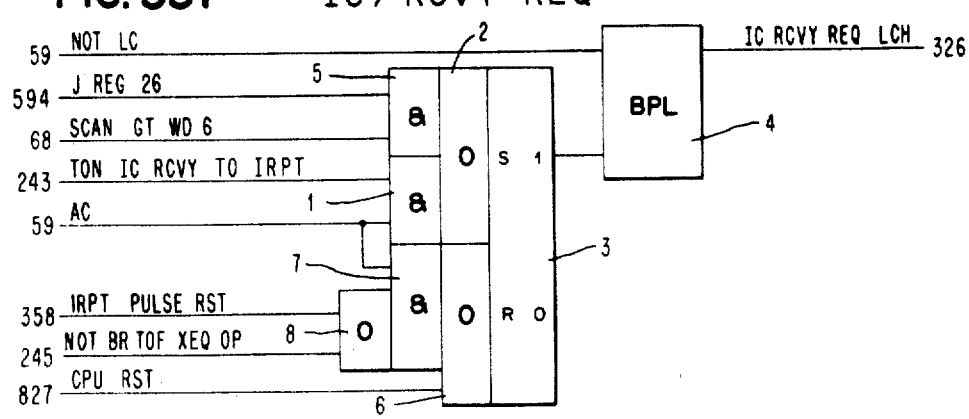

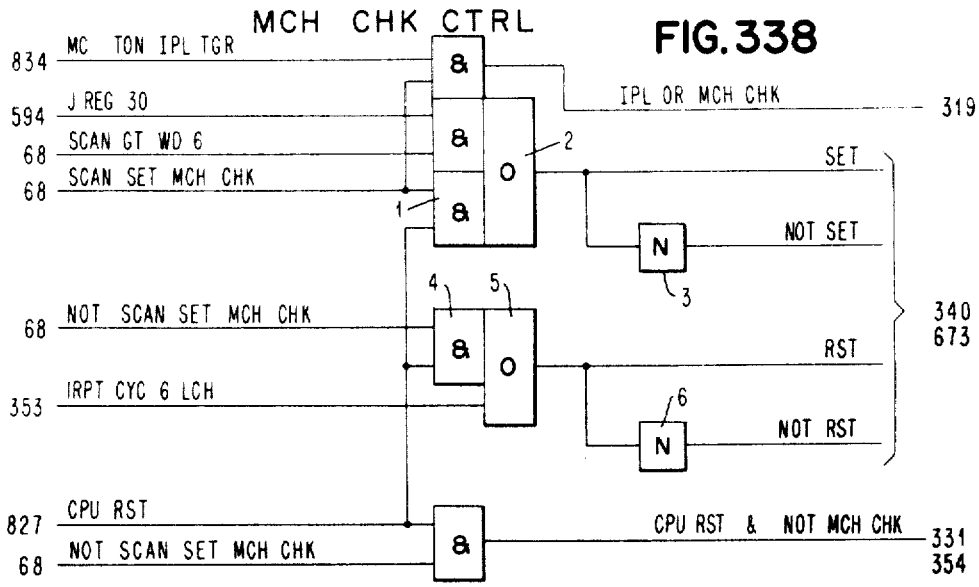
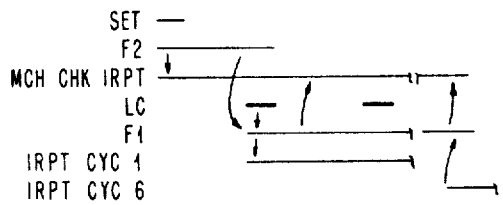
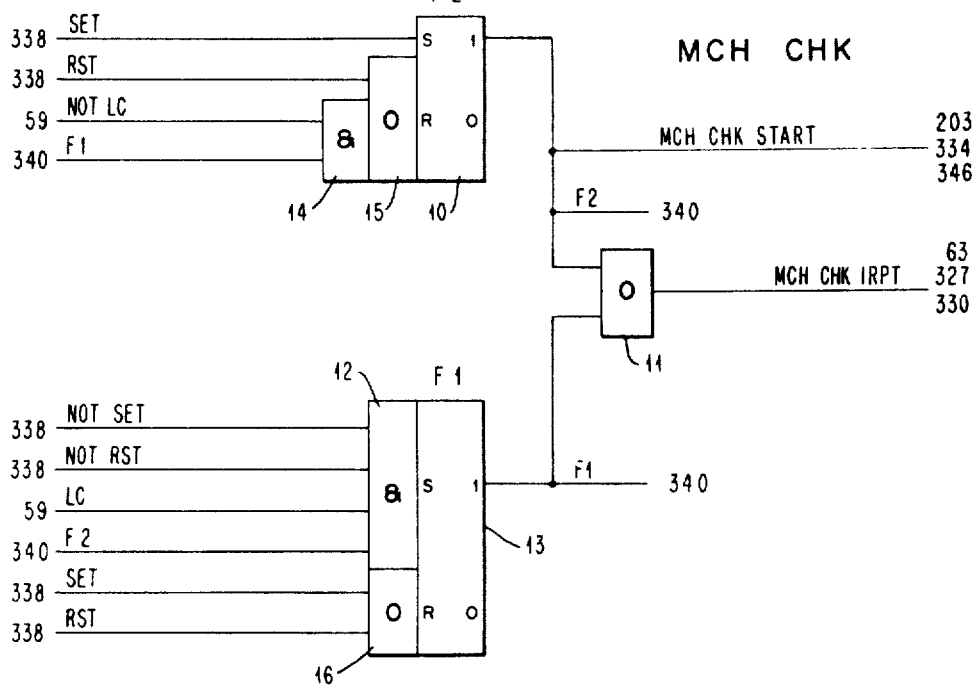

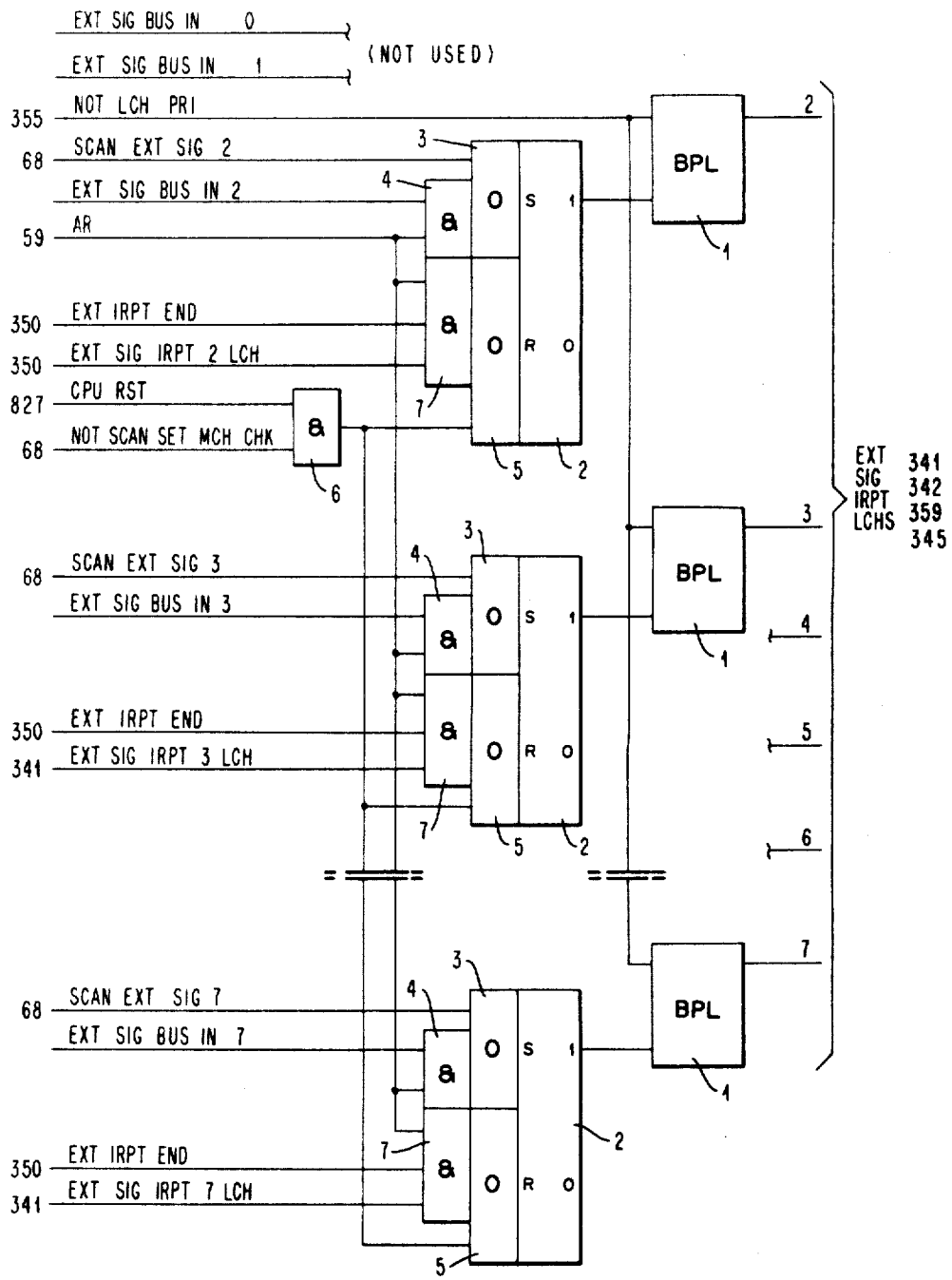

FIG. 346 IRPT CYC 1
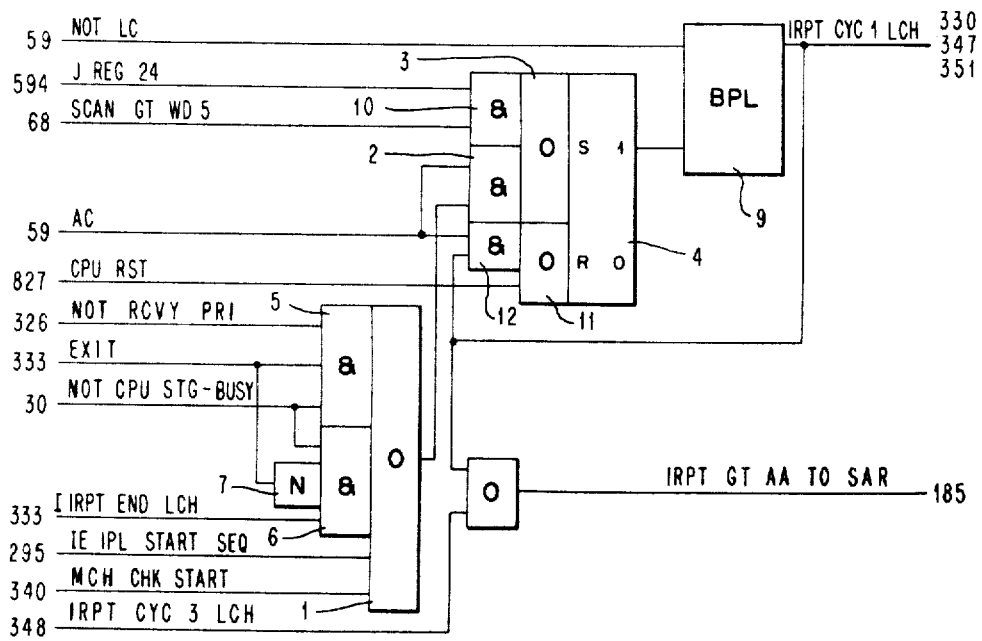
FIG. 347 IRPT CYC 2
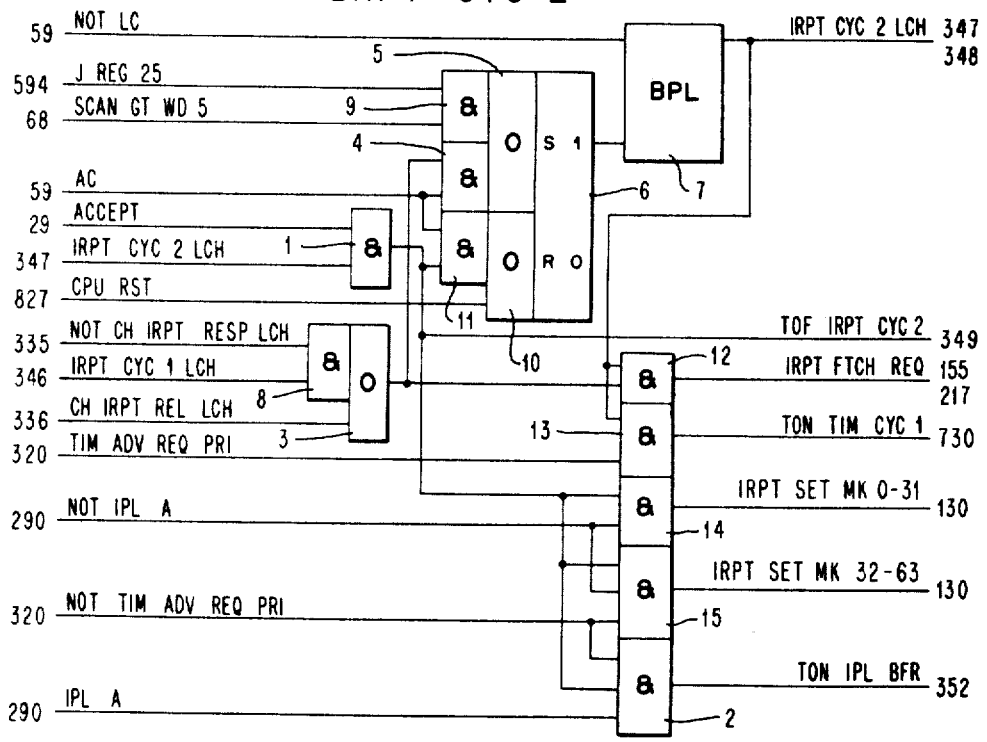

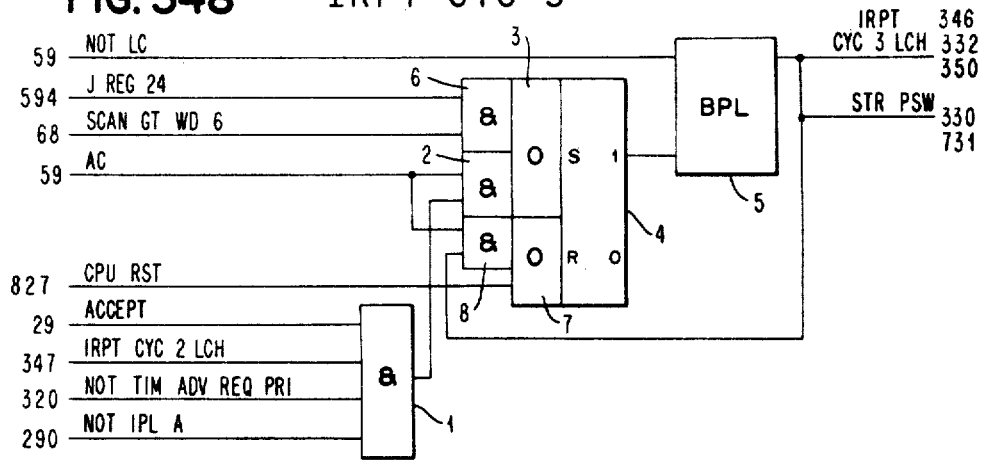
FIG. 348 IRPT CYC 3
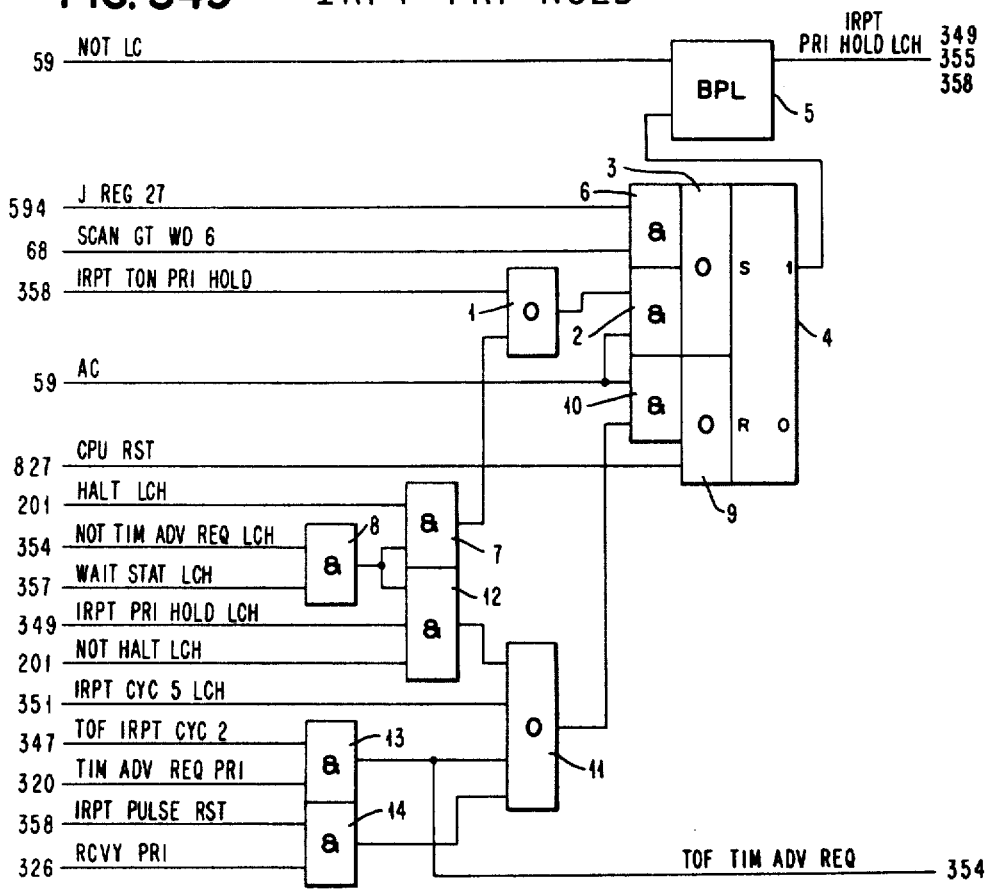
FIG. 349 IRPT PRI HOLD

FIG. 350 IRPT CYC 4
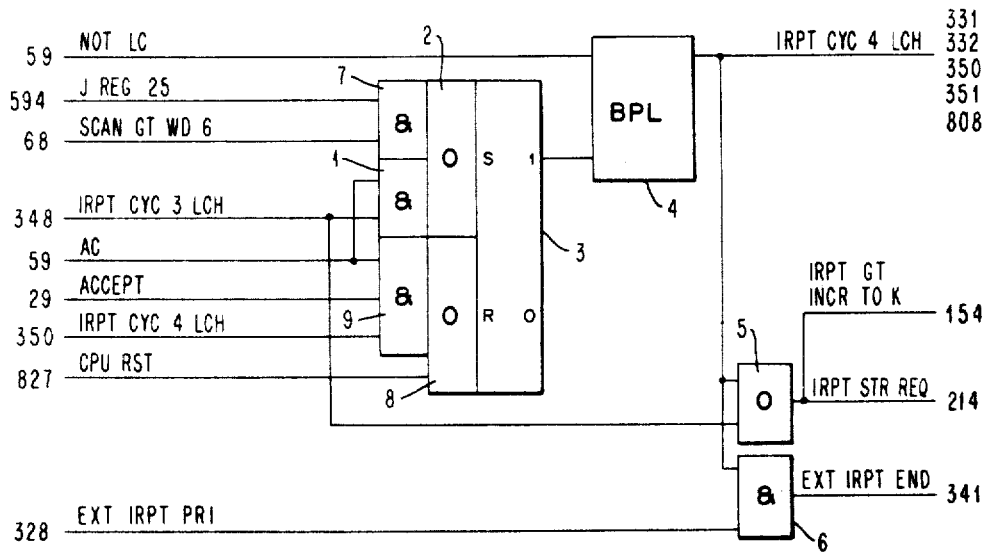
FIG. 351 IRPT CYC 5
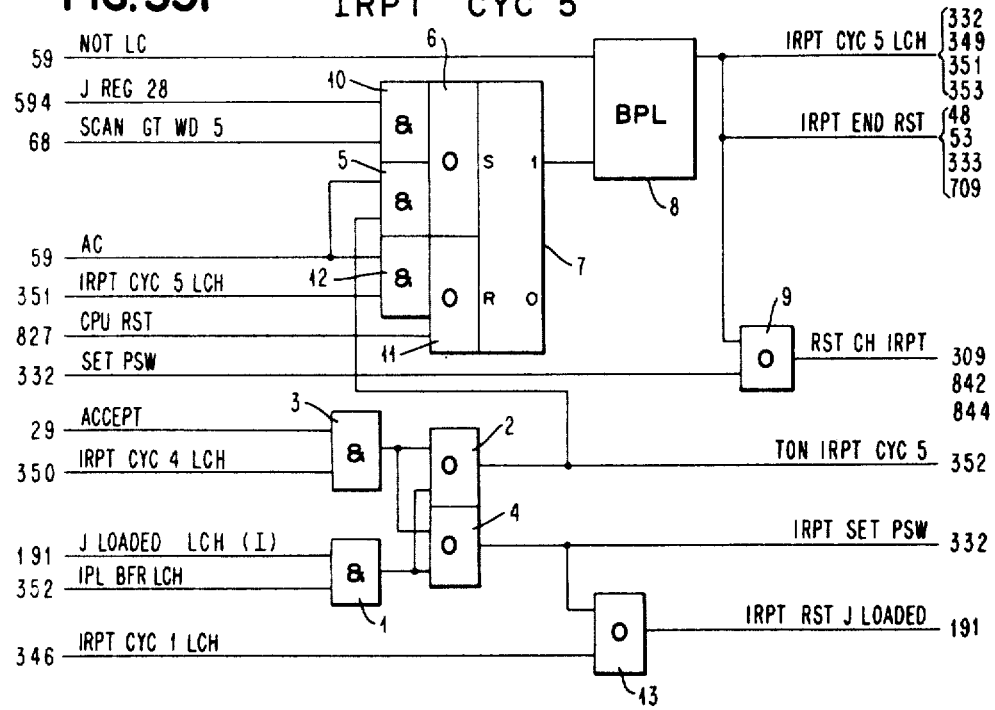

FIG. 352 IPL BFR
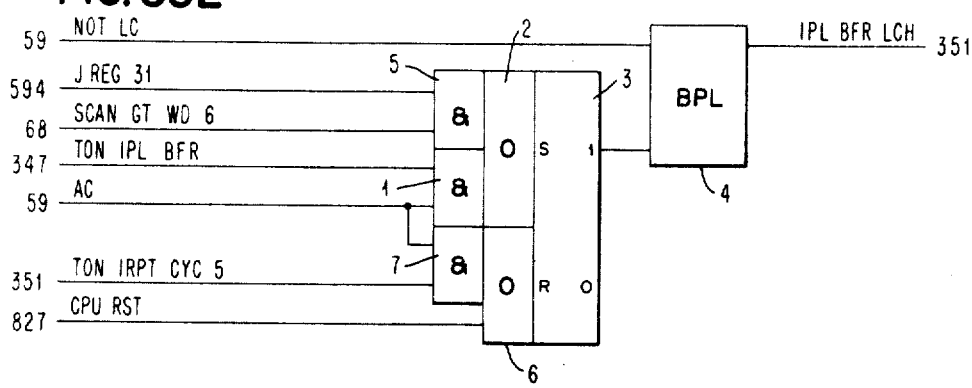
FIG. 353 IRPT CYC 6
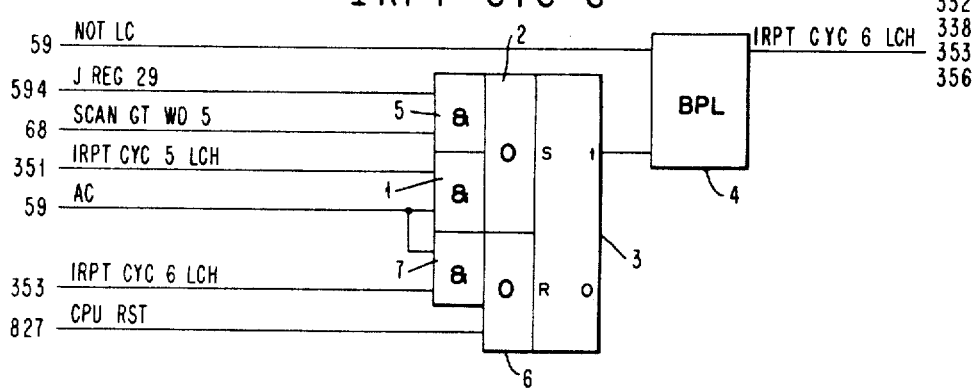
FIG. 354 TIMER ADV REQ
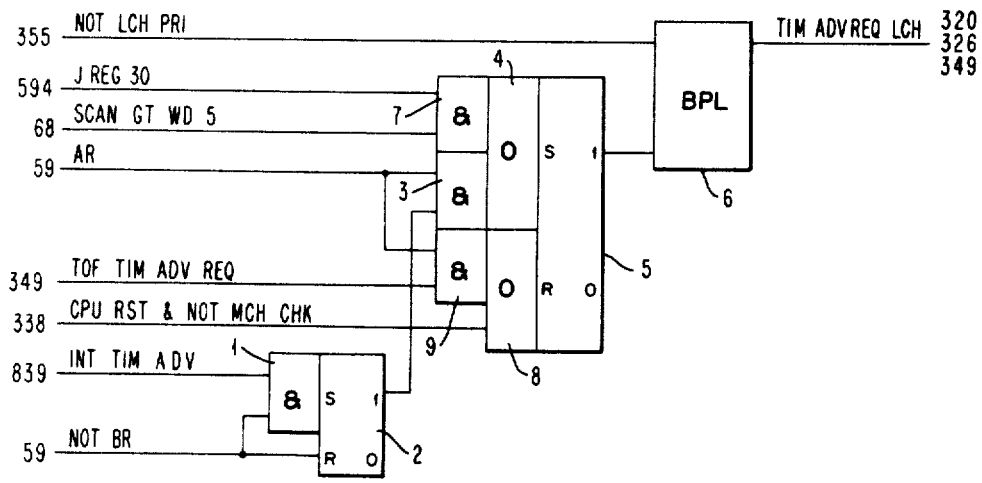

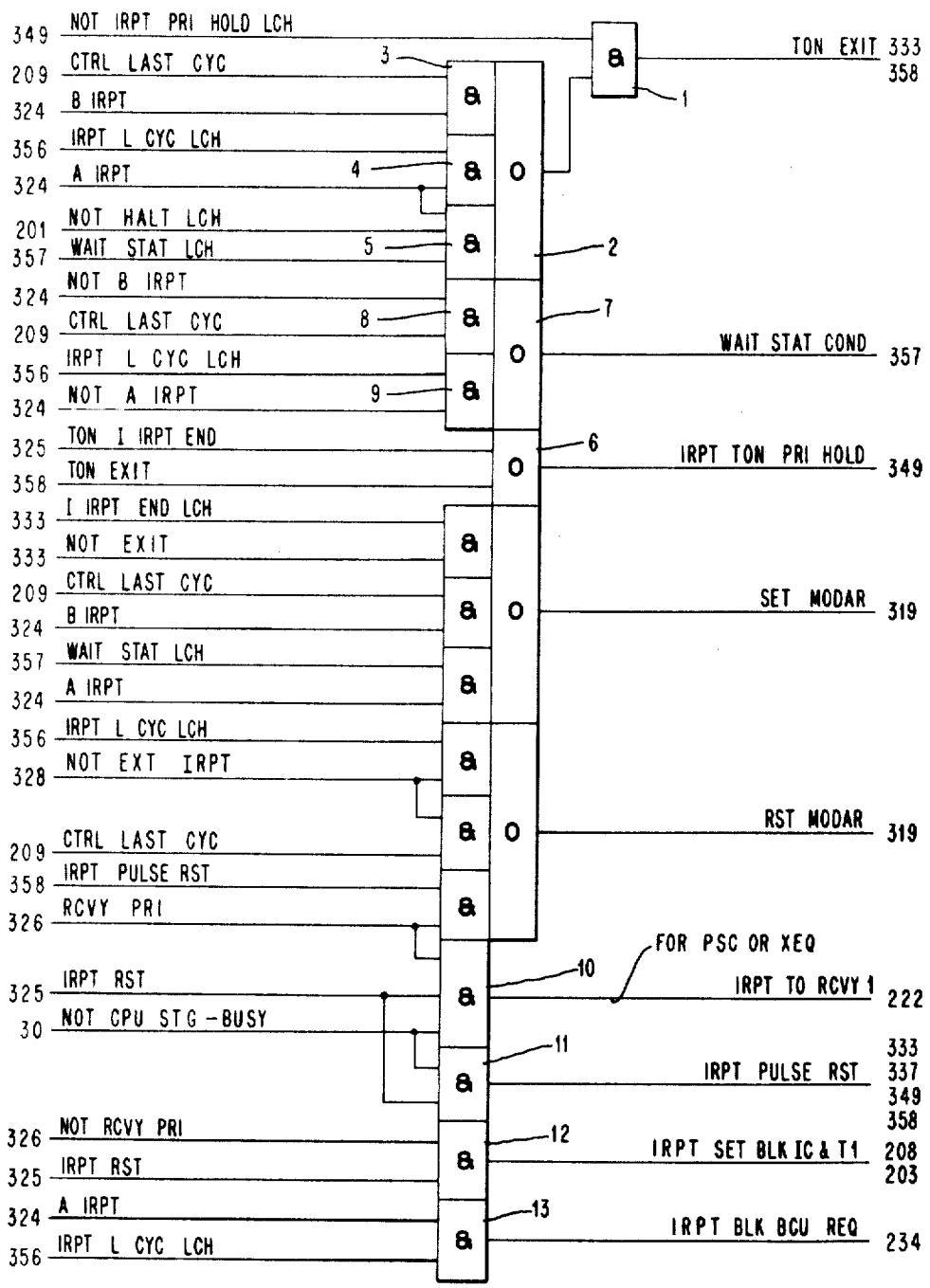

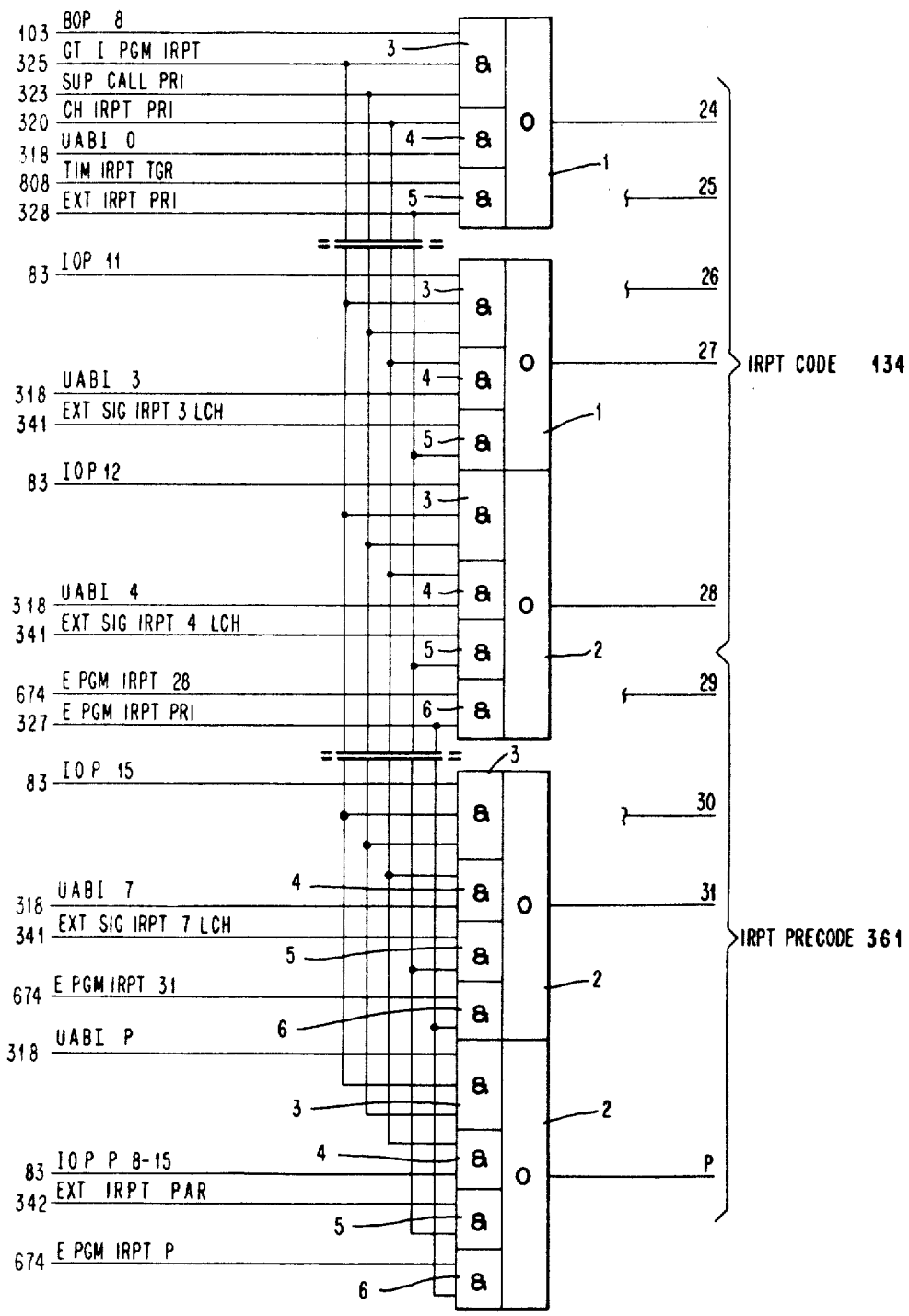
FIG. 359    IRPT CODE 1

FIG. 360  IRPT CODE 2
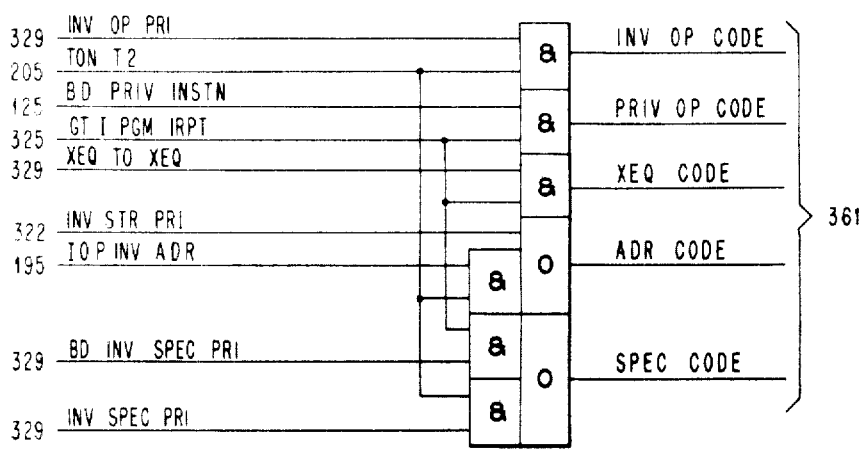
FIG. 361  IRPT CODE 3
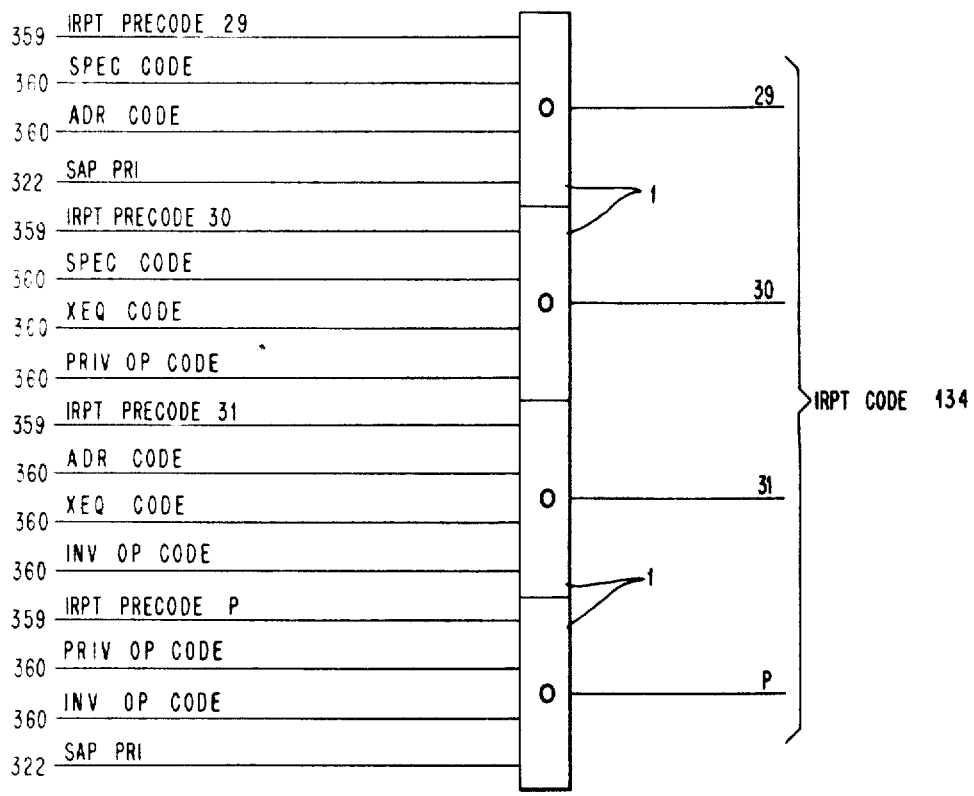

FIG. 362

THRU

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 876

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

United States Patent Office 3,386,083
Patented May 28, 1968

3,386,083
INTERRUPTIONS IN A LARGE SCALE DATA PROCESSING SYSTEM
Alan R. Geller, Leo J. Hasbrouck, and Gordon L. Smith, Poughkeepsie, N.Y., assignors to International Business Machines Corporation, Armonk, N.Y., a corporation of New York
Continuation-in-part of application Ser. No. 445,313, Apr. 5, 1965. This application Jan. 13, 1967, Ser. No. 609,241
16 Claims. (Cl. 340—172.5)

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance faciilties which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions. An interruption entrance apparatus is characterized by a plurality of interruption entrance means which cause the initiation of an interruption sequence, there also being provided means to enter the interruption sequence without invoking the use of the entrance means. Different classes of interruptions are priorized independently, and the priorities of interruptions of different classes are handled in common. Interruptions of an asynchronous nature can cause the setting of the interruption sequence at times which relate to the execution of programs as well as at times which relate to the end of a previous interruption sequence. A program status word register, a portion of which is set to reflect the nature of the interruption, is itself utilized to manifest the identity of particular types of interruptions of one class.

This application is a continuation-in-part of application Ser. No. 445,313, filed Apr. 5, 1965, now abandoned, entitled "Interruptions in a Large Scale Data Processing System."

TABLE OF CONTENTS

| | Column |
|---|---|
| (1.0) Background of the Invention | 2 |
| (2.0) References | 5 |
| (3.0) Nomenclature | 6 |
| (4.0) Brief Description of Environmental System (FIG. 2) | 7 |
| (5.0) Component Circuits (FIG 3 through FIG. 8) | 8 |
| (6.0) Basic Bus Control Unit | 10 |
| (7.0) Clock Circuit | 10 |
| (7.4) Clock Circuit | 10 |
| (8.0) Scan | 11 |
| (8.1) Scanning Into the I Unit (FIG. 68) | 11 |
| (8.2) Scanning Into the E Unit (FIG. 69) | 12 |
| (9.0) Instruction Unit Data Flow | 12 |
| (9.1) General Introduction to I Unit Data Flow | 12 |
| (9.1.1) Instruction Selection (FIG. 72) | 13 |
| (9.1.2) Instruction Input Paths (FIG. 73) | 13 |
| (9.1.3) Instruction Decoding (FIG. 74) | 14 |
| (9.1.4) Instruction Utilization (FIG. 75) | 14 |
| (10.0) Instruction Sequencing | 15 |
| (10.1) Introduction | 15 |
| (11.0) Instruction Counter Controls (FIG. 72 through FIG. 75) | 16 |
| (11.1) Introduction | 16 |
| (12.0) Branching | 17 |
| (12.1) Branch Operations | 17 |
| (12.1.1) Introduction to Branch Controls | 17 |
| (13.0) I Unit Execution | 18 |

TABLE OF CONTENTS—Continued

Figure 324:
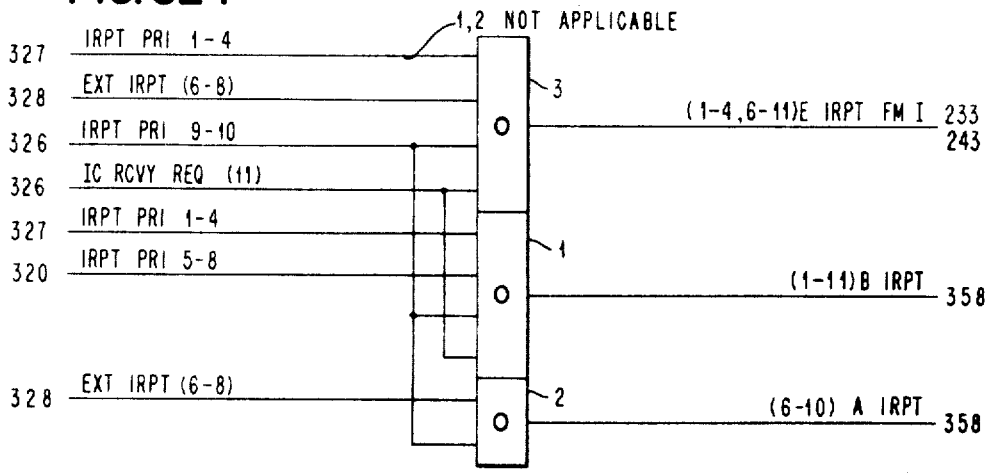
Figure 325:
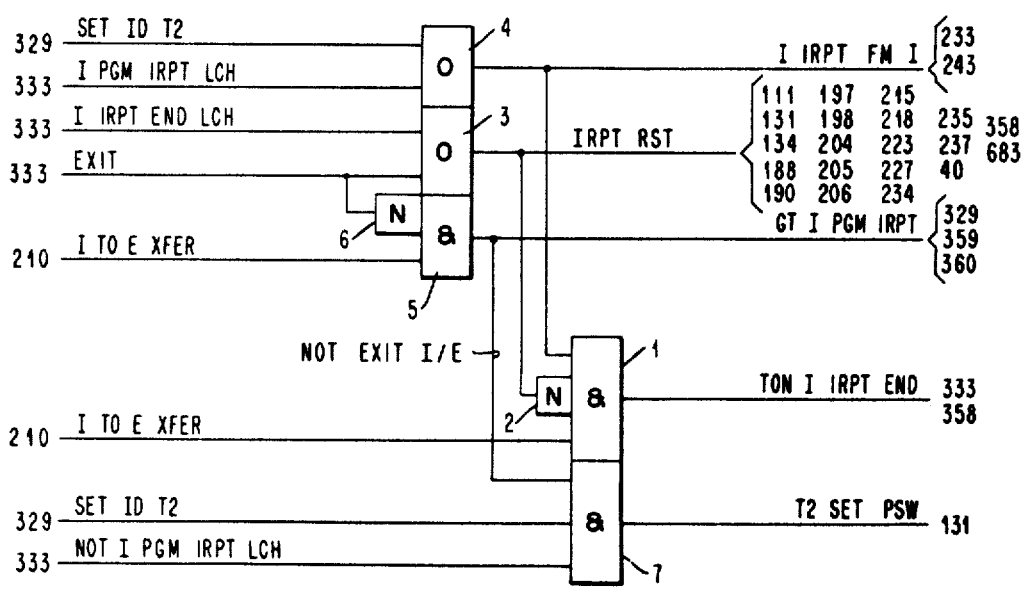

| | Column |
|---|---|
| (14.0) Interruptions | 18 |
| (14.1) Interruption Handling | 18 |
| (14.1.1) The Interruption Fixed Sequence | 18 |
| (14.1.2) Interruption Classification | 18 |
| (14.1.3) Interruption | 19 |
| (14.1.3.1) Priority Assignments and Classes | 19 |
| (14.1.3.2) Interruption Priority Group Descriptions | 19 |
| (14.1.4) Interrupt Sequence Initiation | 21 |
| (14.1.4.1) EXIT—E Last Cycle Test | 21 |
| (14.1.4.2) IRPT FM I Test | 22 |
| (14.1.4.3) Forced Entrance | 22 |
| (14.1.4.4) Interruption Last Cycle Test | 22 |
| (14.1.5) Interruption Sequencing | 22 |
| (14.1.5.1) Normal Sequencing | 22 |
| (14.1.5.2) I/O Sequencing | 23 |
| (14.1.5.3) Timer Advance Request Sequencing | 24 |
| (14.1.5.4) Recovery-Only Sequencing | 24 |
| (14.1.5.5) IPL Load PSW Sequencing | 24 |
| (14.1.5.6) Machine Check Interrupt Sequencing | 25 |
| (14.1.6) Wait Status | 25 |
| (14.1.7) Storage Interlock | 25 |
| (14.2) Interruption Circuitry | 26 |
| (14.2.1) Entrance, Priorities, and Masking | 26 |
| (14.2.1.1) Absolute Interruption Priorities (table) | 26 |
| (14.2.1.2) Effective Interruption Priorities and Entrance Routes (table) | 27 |
| (14.2.1.3) A IRPT Group and B IRPT Group (FIG. 326, FIG. 327, FIG. 320, and FIG. 324) | 27 |
| (14.2.1.4) Turning on of the EXIT Trigger (FIG. 358 and FIG. 333) | 29 |
| (14.2.1.5) Turning on I IRPT END (FIG. 325, FIG. 329, and FIG. 333) | 30 |
| (14.2.1.6) Timing Control for Setting Interruption Code | 32 |
| (14.2.1.7) Priority Hold and Interrupt Reset (FIG. 325, FIG. 358 and FIG. 349 | 33 |
| (14.2.1.8) IC Recovery Request Latch (FIG. 337) | 34 |
| (14.2.1.9) Console Interrupt Latch Circuit (FIG. 331) | 35 |
| (14.2.1.10) Machine Check Circuits (FIG. 338, FIG. 339, and FIG. 340) | 35 |
| (14.2.1.11) Wait Status Latch (FIG. 357) | 36 |
| (14.2.1.12) INITIAL Program Load Buffer (FIG. 347 and FIG. 352) | 38 |
| (14.2.1.13) Timer Advance Request (FIG. 354) | 39 |
| (14.2.1.14) External Signal Latches (FIG. 341 through FIG. 345) | 39 |
| (14.2.1.15) Table of Interruption Masking | 41 |
| (14.2.2) Interruption Fixed-Sequence | 41 |
| (14.2.2.1) Interruption Reset (FIG. 325) | 41 |
| (14.2.2.2) Setting the Interruption Code (FIG. 325, FIG. 329 and FIG. 359, through FIG. 361) | 42 |
| (14.2.2.3) Table of Interuption Codes | 44 |
| (14.2.2.4) Table of Interruption Codes | 45 |
| (14.2.3) PSW Address Generation (FIG. 330) | 45 |
| (14.2.4) Interruption Cycles | 46 |
| (14.2.4.1) Interruption Cycle 1 (FIG. 346) | 47 |
| (14.2.4.2) Interruption Cycle 2 (FIG. 347) | 47 |
| (14.2.4.3) Channel Interruption Response and Release (FIG. 335 and FIG. 336) | 48 |
| (14.2.4.4) Interruption Cycle 3 (FIG. 348) | 49 |
| (14.2.4.5) Interruption Cycle 4 (FIG. 350) | 49 |
| (14.2.4.6) Interruption Cycle 5 (FIG 351) | 49 |
| (14.2.4.7) Interruption Cycle 6 (FIG. 353) | 50 |
| (14.2.4.8) Miscellaneous Circuits (FIG. 332 and FIG. 358) | 50 |
| (14.2.5) Interrupt Controls in IC Fetch and Sequence Area | 51 |

(1.0) BACKGROUND OF THE INVENTION

This invention relates to data processing, and more particularly to means for entering an interruption condition of said system in response to a plurality of interruption conditions.

In the data processing art, the operation of a large scale data processing system has become simplified by virtue of classification of functions which the data processing system is to perform into "usual" and "unusual." When a system is proceeding through a series of instructions in what may be called a problem mode, certain events within the system, and certain events external to the system, may occur which require an altering in the operation of the system. The change in the operation of the system as a result of these conditions is what is known in the art as "interruption." Various kinds of interruptions have been provided in systems known in the art. Among these, interruptions which result from invalid operation of the system may have a first priority, interruptions from external devices may have a different priority, and interruptions resulting from operator control or from input/output devices on the system may have still different priorities. To these known classifications of interruptions, there may be added functions which are not by their nature interruptions of the system, but which may be considered to be "unusual" in terms of requiring special handling by the system. Certain of these functions are referred to in a copending application of the same assignee, entitled "Large Scale Data Processing System," which is referred to in Section 2 herein, said system hereinafter being referred to as "said environmental system." Therein, the advancing of an interval timer, fetching of a new PSW as a result of initial program loading, recovery following an execute instruction or recovery following a program store compare indication are all handled, at least in part, by some of the same circuitry which provides for the interruption of said system. Interruption in said environmental system is accomplished through an "interrupt fixed sequence" which provides various functions such as inserting the interruption code into the old PSW (program status word), exchanging of PSW's, checking of the new PSW, resetting certain conditions of the system so that the interruption may be handled, and providing for resumption of system operation once the new PSW is loaded. In order to enter the interrupt fixed sequence, prority as between various interruptions, as well as the sensing, remembering, and other servicing of interruption requests must be provided.

Accordingly, a primary object of the present invention is to provide an improved interruption entrance apparatus for a data processing system.

A more particular object of the present invention is to provide for improved priority handling of interruptions in a data processing system.

Other objects of the invention include the following:

Provision of simplified means to handle interruptions of a variety of types which may occur at different times in the operation of a data processing system;

Provision of simplified means for manifesting the nature of an interruption to the interrupt circuitry;

Provision of simplified means for determining priority as between interruptions of the same class, and as between interruptions of different classes;

Provision of a variable priority means for determining priority as between interruption types;

Provision of simplified means for handling synchronous interruptions and asynchronous interruptions;

Provision of improved and simplified means for responding to asynchronous interruptions in an effective priority with respect to synchronous interruptions; and Provision of means to enter an interruption sequence in a variety of ways related to the interrupt conditions which may require the interrupt sequence.

In accordance with the present invention, there is provided an interruption entrance apparatus which is characterized by a plurality of interruption entrance means, said entrance means causing the initiation of an interruption sequence, there also being provided means to enter the interrruption sequence without invoking the use of said entrance means. Additionally, interruptions of different classes are priorized independently, and the priority of interruptions of different classes are handled in common. Interruptions of an asynchronous nature are permitted to cause the setting of said interruption sequence through the intervention of one of said entrance means at times which relate to the execution of programs as well as times which relate to the end of a previous interruption sequence. Furthermore, a program status word register, a portion of the contents of which is set to reflect the nature of the interruption, is itself utilized to manifest the identity of particular types of interruptions of one class.

The present invention permits handling of a variety of classes of interruptions, each variety including a plurality of different interruptions, as well as the handling of certain abnormal functions of the system as if they were interruptions.

Other objects, features and advantages of the present invention will become more apparent in the light of the following detailed description of a particular embodiment thereof, as illustrated in the following drawings.

The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 1:
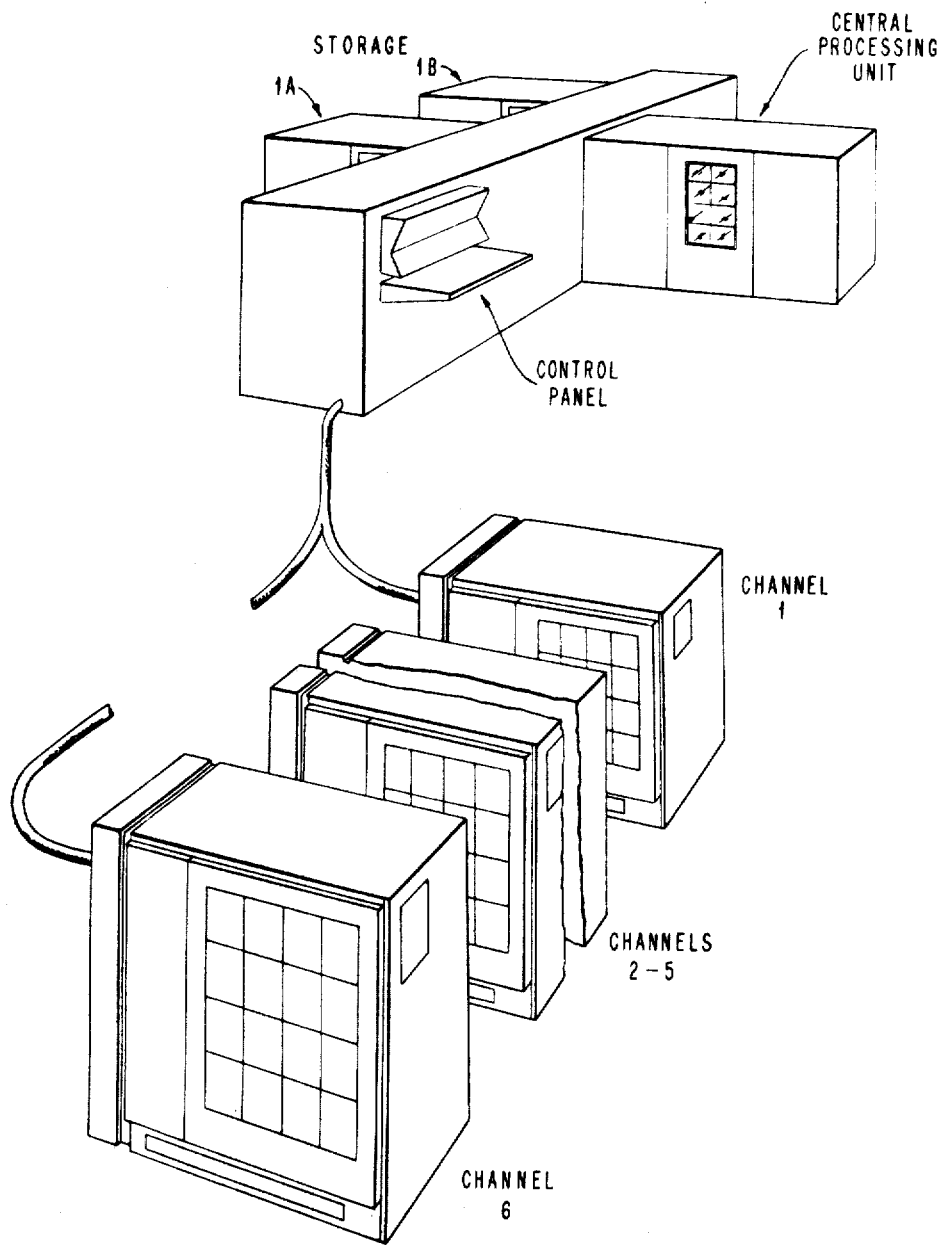
Figure 2:
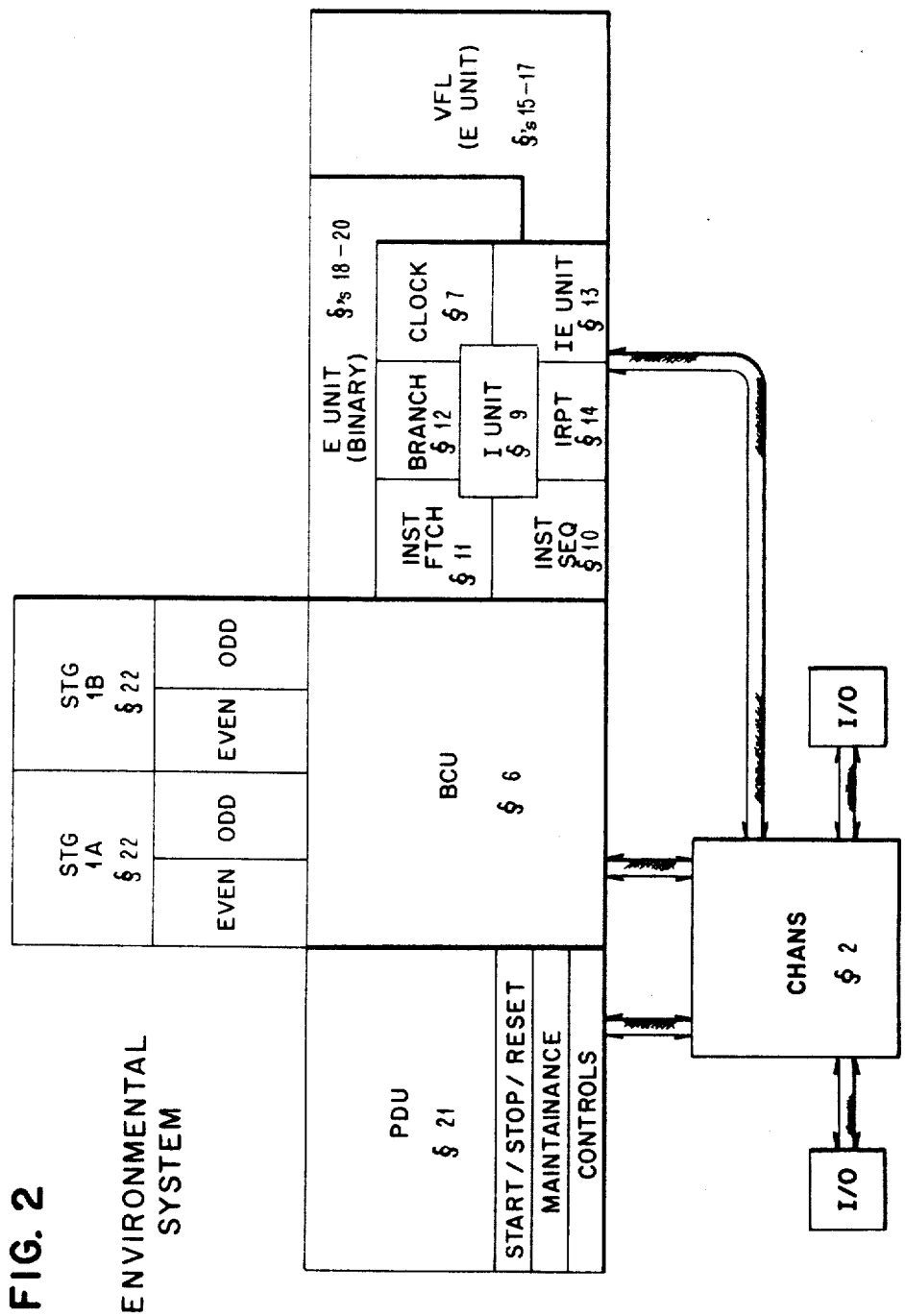
Figure 3A:
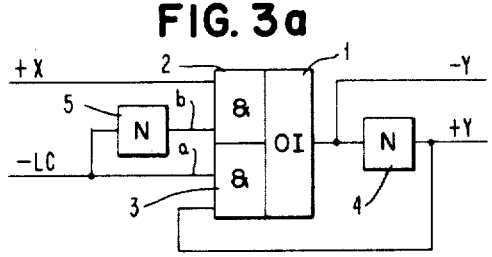
Figure 3B:
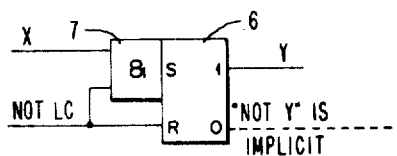
Figure 3C:
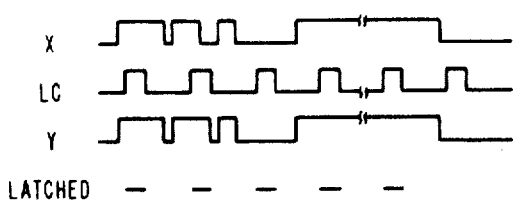
Figure 3D:
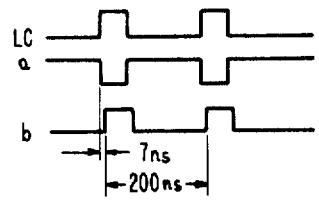
Figure 4A:
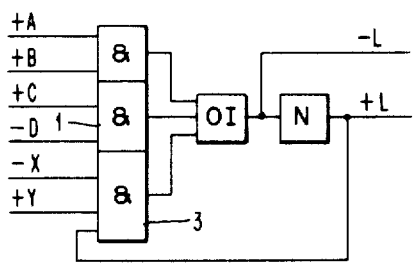
Figure 4B:
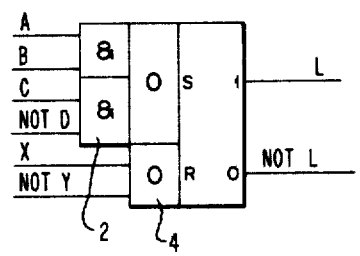
Figure 5A:
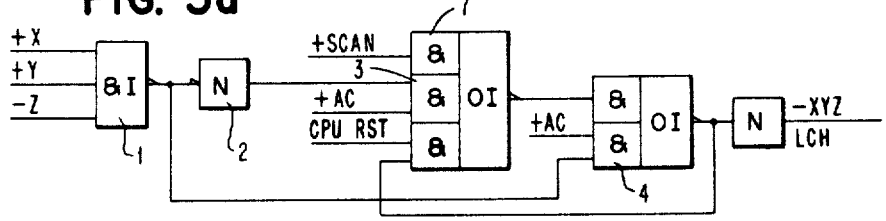
Figure 5B:
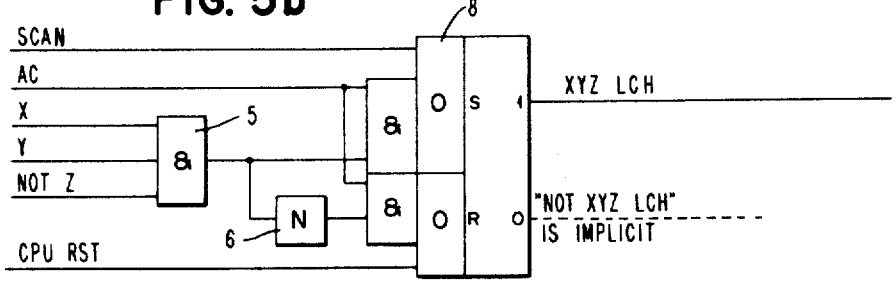
Figure 6A:
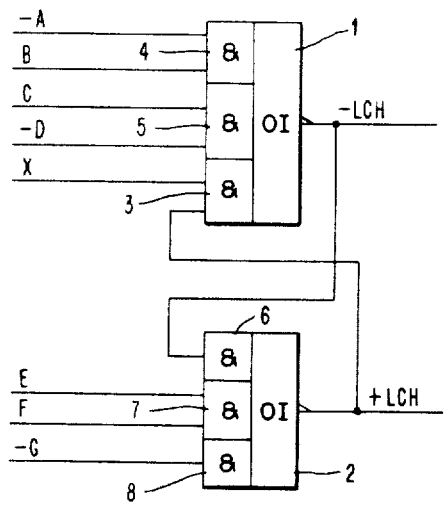
Figure 7A:
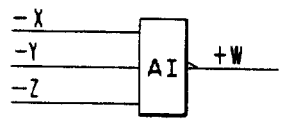
Figure 7B:
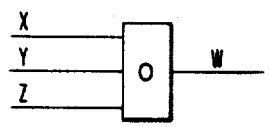
Figure 8A:
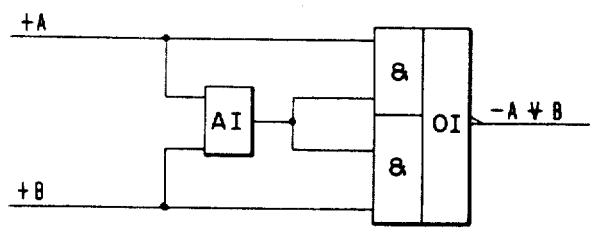
Figure 9:
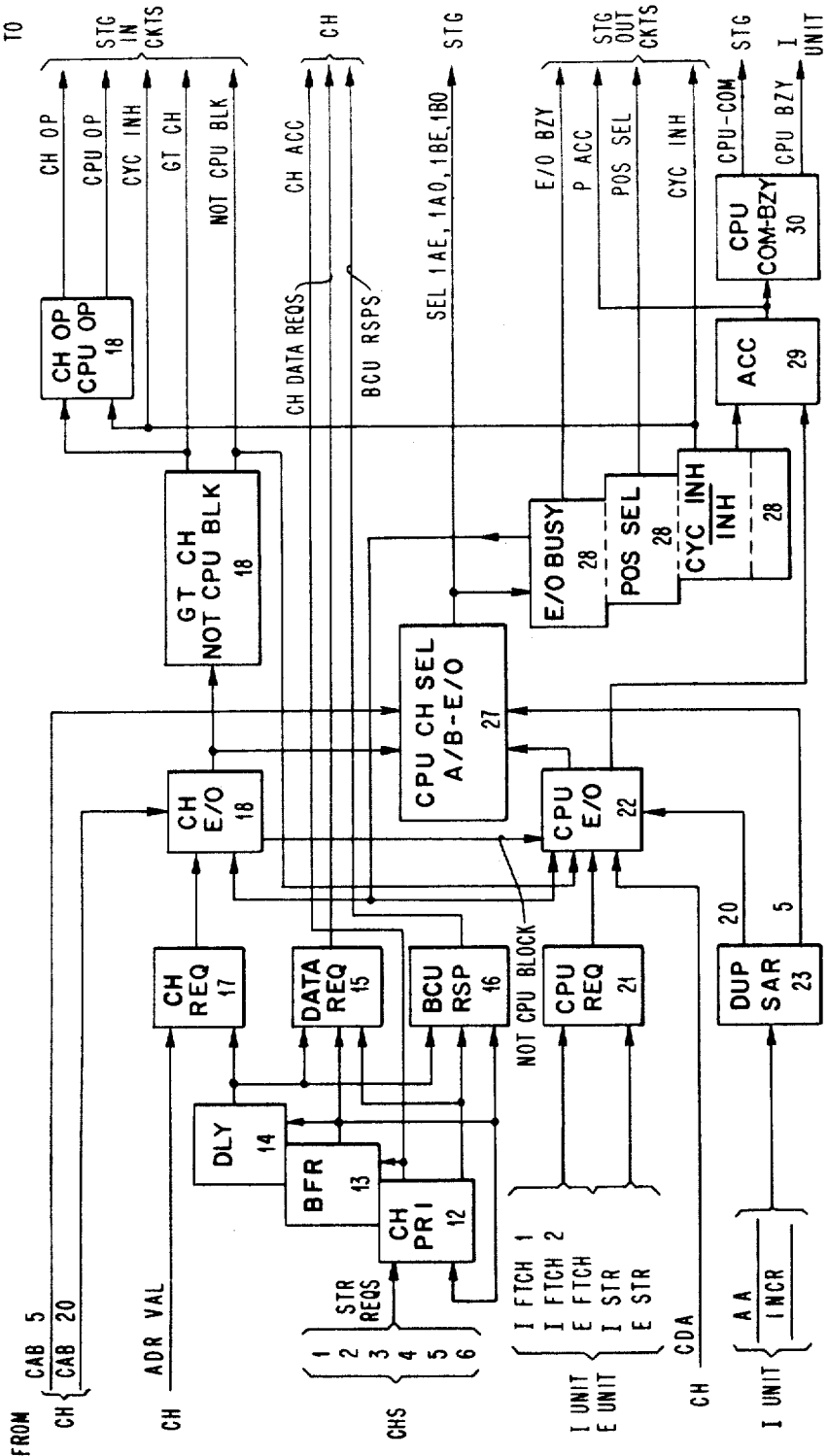
Figure 10:
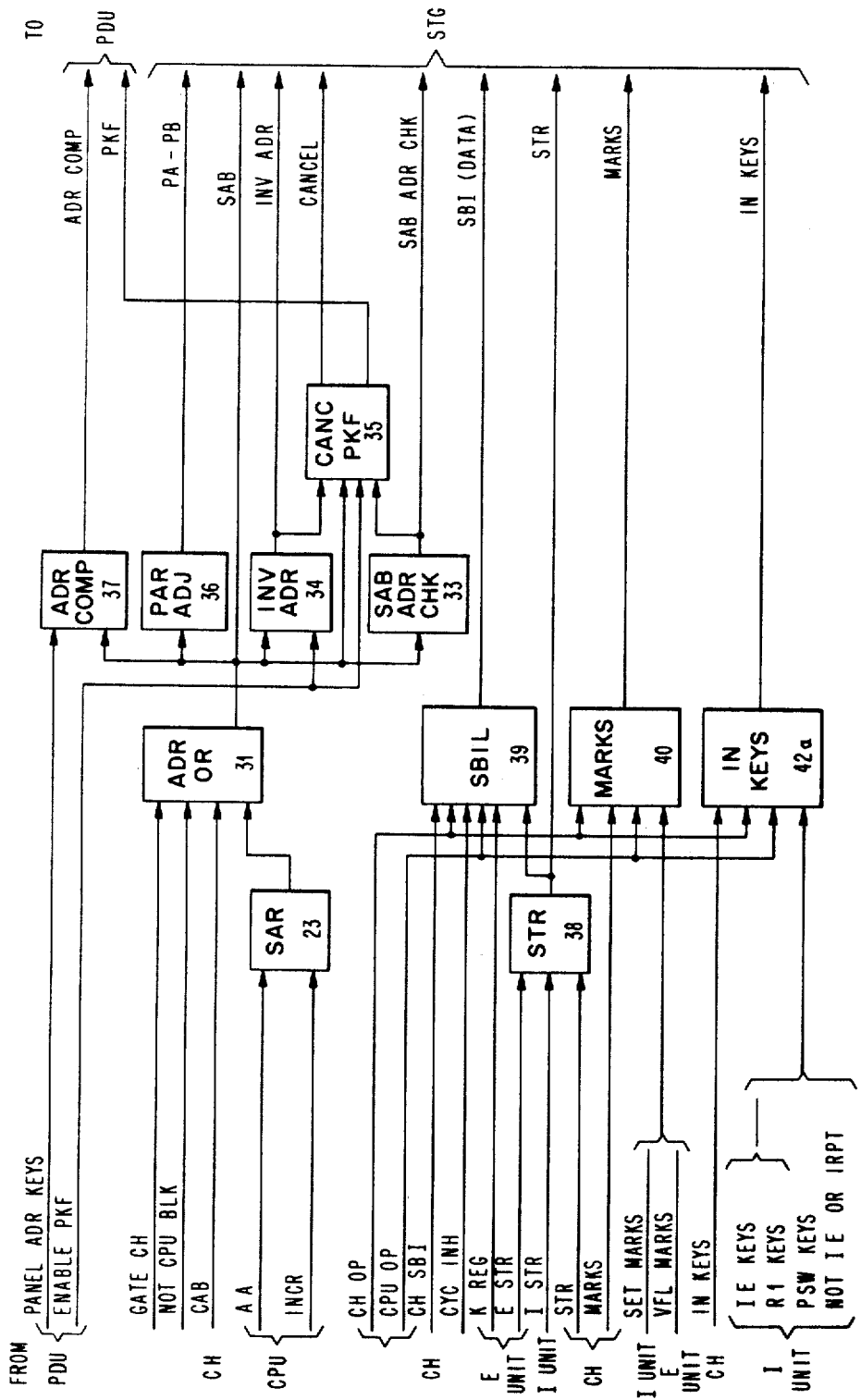
Figure 11:
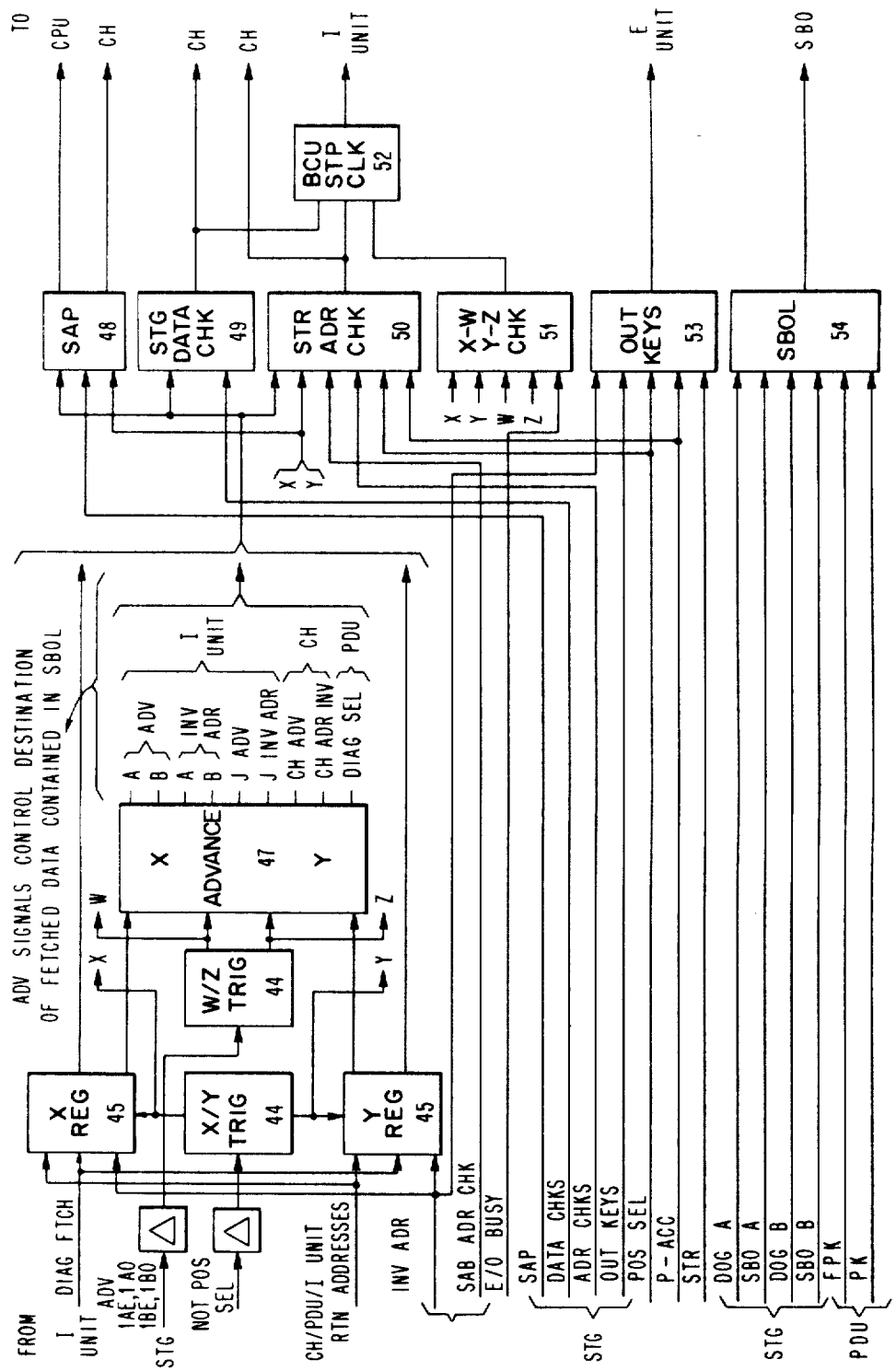
Figure 313:
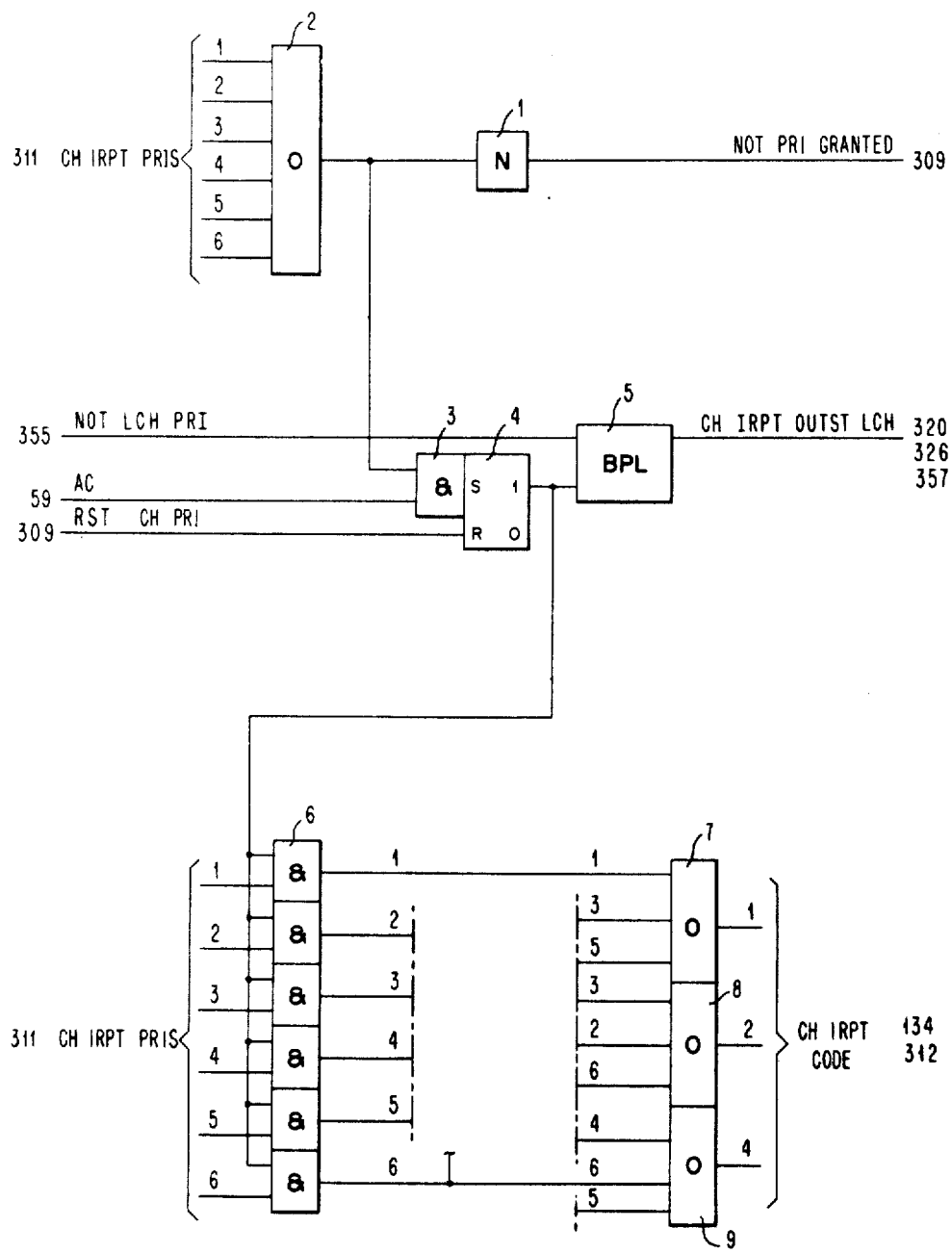
Figure 316:
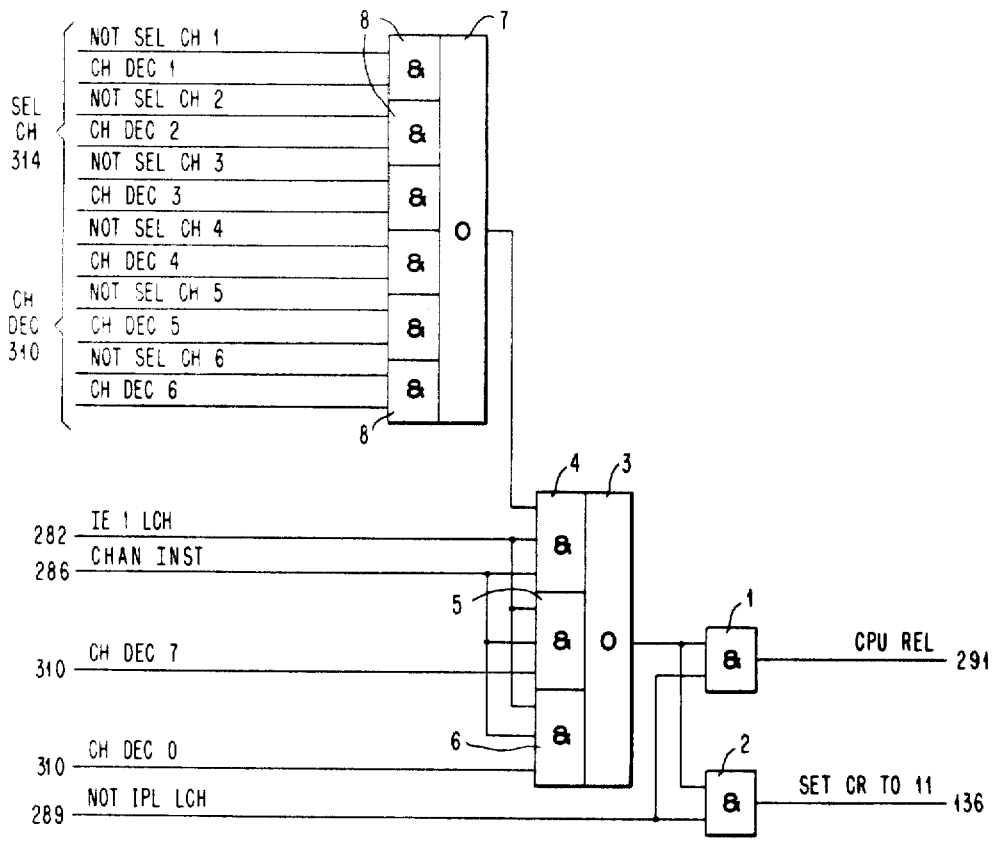
Figure 317:
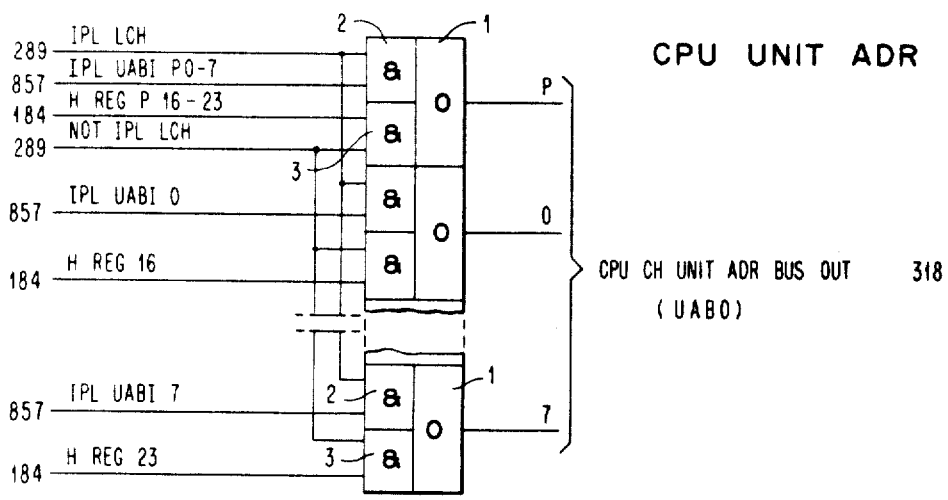
Figure 318:
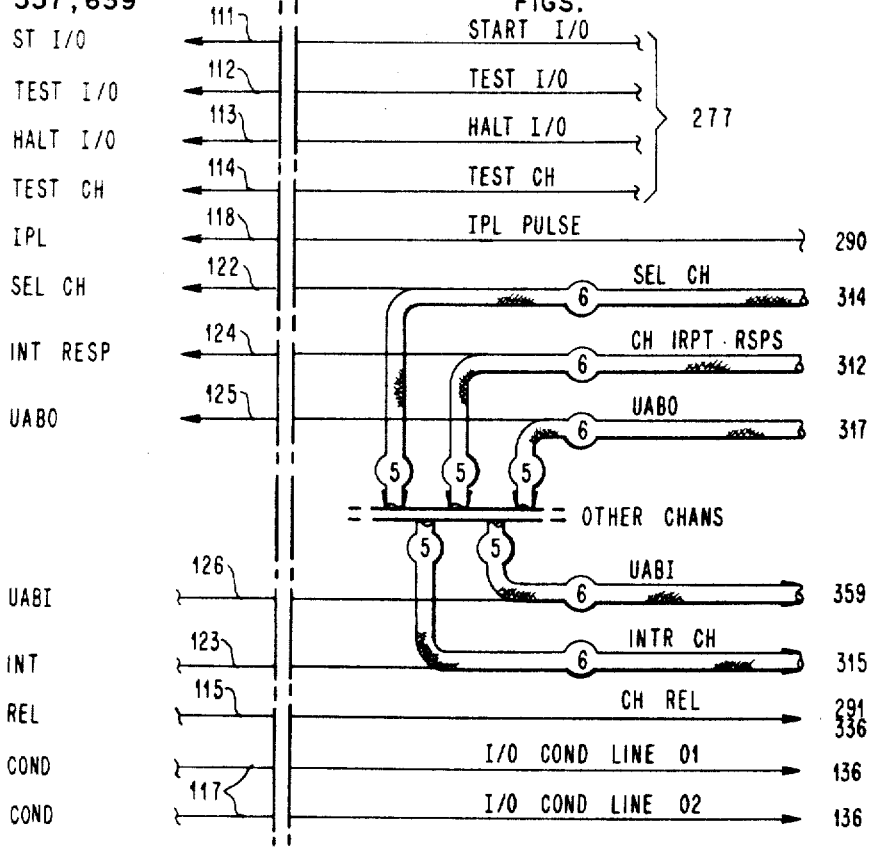
Figure 355:
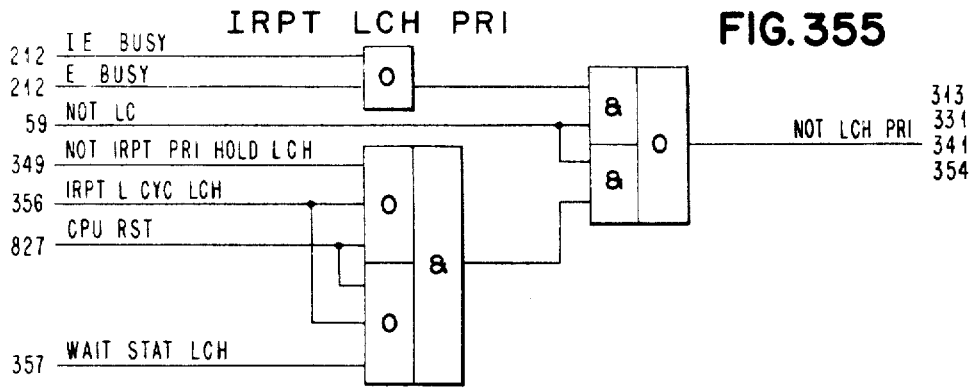

| | Sheet |
|---|---|
| (FIG. 1) System Illustration | 1 |
| (FIG. 2) Environmental System | 2 |
| (FIGS. 3a–5b) Component Circuits | 3 |
|   (FIG. 3a) Simple latch. | |
|   (FIG. 3b) Simplified illustration of latch of FIG. 3a. | |
| (FIGS. 3a–5b) Component Circuits | 3 |
|   (FIG. 3d) Illustrates inverter delay. | |
|   (FIG. 4a) Latch having a combined reset condition. | |
|   (FIG. 4b) Simplified illustration of latch of FIG. 4a. | |
|   (FIG. 5a) Latch. | |
|   (FIG. 5b) Simplified illustration of latch of FIG. 5a. | |
| (FIGS. 6a–8b) Component Circuits | 4 |
|   (FIG. 6a) Variation of latch shown in FIG. 5a. | |
|   (FIG. 6b) Simplified illustration of latch of FIG. 6a. | |
|   (FIG. 7a) Operation of AND-invert circuit. | |
|   (FIG. 7b) Operation of OR circuit. | |
|   (FIG. 8a) Two Input exclusive-OR circuit. | |
|   (FIG. 8b) Simplified illustration of circuit of FIG. 8a. | |
| (FIG. 9) Selection Circuits | 5 |
| (FIG. 10) Storage Input Circuits | 6 |
| (FIG. 11) Storage Output Circuits | 7 |
| (FIGS. 12–59) are illustrative of said environmental system | 8–38 |
| (FIG. 60) Check Stop Timing | 39 |
| (FIGS. 61–67) are illustrative of said environmental system | 40–43 |
| (FIG. 68) I Unit Scan | 44 |
| (FIG. 69) E Unit Scan | 45 |
| (FIGS. 70–71) are illustrative of said environmental system | 46–47 |
| (FIG. 72) E Unit Data Flow (1) | 48 |
| (FIG. 73) E Unit Data Flow (2) | 49 |
| (FIG. 74) I Unit | 50 |
| (FIG. 75) CR+ADR | 51 |
| (FIGS. 76–307) are illustrative of said environmental system | 52–225 |
| (FIG. 308a) CH IRPT SEL | 226 |
| (FIG. 308b) CH INST SEL | 226 |
| (FIG. 309) CH PRI CTRL | 227 |
| (FIG. 310) CH DEC | 227 |
| (FIG. 311) CH IRPT PRI | 228 |
| (FIG. 312) CH IRPT RSPS | 228 |
| (FIG. 313) CH IRPT Out | 229 |
| (FIG. 314) SEL CH | 230 |
| (FIG. 315) CH IRPT Mask | 230 |
| (FIG. 316) CPU REL | 231 |
| (FIG. 317) CPU Unit ADR | 231 |
| (FIG. 318) CH/CPU Connections | 232 |
| (FIG. 319) MODAR | 233 |
| (FIG. 320) TIM–CH PRI | 233 |
| (FIG. 321) RETRY | 234 |
| (FIG. 322) SAP/STR PRI | 234 |
| (FIG. 323) SUP Call PRI | 234 |
| (FIG. 324) A/B IRPT | 235 |
| (FIG. 325) I IRPT FM I | 235 |
| (FIG. 326) IRPT PRI | 236 |
| (FIG. 327) E PGM PRI | 236 |
| (FIG. 328) EXT IRPT | 236 |
| (FIG. 329) IRPT PRI LOGIC | 237 |
| (FIG. 330) IRPT PSW ADR | 238 |
| (FIG. 331) CONS IRPT | 239 |
| (FIG. 332) IRPT SET/INH | 239 |
| (FIG. 333) E/I IRPT LCHS | 240 |
| (FIG. 334) IRPT SET PSW | 240 |
| (FIG. 335) CH IRPT RESP | 241 |
| (FIG. 336) CH IRPT REL | 241 |
| (FIG. 337) IC/RCVY REQ | 241 |
| (FIG. 338) MCH CHK CTRL | 242 |
| (FIG. 339) MCH CHK TIME | 242 |
| (FIG. 340) MCH CHK | 242 |
| (FIG. 341) EXT SIG LCHS | 243 |
| (FIGS. 342–345) EXT IRPT PAR | 244 |
| (FIG. 346) IRPT CYC 1 | 245 |
| (FIG. 347) IRPT CYC 2 | 245 |
| (FIG. 348) IRPT CYC 3 | 246 |
| (FIG. 349) IRPT PRI Hold | 246 |
| (FIG. 350) IRPT CYC 4 | 247 |
| (FIG. 351) IRPT CYC 5 | 247 |
| (FIG. 352) IPL BFR | 248 |
| (FIG. 353) IRPT CYC 6 | 248 |
| (FIG. 354) Timer ADV REQ | 248 |
| (FIG. 355) IRPT LCH PRI | 249 |
| (FIG. 356) IRPT L CYC | 249 |
| (FIG. 357) Wait Status | 249 |
| (FIG. 358) IRPT CTRLS | 250 |
| (FIG. 359) IRPT Code 1 | 251 |
| (FIG. 360) IRPT Code 2 | 252 |
| (FIG. 361) IRPT Code 3 | 252 |
| (FIGS. 362–876) are illustrative of said environmental system | 253–643 |

(2.0) REFERENCES

A primary reference in understanding the full environment of the present invention is an architectural description, or definition, of a system in which the present invention is embodied. This comprises a manual entitled "IBM System/360 Principles of Operation," a copy of which is available in the Scientifific Library of the U.S. Patent Office, "IBM Form No. A22-6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl, et al.

An input/output channel device which is adapted for use in said environmental system is disclosed in a copending application of the same assignee entitled Automatic Channel Apparatus, Ser. No. 357,369, filed Apr. 6, 1964, by L. E. King, et al.

A core storage device is shown in a copending application of the same assignee entitled Storage Drive Sense System, Ser. No. 445,306, filed Apr. 5, 1965 by Anatol Furman.

A bipolar latch, used throughout said environmental system, is described in detail in an article by O. J. Bedrij, entitled Gated Trigger With Bipolar Set, IBM Technical Disclosure Bulletin, vol. 2, No. 6, April 1960, page 50 (a copy of which is available in the Scientific Library of the U.S. Patent Office).

A binary trigger is referred to in particular in Section 5. This trigger is described in detail in Section 11b of a copending application of the same assignee entitled Parallel Memory Multiple Processing, Variable Word Length Computer, Ser. No. 332,648, filed Dec. 23, 1963, now Patent No. 3,270,325, by R. S. Carter and W. W. Welz.

Binary-decimal addition is described in a copending application of the same assignee, Ser No. 223,431, entitled Byte Processing Unit, filed Sept. 13, 1962 by Robert Keslin. A shifter is described in a copending application of the same assignee, Ser. No. 162,477, Proportional Space Matrix Printer, filed Dec. 27, 1961, now Patent No. 3,174,427, by Richard L. Taylor.

Additional references include the following copending applications of the same assignee as in this case, each of which forms a part of, and is illustrated in, the environmental system, which is entitled Large Scale Data Processing System:

Large Scale Data Processing System, Ser. No. 445,326, filed Apr. 5, 1965, by O. L. MacSorley et al., now abandoned.

Large Scale Data Processing System, Ser. No. 609,238, filed on Jan. 13, 1967, by O. L. MacSorley et al., said application being a continuation-in-part of Ser. No. 445,326.

Storage Reference Priority in a Data Processing, Ser. No. 445,316, filed Apr. 5, 1965, by L. J. Hasbrouck et al., now abandoned.

Storage Reference Priority in a Data Processing System, Ser. No. 609,239, filed Jan. 13, 1967, by L. J. Hasbrouck et al., said application being a continuation-in-part of Ser. No. 445,316.

Unit Unavailability Detector for a Data Processing System, Ser. No. 445,318, filed Apr. 5, 1965, now Patent No. 3,341,824, by W. P. Wissick et al.

Rate Control in an Asynchronous Device Storage Accessing Apparatus, Ser. No. 445,319, filed Apr. 5, 1965, now abandoned, by W. P. Wissick et al.

Rate Control in an Asynchronous Device Storage Accessing Apparatus, Ser. No. 609,254, filed Jan. 13, 1967, by W. P. Wissick et al., said application being a continuation-in-part of Ser. No. 445,319.

Storage Cancellation and Panel Data Key Fetching in a Data Processing System, Ser. No. 445,311, filed Apr. 5, 1965, now abandoned, by W. P. Wissick et al.

Storage Cancellation and Panel Data Key Fetching in a Data Processing System, Ser. No. 609,252, filed Jan. 13, 1967, by W. P. Wissick et al., said application being a continuation-in-part of Ser. No. 445,311.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT whereas said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said Manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed description herein, the signals which propagate between various figures are all identified by unique lines which are referred to in the upper case (such as SAR meaning the output of the storage address register, CPU RST being the line that causes a computer reset of a particular type). As is discussed more fully in Section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be reqiured to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in Section 7. The duration or phase of any specially-referred to cycle often differs from a basic machine cycle. The terms, when used, refer to the latched condition of event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 or Y≠0" could be generated by the OR of "VFL T1" with "Y≠0," or with "NOT Y EQ 0," or by ORing the bits of the Y REG to see that Y does indeed equal other than zero.

(4.0) BRIEF DESCRIPTION OF ENVIRONMENTAL SYSTEM (FIG. 2)

In FIG. 2, a block representation of said environmental system is shown to include a bus control unit (BCU) which is described in Section 6, and which provides data flow communication between the various units of the system, and provides controls for the storage devices. The operator controls, certain maintenance controls, and basic stop, start and reset controls are provided in the power distribution unit (PDU) described in Section 21. The system also includes an I unit, the data flow portion of which is described in Section 9, the main other functions of the unit being described in separate sections. The clock is shown in Section 7, and includes the main timing pulses which are utilized throughout the system so as to synchronize operations. In Section 10, instruction sequencing is described, and instruction fetching is described in Section 11. Branching operations, and their effect on the remainder of the system are all described in Section 12. Communication with channels, and performance of certain supervisory type instructions, inter alia, are described with respect to an I execution unit (IE UNIT) in Section 13. Interruption handling, and functions which, although not interruptions, are handled by the interruption circuitry, are described in Section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in Section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

In FIG. 3a, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverter 5 will provide a signal $b$ to the AND circuit 2 so that a +X signal, whenever it may arrive, will cause the AND circuit 2 to activate the OR-INVERT circuit 1 thereby generating a —Y signal. If the +X signal is removed, then the —Y signal will disappear. The —Y signal causes the inverter 4 to generate the +Y signal which is fed back to an AND circuit 3; however, so long as the —LC pulse is present, the AND circuit 3 will not operate, so that the circuit of FIG. 3a is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3a to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3d) when the circuit of FIG. 3a will have no output whatever. This is of too short a duration to be illustrated in FIG. 3c which shows the operation of the latch of FIG. 3a in general terms.

The circuit of FIG. 3a is illustrated herein as shown in FIG. 3b. Thus, the circuit of FIG. 3a can be considered to be a latch circuit 6 settable by an AND circuit 7 at NOT L time, to be reset at L time.

In FIG. 4a is shown a variation of a latch having a combined reset condition which, as shown in FIG. 4b includes X or NOT Y. Notice that the AND circuit 1 in FIG. 4a has a minus D signal applied thereto which represents a NOT D as illustrated by the AND circuit 2 in FIG. 4b. Also notice that the AND circuit 3 in FIG. 4a has both X and applied Y signals thereto so that the latched effect will be ended by the disappearance of —X or by the disappearance of +Y. This is illustrated as resetting in response to either X or NOT Y by the OR circuit 4 in FIG. 4b. A still further complicated latch is illustrated in FIG. 5a. This includes an AND-INVERT circuit 1 which passes a signal through an inverter 2 (the output of which then would be positive when the conditions to the AND-INVERT circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

The latch of FIG. 5a can be reset by the CPU RST signal, or by the raw output of the AND INVERT circuit 1 as applied to an AND circuit 4. The circuit of FIG. 5a would be illustrated herein as shown in FIG. 5b, wherein an AND circuit 5 will either set or reset the latch in dependence upon whether the conditions are met, due to the asssistance of an inverter 6. Notice also that single-input AND circuits such as the AND circuit 7 in FIG. 5a actually represent merely an input to the OR INVERT circuit, as illustrated by the direct application of the scan signal to the OR circuit 8 in FIG. 5b.

Figure 6B:
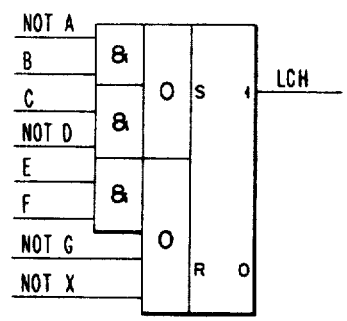

A variation in the circuit of FIG. 5a is shown in FIG. 6a, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6b, which represents the manner of illustrating this circuit herein. As seen in FIG. 6b, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

In FIG. 7a, an AND INVERT circuit with minus inputs is shown to create a +W signal. This is fully equivalent to the circuit of FIG. 7b wherein a positive, non-inverting OR circuit responds to positive XYZ signals to generate a positive W signal.

Figure 8B:
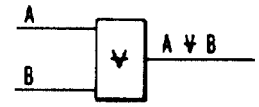

FIG. 8a is a simple illustration of a two input EXCLUSIVE OR circuit, which is represented herein as shown in FIG. 8b. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuit" is utilized to mean a complex of EXCLUSIVE OR circuits which test for oddness and evenness of the inputs thereto. These may be actually manifested in two input EXCLUSIVE OR circuits as shown in FIG. 8a, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6a, it may be a NOT signal, as illustrated by the NOT G signal shown in FIG. 6b. Similarly, when applied to a resetting AND circuit such as the AND circuit 3 in FIG. 4a, a —X signal really becomes an X signal in terms of its logical connotation as illustrated in FIG. 4b. Also, the minus signals applied to the circuit of FIG. 7a in fact are plus signals when the function of that circuit is considered to be an OR circuit. For that reason, the simplified showing of the present embodiment (such as illustrated in FIGS. 3b, 4b, 5b, 6b, 7b and 8b) do not consider whether a plus or minus signal may be generated at the source of a signal, or whether that signal may be generated in true or complement form, since such considerations have no bearing on the way in which the signal may be utilized. However, at the input to any particular circuit (such as the input to FIG. 6b) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3a and 3b where both phases are generated in 3a, and only the affirmative phase is generated in 3b, the complement thereto being implied.

(6.0) BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 6.1, 6.2 and 6.3, respectively of previously referred to application Ser. No. 609,238.

(7.0) CLOCK CIRCUIT

(7.4) Clock circuit

References herein to FIGS. 56–59, 61 and 62, refer to figures in said application Ser. No. 609,238.

Figure 60:
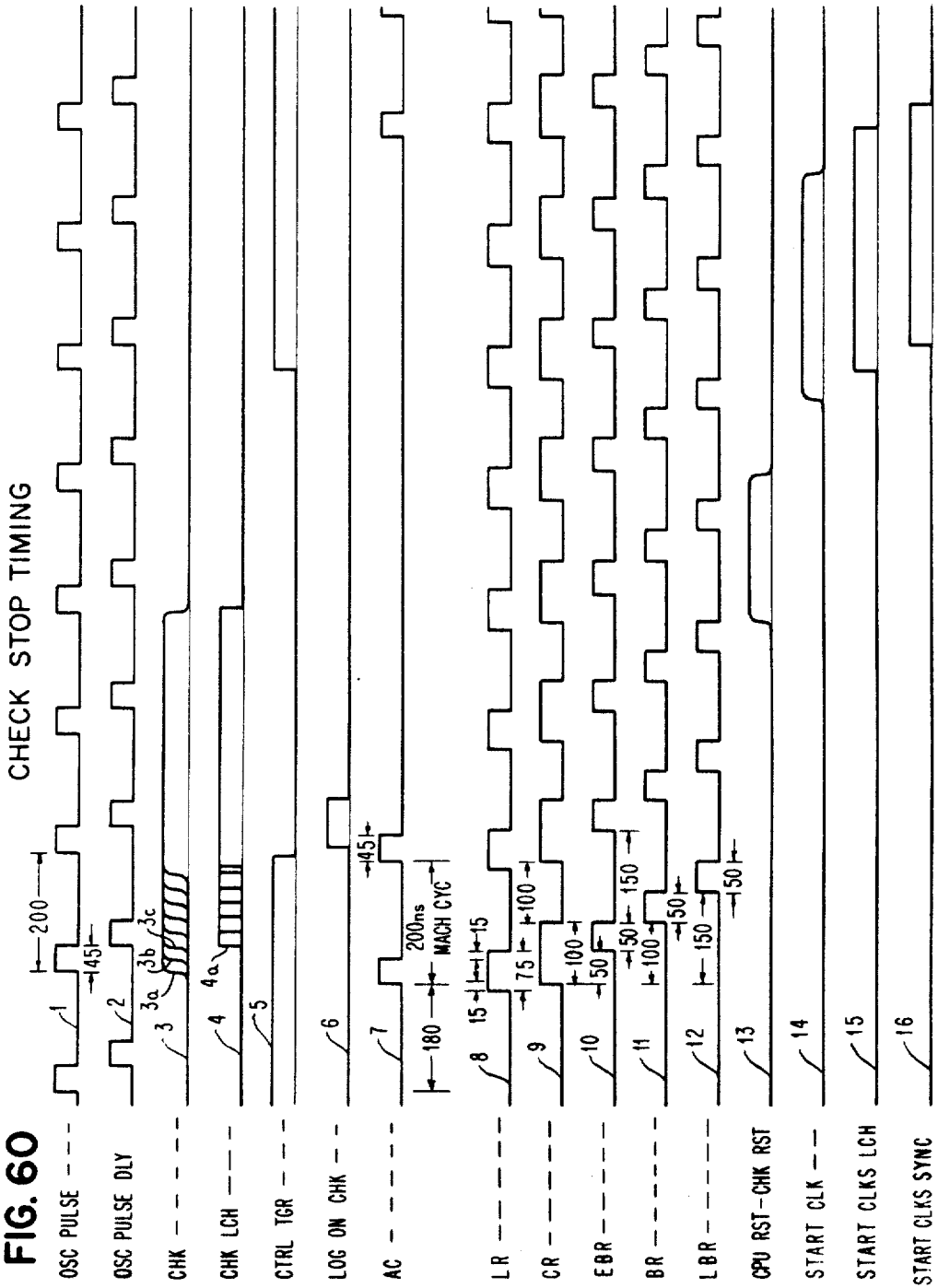

The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through FIG. 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the GATED RUNNING PULSE line. These signals are utilized to generate the actual timing signals as shown in FIG. 59.

Whenever the clock has to be stopped because of error signals which gives rise to a check condition it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60) is set up so that A time begins prior to the time when any of these check signals could occur and the next A time described in Section 7.5) only during the nonoscillator pulse time. Thus, either of the first two check setting times (3a, 3b) will cause the check latch to be set at time 4a, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the ASC line in FIG. 56.

(8.0) SCAN

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistable devices.

(8.1) SCANNING INTO THE I UNIT (FIG. 68)

Figure 68:
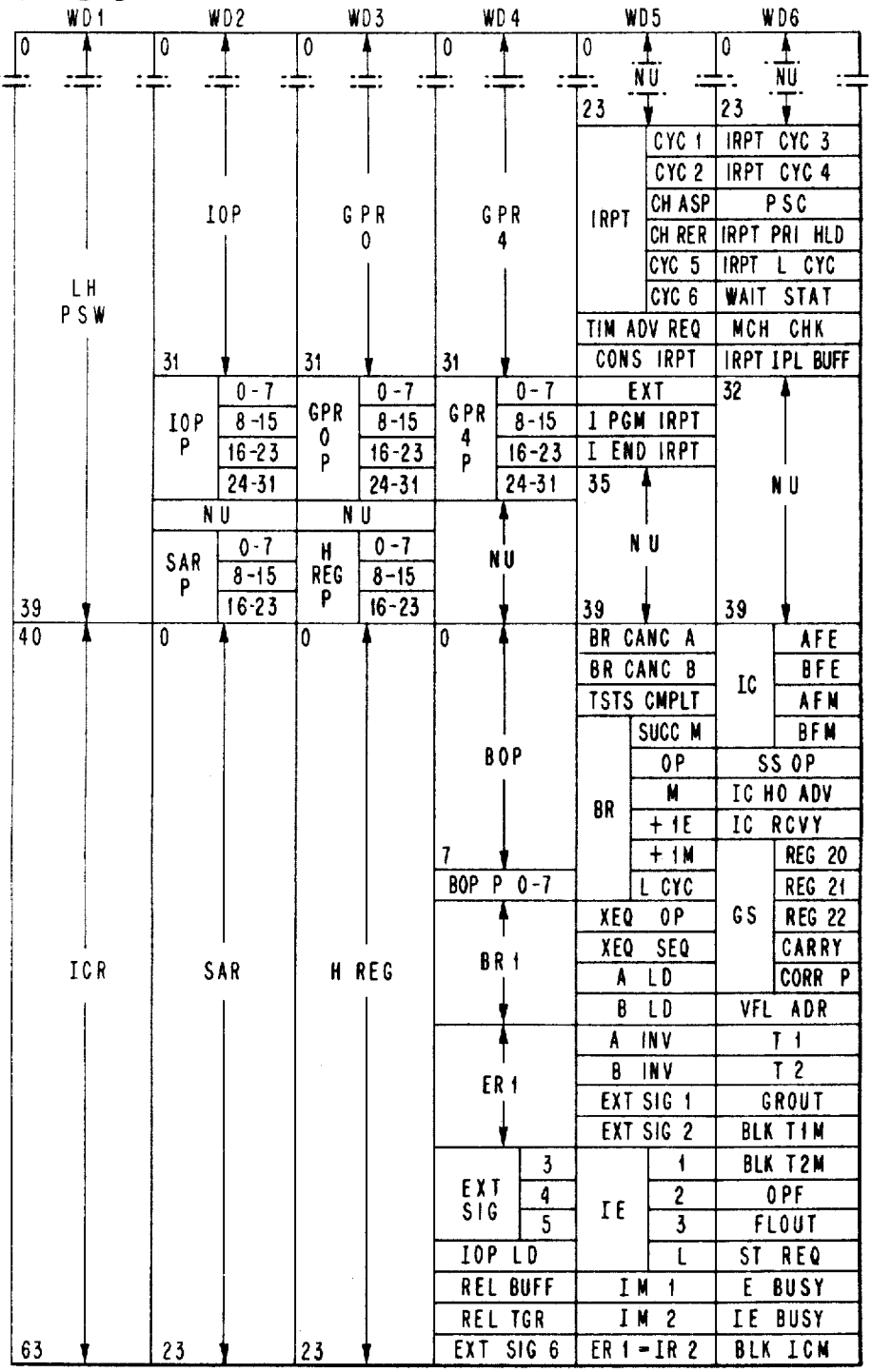

I unit scanning is illustrated in FIG. 68. Scanning into the I unit is controlled by six scan word cycles, each one of which causes a 63-bit word to be set into various latches and triggers of the machine. The first scan cycle is defined as word 1 (WD 1), which causes all 63 bits of the J register to be loaded into the PSW register, bit for bit, as shown in FIG. 68. In word 2 of the scan, bits 0–31 are loaded into the IOP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is twofold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIGS. 70 and 71 are merely illustrative of the manner in which scanning signals may be applied to the circuits of this embodiment.

(8.2) SCANNING INTO THE E UNIT (FIG. 69)

Figure 69:
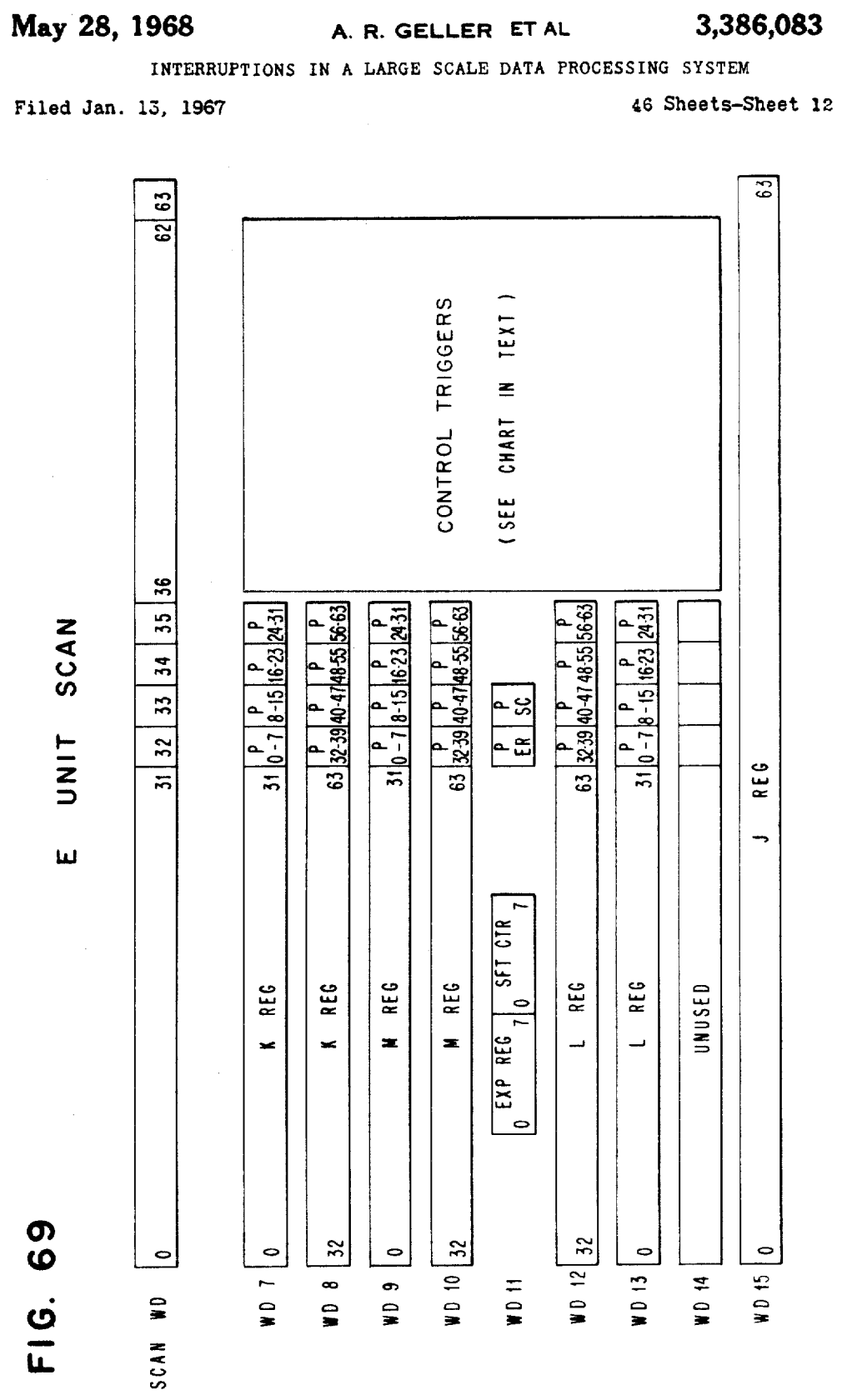

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

E SCAN-IN CHART—WORD 7

Bit trigger:
36 J0–7 EA
37 J0–63 MA T/C
38 J0–31 MA T/C
39 J32–39 EA
40 JL32 MA T/C
41 J For Parity MA T/C
42 K0–63 MA
43 KR4 MA
44 KL2 MA
45 DC8
46 DC4
47 DC2
48 DC1
49 DB0
50 DB1
51 DB2
52 DB3
53 DB P
54 QUOT OVFLO
55 QUOT SIGN OVFLO
56 QUOT INSRT VALID
57 QUOT INSRT Z QUOT
58 QUOT INSRT DIV TRUE

(9.0) INSTRUCTION UNIT DATA FLOW

As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flow" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in Sections 9.1 et seq., followed by individual descriptions of main portions thereof. The block diagrams of the first section show the same matter as the block diagrams of the second section, but the purpose and approach of the drawings differs. In studying the circuitry in detail, the second section should be utilized; to get an idea of how instructions are handled in this system, the drawings of the first section should be utilized.

(9.1) GENERAL INTRODUCTION TO I UNIT DATA FLOW

Figure 72:
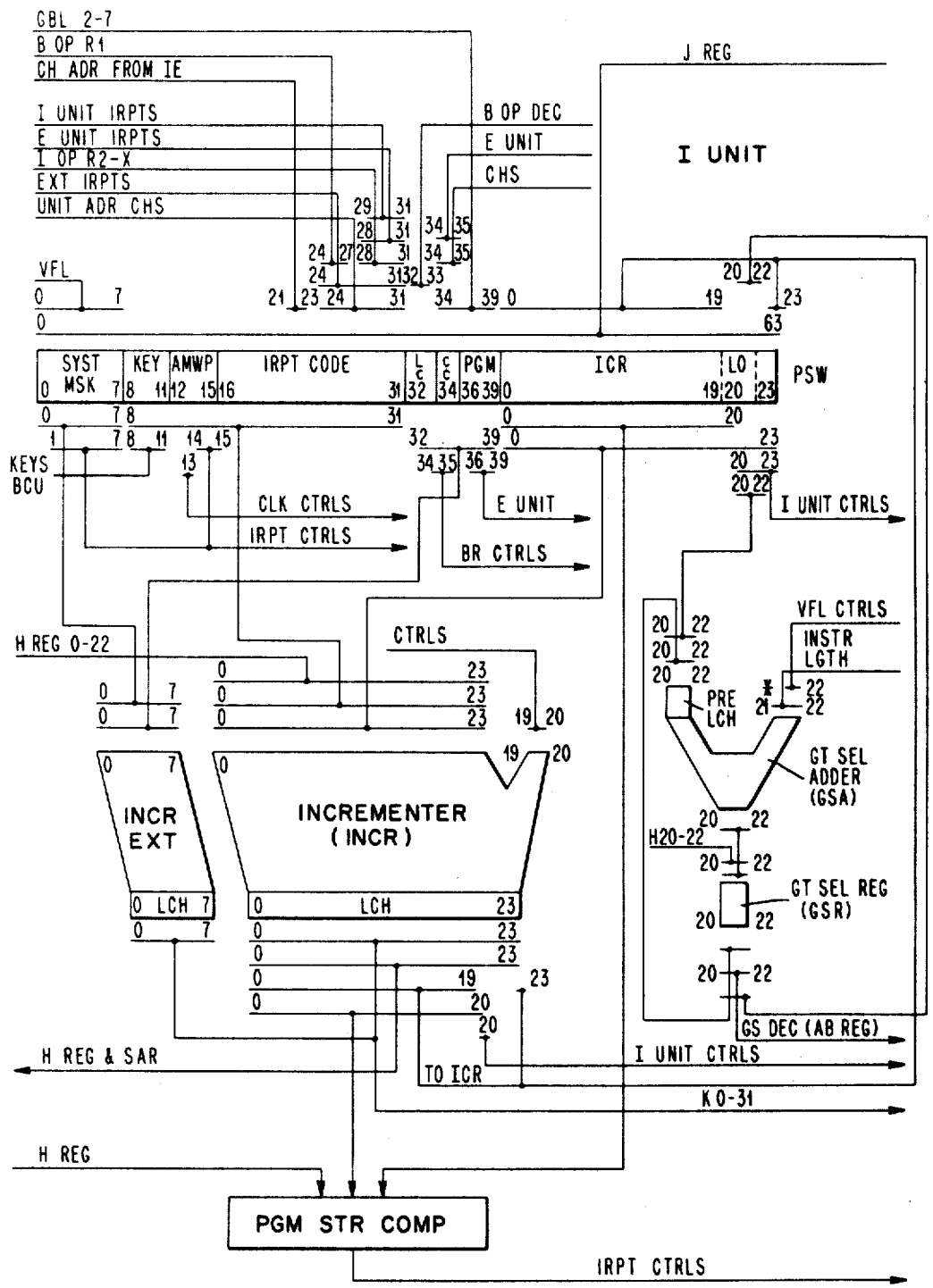
Figure 73:
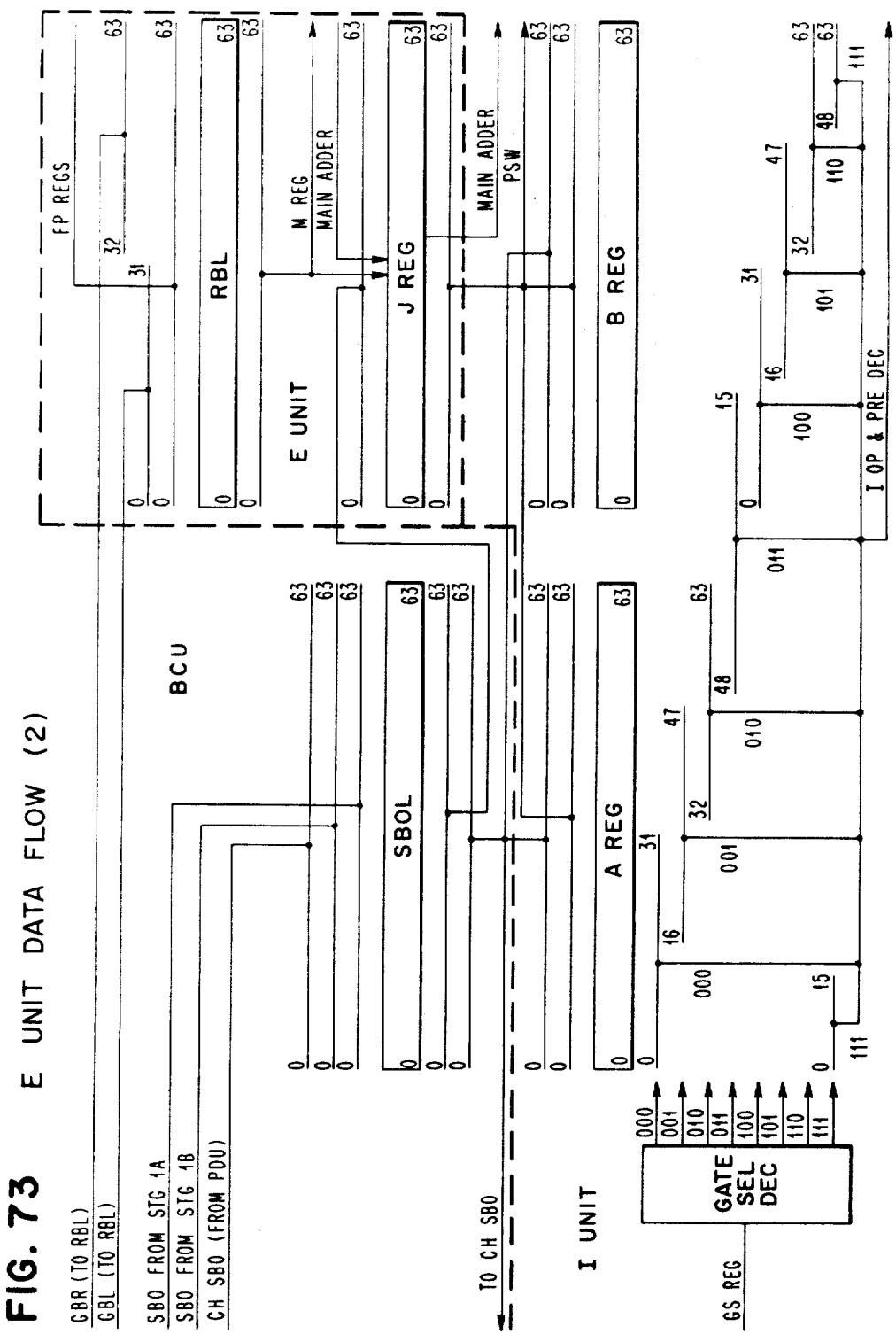
Figure 74:
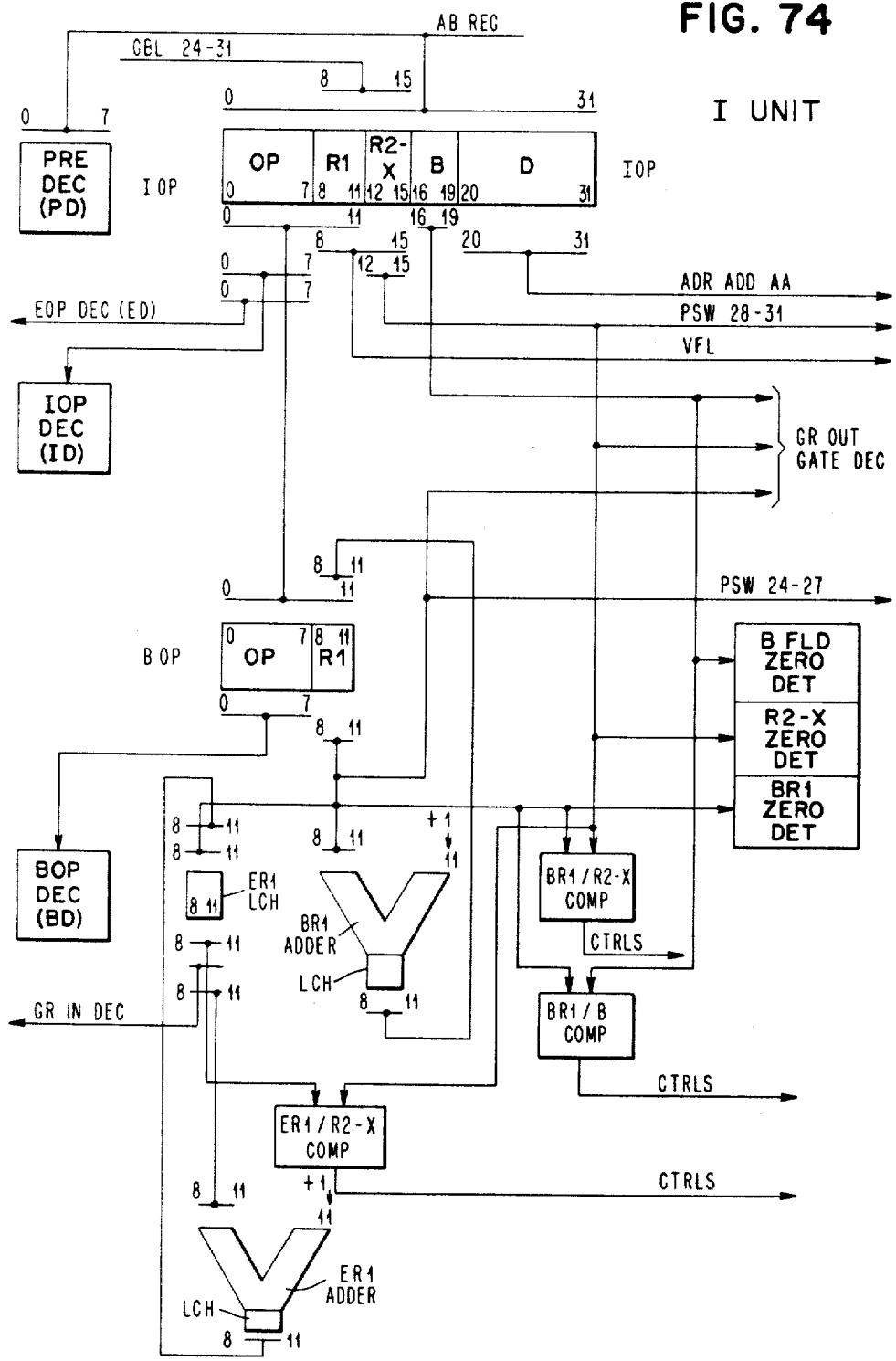
Figure 75:
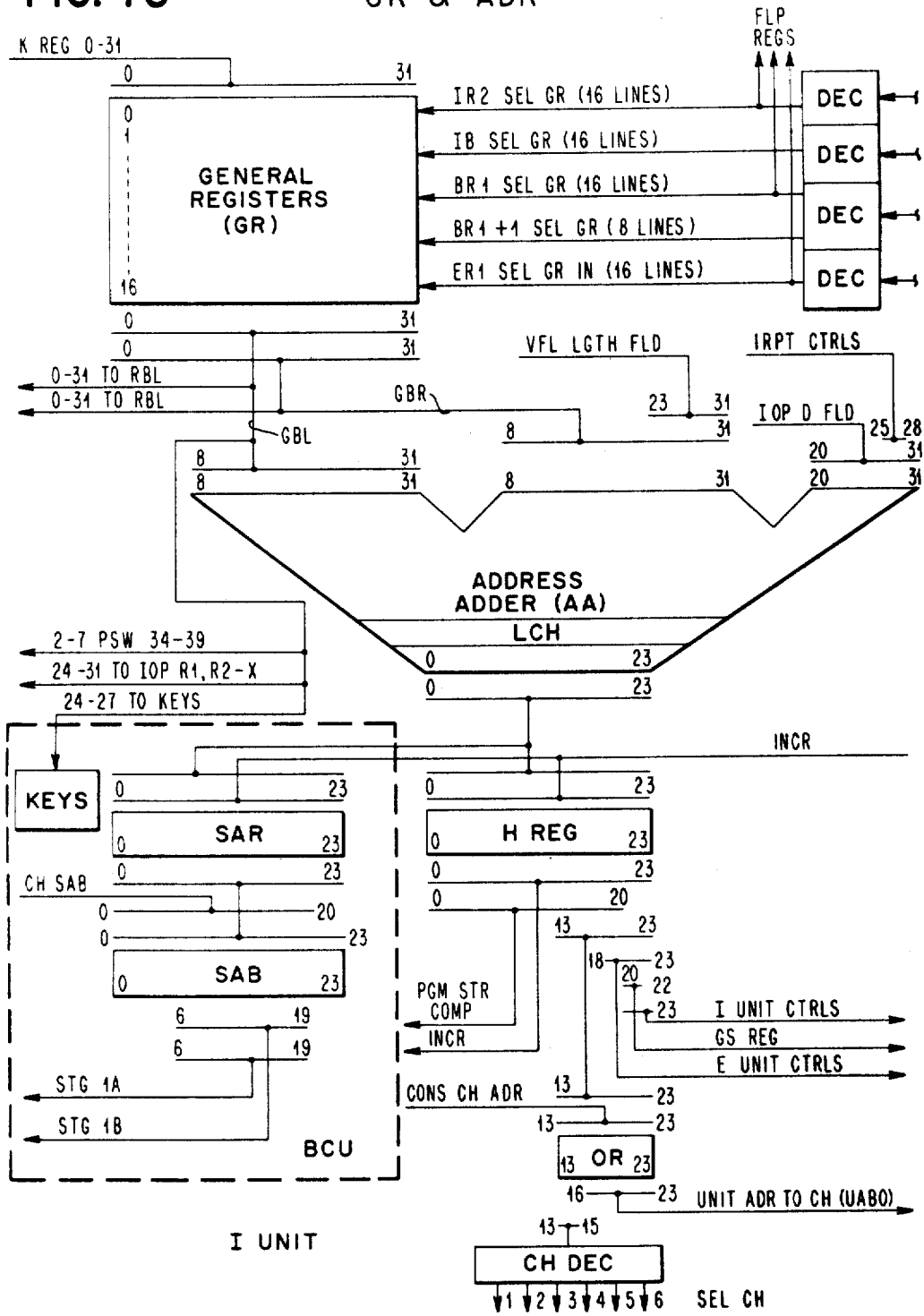

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in Section 9.1.1;

Instruction input paths shown in FIG. 73 and described in Section 9.1.2;

Instruction decoding shown in FIG. 74 and described in Section 9.1.3;

AND instruction utilization shown in FIG. 75 and described in Section 9.1.4.

(9.1.1) *Instruction selection (FIG. 72)*

In the upper central section of FIG. 72 is shown the program status word register (PSW). This register is shown in detail in FIG. 131 through FIG. 139 of application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDITION CODE (CC), the PROGRAM MASK (PGM), and the instruction counter register (ICR), including a low order portion thereof (LO). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154. The output of the INCR may be returned to the ICR and may also be applied to the SAR (storage address register) and the H REG (H register, a backup for the storage address register), as well as to a PGM STR COMP (program store compare circuit) and to the high order half (K 0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in Section 9.1.2. Since each instruction has at least two bytes, any addressing of storage is on a byte basis, the lowest ordered bit (23) of the ICR is not utilized in selecting instructions from the AB REG; thus, only bits 20–22 are involved in the gate select mechanism. The GS mechanism is shown in FIG. 156 through FIG. 162 of application Ser. No. 609,238.

(9.1.2) *Instruction input paths (FIG. 73)*

The output of the gate select register (GSR) in FIG. 72 is applied to a gate select decode circuit GS DEC (AB REG) so as to select the correct 32 bits at one time out of the AB register (A REG, B REG). The AB register is utilized as a buffer register for instructions which are fetched from storage so as to insure that there is always one instruction available for processing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1B) over the storage bus out (SBO), or on the channel storage bus out (CH SBO) including data from the power distribution unit (PDU, which includes the maintenance channel). All data so received are stored in the storage bus out latch (SBOL), instructions being transferrable directly to the AB register, and all data, including instructions, being transferrable to the channel storage bus out or to the J register (J REG). Instructions may be temporarily placed in the J REG if they have not been fetched by a certain time in an instruction fetch cycle, and will thereafter be transferred to the AB register provided that a branch has not been occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefor, are shown in FIG. 76 through FIG. 80 of application Ser. No. 609,238.

(9.1.3) *Instruction decoding (FIG. 74)*

The 32 bits from the AB register are applied to the IOP register as shown in FIG. 74. This register includes an operation portion (OP), an R1 field, an R2–X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2–X, and B are used to specify general purpose registers, the contents of which are involved in the execution of the instruction. The R1 field, however, is utilized from the BOP register rather than from the IOP register controlling selection of the general registers. Each of these fields is also tested for zero in order to determine special situations where no general register is to be utilized in accordance with the architectural definition of a data processing system in said System/360 Manual. The B field of the IOP register is applied to the addressing adder (AA) as a component of a storage address for all instructions which reference storage, the addressing adder being shown in FIG. 79 of application Ser. No. 609,238 which the R1 portion of the BOP register also applies to an ER1 register which provides R1 information later in a cycle. The ER1 register is so called because it provides R1 information to the E cycle rather than to the I cycle.

In FIG. 74 various comparison circuits are shown which compare ER1 with R2–X, BR1 with R2–X, and BR1 with B. The purposes of the various comparisons are described in conjunction with the circuits which utilize them. The instruction decoding circuits are shown in detail in FIG. 76 et seq. of application Ser. No. 609,238.

(9.1.4) *Instruction utilization (FIG. 75)*

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in 114 et. seq. of application Ser. No. 609,328. Other inputs to the address adder include a VFL LGTH FLD (VFL length field), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in FIG. 72 through FIG. 75 is illustrated, both in block diagram form, and in detail, in figures relating thereto, described hereinafter.

(10.0) INSTRUCTION SEQUENCING

(10.1) INTRODUCTION

Instruction execution in the system is performed in two parts: an I time and an E time. The timing for a typical RX instruction is shown in FIG. 248 of application Ser. No. 609,238 (see said System/360 Manual for details of an RX instruction).

I time (instruction time) is further broken down into two parts to perform "instruction handling," which includes the generation of storage addresses, and the gating of operands to the execution units from the general registers (GR's) or from the floating point registers (FPR's). The first part of I time is defined by the control trigger T1. The second part is defined by another control tigger, T2. When the T1 and T2 cycles have been completed, the proper execution unit or units may be started. Both T1 and T2 may be repeated, as necessary, until the aforesaid functions are completed.

E time (execution time) is accomplished within different areas: the E unit, the IE Unit and the branch (BR) Unit. All instructions require the use of at least one execution unit, and some require the concurrent use of two execution units.

The following instructions use both the E unit and the IE Unit:

ISK
    SSM
    LM
    STM

The following instructions require the BR unit as well as the E unit:

BALR (if R2≠0)
    BCTR (if R2≠0)
    BCT
    BAL
    BXH
    BXLE

When an execution unit is started, the I time control triggers begin their functions on the next instruction, overlapping the operation of the executive unit.

The T1 cycle is used to generate storage addresses when required. When this is completed, a logical control called TON T2 (turn on T2), which is developed from many conditions described in detail hereinafter, will initiate operand fetches from storage and set the T2 control trigger. During the T2 cycle, internal operands contained in either the general registers or floating point registers are gated to the execution unit. When the necessary conditions have been met, another logical control line called I to E FER will cause the execution unit to start, unless an interruption has occurred.

While execution units are performing the actual functions of one instruction during a related E time, their "busy" state is recorded in control triggers located in the I unit. The last machine cycle for the E time conditions a turn off for a related busy trigger, IE BUSY or E BUSY; THE BRANCH UNIT USES THE ie busy TRIGGER TO INDICATE THE BUSY STATUS OF THE br UNIT. Since the I time for one instruction is allowed to overlap (occur simultaneously with) the execution of a previous instruction, interference which could occur for many instructions is avoided by generating various "blocks" which control the following instruction. Blocking can occur to either part (T1 or T2) of the overlapped I time, and may be removed at various points during the handling of a current instruction. It is advantageous to allow instruction handling to proceed to a point which just precedes causing interference with instruction execution. By providing two points at which blocking of the I time functions of the next instruction is employed, a variable degree of overlap is obtained, which provides versatility necessary for maximum instruction handling speeds.

(11.0) INSTRUCTION COUNTER CONTROLS (FIG. 72 THROUGH FIG. 75)

The incrementer and gate select circuits control the normal advancing of the instruction counter and the normal fetching of instructions.

Instructions fetched from storage are buffered in either the A or the B register before being set into the IOP register for initial execution. (See FIG. 72 through FIG. 75.) The instruction counter register (ICR) contains 24 bits (numbered 0 through 23) and is advanced by means of two adders: the gate select adder for advancing the low order portion IC LO (bits 20–22) and the incrementer for advancing the instruction counter high order portion ICHO (the remaining bits). The gate select adder works in conjunction with the gate select register (GSR) to select gates from the A and B registers to the IOP register.

(11.1) INTRODUCTION

All instructions are executed in two parts: an I time and an E time. I time of one instruction may be overlapped with E time of the previous instruction. The instruction counter controls, while advancing the setting of the gate select register GSR, also maintain the ICR with a proper address for interrupt purposes.

The IC controls also generate the instruction fetch addresses and make normal IC fetches. The addresses are generated by adding, in the incrementer, an appropriate, small increment amount to the ICR. The IC controls attempt to make an IC fetch as soon as an empty instruction buffer (A or B REG) condition is detected, but any instruction in the process of execution may block out IC fetches if an IC fetch would cause interference with the instruction execution. If the IC fetches are continuously blocked by instruction executions, the I unit ultimately will exhaust all instructions in the buffers. At this time, the IC block will drop, allowing IC fetches to be made and instruction execution to resume. Normally the instruction buffers will not be exhausted before IC fetches are made. However, special logic has been incorporated to insure that, except in unique situations, both buffers are not emptied. In other words, fetches relating to executions take priority over instructions fetches until the A and B registers no longer have a full instruction left; then, one instruction fetch is allowed notwithstanding the need for operands.

First there is a physical description of the IC data flow. IC addressing, advancing, fetching and recoveries are discussed, in that order.

(12.0) BRANCHING

(12.1) BRANCH OPERATIONS

(12.1.1) *Introduction to branch controls*

In this system, branch fetches (i.e., fetches of instructions which are themselves the subjects of branch instructions) are made at TON T2 in the same way as are operand fetches. For branch fetches, however, return addresses are generated for both the J register and the A register or the B register, whichever is appropriate to the branch-to address: if bit 20 of the address is zero, the fetch is returned to A; if bit 20 of the address is one, the fetch is returned to B.

Since two instruction buffers register (A, B) are provided, branch instructions also initiate a fetch to fill the second buffer. This fetch, which is obtained from the storage location following the location of the subject instruction, is called the branch-plus-1 (BR+1) fetch. The address for this fetch is computed during T2 of the branch instruction. The BR+1 fetch request is normally made at the I to E transfer. A return address for this fetch is generated for the register of the AB buffers opposite to the register designated for the branch fetch.

At some predetermined time of the branch execution a tests complete (TSTS CMPLT) latch is turned on. During this cycle a branch successful (BR SUCC M) line attains a value according to whether or not the branch was successful.

If the branch operand returns before TSTS CMPLT of any branch, the operand is inhibited from gating into the AB register; but in any case, the branch operand is returned to the J REG. If a successful branch is detected during TSTS CMPLT, and the branch operand has already been loaded into the J REG, the branch operand in the J REG is then gated to the proper half of the AB register by TSTS CMPLT. If the branch operand returns after TSTS CMPLT has been turned on, the returning operand is gated into the proper register of the AB buffers if, and only if, the branch is successful; if not, the operand is put to no use whatever.

The branch+1 fetch is always made at a time late enough so that the operand returns *after* TSTS CMPLT has been turned on. If the branch is successful, the BR+1 operand is gated into the appropriate half of the AB register upon its return. If the branch is unsuccessful the BR+1 operand is blocked upon its return, and in fact is put to no use whatever.

If a branch is unsuccessful, normal processing of the next instruction effectively starts at the same time as TSTS CMPLT is turned on. If a branch is successful, the subject instruction effectively starts as soon as the instruction is available in the AB register. During TSTS CMPLT of *successful* branches, the gate select register is updated to the subject address, and the ICR is then set on the cycle following TSTS CMPLT.

The following sections contain detailed discussion of the branch fetch, the branch-plus-1 fetch and the methods of terminating successful and unsuccessful branches. Certain features unique to each branch are also discussed when these features have an impact on the aspects of branching which are being discussed.

For the three RR format branches (Branch on Condition (BCR), Branch and Link (BALR), and Branch on Count (BCTR)) no branch is ever made if the R2 field is zero. If the R2 field is zero in a BCTR instruction, the E unit is utilized to decrement the contents of the general register specified by R1. If the R2 field is zero in a BALR instruction, the E unit is utilized to store the right half of the PSW in general register R1. If the R2 field is zero in a BCR instruction, the IE unit is utilized to perform a NO OP. In all of these, the branch unit is *not* started and no branch fetches are made. Therefore, these instructions are not considered to be branches when R2=0, in the following sections.

The Execute instruction (XEQ) is processed by branch controls and, therefore, is included whenever a general reference to "branches" is made.

(13.0) I UNIT EXECUTION

I unit execution comprises the performance of actual data manipulation within the I unit (rather than within the E unit). The functions executed within the I unit are primarily channel instructions and supervisory type instructions such as setting the program and the system mask, loading the PSW, setting or inserting keys, and diagnose. In addition, the IE unit cooperates with the E unit on the performance of multiple load and store operations. The IE unit comprises essentially a control section (FIG. 277 et seq.) of application Ser. No. 609,238 and a channel communications section (FIG. 308b et seq.) of application Ser. No. 609,238.

(14.0) INTERRUPTIONS

(14.1) INTERRUPTION HANDLING

The sections hereunder describe the response of the system to both internally and externally generated interruption signals.

Interruptions are first defined in general terms; then the individual signals are further defined, classified, and assigned servicing priorities consistent with basic architectural criteria set forth in said System/360 Manual and the implementation plan of the present embodiment. The detection of interruptions and the means by which interruption processing is initiated are examined next, followed by detailed descriptions of the specific sequences associated with each type of interruption. Actual circuits are described in sections hereunder.

(14.1.1) *The interruption fixed sequence*

Interruptions can be generally defined as those signals which cause the CPU to suspend (or interrupt) normal instruction processing and enter into a fixed-sequence routine. Their purpose is to change the CPU state according to certain specified conditions which may arise inside or outside of the system.

In general, the fixed sequence consists of storing the old PSW, which contains an interruption code field defining the cause of the interruption, and fetching a new PSW with which to continue processing. Those interruption signals which result from the detection of program exceptions normally follow this sequencing pattern. A number of other situations, however, such as machine malfunctions, instruction recoveries, the Supervisor Call instruction, timer advance requests, and the initial program load (IPL) procedure also rely on utilization of the interruption system and may cause the fixed sequence to be specifically modified. These cases are not really interruptions, but since they are treated as interruptions by the CPU, they are considered as such for purposes of further discussion.

(14.1.2) *Interruption classification*

The architectural definition of a system in said System/360 Manual discusses interruptions and assigns permanent storage locations for the PSW's stored and fetched during interruption processing.

These interruptions, and also those conditions which are treated as interruptions are classified according to the signal source and their relationship with normal instruction processing. With the exception of two cases, which are handled in an individual manner, interruptions fall within three classes, as set forth in the following enumerated paragraphs.

(1) *Interrupt from I.*—The first class, I IRPT FM, I, represents those program-caused interruptions detected solely in the I unit during T1 and T2. These interruptions signify that no valid instruction execution may follow. The instruction is suppressed and the fixed-sequence interruption routine is conditioned. Examples of interruptions in this category are those caused by an invalid instruction address, an invalid operation code, and the Supervisor Call instruction.

(2) *E interrupt from E.*—Another class, E IRPT FM E, represents those program interruptions detected solely in the E unit during the execution of an instruction, such as, for instance, overflows, divide checks and invalid data addresses. All E IRPT FM E cases are E unit program interruptions (E PGM IRPTS).

(3) *E interrupt from I.*—The final class, E IRPT FM I, is more general than the others and represents those interruptions which are associated with execution-end detection but are observed strictly within the I unit interruption controls. These signals mainly occur asynchronously with respect to CPU processing. Included are signals external to the CPU, such as Console Interrupt, I/O Interrupt, and Timer Advance Request, as well as internal interruptions such as Invalid Store Address (CPU INV STR).

(4) *Exceptional cases.*—The two remaining cases, which do not belong in any of the above classes, are the machine check interruption and IPL PSW loading. Since a machine check does not evolve from normal processing, it cannot be assigned to any of the three foregoing classes. During the IPL procedure, interrupt sequencing is used to fetch and check the PSW and to start CPU processing. Both of these cases *follow CPU resets* and are *initiated* by controls external to the interruption apparatus, although they utilize said apparatus.

(5) *WAIT.*—In addition, the running-waiting status of the machine is monitored by circuits within the interruption apparatus.

(14.1.3) *Interruption*

(14.1.3.1) PRIORITY ASSIGNMENTS AND CLASSES

Since it is possible for several interruption signals to occur during the same instruction, a priority selection system is necessary to provide exclusive servicing privileges for only one interruption at a time. In addition, E PGM IRPT and I PGM IRPT must be assigned priorities within their classes since more than one may arise concurrently. E PGM IRPT's are weighted by the E unit such that the interruption controls service only one interruption for a given instruction. The weighting of I PGM IRPT is discussed later in this section.

Because of overlapped operation, the I unit is one sequential instruction ahead of the E unit, and therefore, all program interruptions associated with E unit executions take precedence over *all* other interruptions detected during normal processing. Note that CPU SAP and CPU INV STR may relate to E unit execution.

(14.1.3.2) INTERRUPTION PRIORITY GROUP DESCRIPTIONS

Each priority level group is discussed in this section with respect to the action taken by interruption controls and, where appropriate, the reasoning upon which the priority assignment is based. The interruptions are described in detail in said SYSTEM/360 Manual.

(1) *Machine check.*—This interruption causes a Machine Old PSW to be stored with an all-zero interruption code and a Machine New PSW to be fetched. Since it always follows a CPU reset, *the incidence of all other interruptions is precluded,* and it automatically acquires top priority.

(2) *IPL load PSW.*—Following the I/O operation which loads storage, the Initial Program Load PSW is fetched. Since no other interruptions can occur at this time, IPL also occupies the top priority position along with MCH CHK.

(3) *Storage address protection.*—Of all the program-caused interruptions, this has highest periority. When the program attempts to store into a protected area of storage, the BCU signals with a CPU SAP check. This is forwarded to the interruption controls and causes the exchange of Program PSW's with the Protection code stored in the interruption code of the old PSW. The high priority granted this interruption stems from the fact that it is frequently futile to determine which Store instruction is associated with the interruption. Accordingly, the length code bits in the old PSW are set to zero.

(4) *Invalid store address.*—This BCU interruption causes an exchange of Program PSW's after the Addressing interruption code first is set in the old PSW. If both CPU SAP and CPU INV STR occur on the same storage operation, the storage transfers only CPU INV STR, and does not send an ADVANCE, so no CPU SAP can be received. Therefore, if both signals, are simultaneously present *in the interruption controls,* the CPU SAP must be associated with a previous instruction or a previous storage request within the same instruction, and it will therefore receive priority.

(5) *E program interruptions.*—All interruptions discovered during an E unit execution belong in this category (E IRPT FM E). The interruption codes applicable to this class include: Addressing (relating to operands), Specification (only decimal types relate to the E unit), Data, Fixed-Point, Overflow, Fixed-Point Divide, Decimal Overflow, Decimal Divide, Exponent Overflow, Exponent Underflow, Significance, and Floating-Point Divide. As stated hereotfore, although several E PGM IRPTs (E IRPT FM E) may occur on the same execution, only one is selected for transmittal to the interruption controls. A single E IRPT FM E control line and the appropriate interruption code bits provide all the necessary inputs for servicing these exceptions. If priority is granted to an E IRPT FM E, the interruption code bits will be set into the PSW when the interruption handling begins, at the end of the fixed sequence.

(6) *External interruptions.*—Of the non-program-oriented interruptions, EXT IRPTS are granted highest priority and include Timer (count completed), Console, and six external signals (which can relate to anything the user desires). The interruption code consists of an independent bit for each EXT IRPT source, and External PSW's are exchanged (store old, fetch new). If there are concurrent interruptions under this priority class, all appropriate code bits are set. Note that a TIM IRPT can only occur following a TIM ADV REQ (outlined below) and, therefore, has virtual priority over all other interruptions.

(7) *Timer advance request.*—The Timer word is fatched from storage using the interruption sequence controls normally used for PSW fetches. The actual advance of the Timer comprises decrementing the timer word which is performed in the E unit, and which also stores the Timer word at the address previously calculated by the I unit. Following the advance, the interruption controls are again initiated and a Timer interruption may be recorded if the value in the timer storage word has changed from positive to negative as a result of the updating.

(8) *Input/output (channel) interruptions.*—If any of the channels have interruptions pending, and CH IRPT's have current priority, Input/Output PSW are stored and fetched and an interruption code for identifying the particular channel and unit address is set into the old PSW before it is stored. Individual CH IRT CH IRPT priorities are determined in the IE unit (I execution area of I unit).

(9) *Recovery.*—This condition (RCVY) is observed during the last cycle of the execution and signfies, to the I unit controls, that undesired data is contained in the AB register. The recovery situation exists (a) when data is stored into a storage word which has already been fetched, as detected by a program store comparison and (b) following an Execute instruction which does not reach a branch instruction. These conditions are called "recovery only" (RCVY ONLY) implying that PSW exchanges are *not* to be made. The recovery situation also exists following the loading of all new PSW's, which occurs after the LOAD PSW instruction and following the interruption fixed sequencing: in the former case, the IE unit, which performs the LOAD PSW function, conditions the recovery. The recovery process involves fetching an intsruction from the address designated by the instruction counter. Note that any execution interruptions will take priority over the recovery so that the IC fetch is deferred until a new ICR value is obtained in a new PSW.

(10) *I program interruptions.*—Because of overlapped I–E operation, I PGM IRPTs are associated with the instruction following the current one. Therefore, priority is granted to I PGM IRPT's only if there are no outstanding interruptions due to current instructions.

Tests are made during I unit T1 time to detect invalid *instruction* addressing, invalid syllable resolution (erroneous boundary specification) of the instruction address, and invalid operation codes. If more than one of these is concurrently present, they are asigned priority in the order listed. During T2, further examinations are made for Privileged-Operations (provided the CPU is not in Monitor Mode), and Execute instruction which is the subject instruction of another Execute, or a Specification violation involving either the R1 or R2 fields or the operand effective address calculated during T1. Of these, the first two are mutually exclusive and are granted the same priority, which is higher than that for Specification. Any T1 interruption blocks any T2 interruption from affecting its processing. Program PSW's are exchanged in all cases with the appropriate interruption code stored in the old PSW, before the exchange.

(11) *Supervisor call.*—This instruction results in the exchange of Supervisor Call PSW's with the interrupt code field containing the R1 and R2 fields from BOP and IOP, respectively. It is exclusive of all other T2 interruptions (e.g., PGM IRPT) and is not processed if a T1 interruption occurs. The purpose of this instruction is primarily to permit exchanging a new, monitor-mode PSW for the old, problem-mode PSW.

(14.1.4) *Interrupt sequence initiation*

The CPU may enter into interrupt sequencing through three primary "routes": as a result of an execution last cycle (ELC) test for E IRPT FM E (which is developed in the E unit) and E IRPT FM I signals gated by CTRL L CYC; at the normal I to E transfer when an I IRPT FM I has been detected; or through forced entrance, such as a MCH CHK interruption or an IPL load PSW operation.

A secondary entrance route is provided by a test for additional outstanding interruptions during the last cycle of the interruption processing sequence itself, gated by IRPT L CYC.

Reference is made to the general timing chart, FIG. 362, throughout the discussion of the sections hereunder.

Certain interruption conditions are masked by bits contained in the PSW; i.e., the mask bit of a particular interruption must be a 1 or the interruption will be ignored by the CPU. The following table lists the masks which affect interruptions either directly or through other logical areas.

(14.1.4.1) EXIT—E LAST CYCLE TEST

During a control last cycle (CTRL L CYC), which represents the absolute last cycle of both the I and E execution areas (ELC, IEL, BR L CYC), any interruption signals of the E IRPT FM E and E IRPT FM I classes are observed. If one or more are found to exist, the execution interrupt trigger, EXIT, is turned on. EXIT means the "exciting" from normal sequencing, the "exciting" occurring as a result of an E IRPT FM E or an E IRPT FM I, sensed at CTRL L CYC.

Also at this time, several block conditions are set to insure breakaway from normal processing and commencement of the fixed interruption sequence. Breakaway is effected by blocking all of the following: the start signals to the execution units, updating of the ICR, changing of the length code in the PSW, and requests to storage.

Additionally, an interruption priority hold (IRPT PRI HOLD) trigger is set at the turn-on of EXIT. Its purpose is to eliminate interferences from other interruptions which may arise while the current one which caused EXIT is being serviced. These other possibly-interfering interruptions are CH IRPT's, which are directly blocked by the latched output of IRPT PRI HOLD in the IE unit, and timer advance requests and asynchronous external interrupts, which are deferred by blocking, with LCH PRI, the setting of the bipolar latches which are used as outputs of their respective interruption triggers. When IRPT PRI HOLD is turned off near the end of the interruption sequence, these latches are permitted to set and consideration is given to those interruptions present during IRPT L CYC. E PGM IRPT's cannot interfere because they would have occurred in time for the CTRL L CYC test, and EXIT blocks I IRPT FM I processing. Therefore, E time interruptions are exclusively presented to the fixed sequence controls following EXIT.

Except in the case of recovery-only conditions, EXIT leads directly into interrupt cycle 1 (IRPT CYC 1) of the fixed sequence at which time the interruption code bits are set into the interruption code field of the old PSW and an interrupt reset (IRPT RST) prevents the I unit from continuing with normal processing.

(14.1.4.2) IRPT FM I TEST

If an interruption condition is detected during T1, the interruption code bits (see preceding section) corresponding to the highest priority interrupt are set into the PSW at TON T2. The I PGM IRPT trigger is also set to *block* any T2 interrupts from affecting the code bits and this trigger is also used for later PSW address calculations. Later, the I IRPT END trigger is set at the I to E transfer for entrance into the interrupt fixed sequence. Note that some interruptions are sensed at T1, but are not acted upon until I to E XFER.

For the case where no interruptions are present during T1 but are detected during T2, *both* I PGM IRPT and I IRPT END are set at I to E transfer, and the code bits associated with the highest priority T2 interruption are set into the PSW. Except for the fact that the code bits have been preset, I IRPT END then functions similarly to EXIT as an I unit sequencing reset (via IRPT RST) and as a set condition for IRPT CYC 1. Executions and storage requests are blocked in the event of an I IRPT FM I. Either I IRPT END or EXIT, depending which is set, is turned off at the start of interrupt sequencing by IRPT RST, when no CPU storage request is outstanding. The I PGM IRPT trigger remains on until the completion of the fixed sequence and is then reset by IRPT END RST, which is caused by IRPT CYC 5.

(14.1.4.3) FORCED ENTRANCE

Forced entrance into the interrupt sequence, for processing machine check interrupts and IPL load PSW, is attained by direct turn-on of IRPT CYC 1. Any processing interference by asynchronous signals, such as TIM ADV REQ and I/O (or CH) IRPT, is prevented.

(14.1.4.4) INTERRUPTION LAST CYCLE TEST

The IRPT L CYC test closely resembles that made during a CTRL L CYC.

Certain interrupts of the E IRPT FM I class (CH IRPT, TIM ADV REQ, TIM IRPT, CONS IRPT, and other external signals) are observed and may again set EXIT and be processed according to established priority.

(14.1.5) *Interruption sequencing*

(14.1.5.1) NORMAL SEQUENCING

The general interruption processing plan (FIG. 362 of Application Ser. No. 609,238) consists of seven sequence triggers. They control the storing, loading and checking of PSW's and either the return to normal processing or the recycling of interruption processing to service additional outstanding asynchronous interruptions. Other control triggers are used to handle channel communications on I/O interruptions, timer updating, and irregular sequencing, such as the PSW fetch during an IPL procedure.

Both PSW fetches and PSW stores reference *even* storage locations, which results in serial, rather than interleaved, storage timeout patterns. By fetching the new PSW to the J register *before* storing the old PSW, the timeout of storage for the store operation may be overlapped with a parity check on the new PSW.

IRPT CYC 1 and IRPT CYC 2 administer the fetch operations which will return a new PSW to the J register. During IRPT CYC 1, the new PSW address, encoded according to the highest priority interruption signal, is gated through the address adder (AA) into the storage address register (SAR) to meet the fetch request at the turn-on of IRPT CYC 2. IRPT CYC 1 is always one machine cycle in length; IRPT CYC 2 stays on until the fetch accept is received from the BCU.

IRPT CYC 3 and IRPT CYC 4 proceed with the store operation for the old PSW. During IRPT CRC 3 the store address is sent to SAR through the AA and the right half of the PSW (RH PSW) is flushed through the incrementer (INCR) to the high-order section of the K register (K HO). A store request is initiated at the turn-on of IRPT CYC 4 while manipulations are performed to move the remainder of the old PSW into the K REG. This is accomplished by setting a trigger in the E unit, which shifts K HO to K LO (K REG low order), while gating the left half PSW (LH PSW) through the INCR to K HO. IRPT CYC 4 then holds up until the *store* accept comes from the BCU, which follows the fetch timeout and restarting of storage. Meanwhile, the fetched PSW returns to the J register where it also awaits the *store* accept which will allow it to be set into the PSW register. Once the *store* accept arrives, the interruption controls are no longer concerned with storage. Since the PSW's are located within a protected area of storage, the protection keys are inhibited during the PSW store operation.

IRPT CYC 5 and IRPT CYC 6 are used to control checking of the new PSW and to reset the interrupt triggers being serviced (IRPT END RST). Checking is accomplished by gating both halves of the PSW through the INCR and sampling the error line. The channel interruption mechanism is reset to allow for changes in the system mask (PSW bits 1–6). All program interrupt triggers are reset at this time and IRPT PRI HOLD is reset to allow the established priorities to change. If any interruptions are still outstanding they will be observed during the last cycle test, EXIT will be set and the CPU will proceed directly through another interruption sequence.

At the turn-on of IRPT L CYC, a CPU recovery is initiated. All blocks of I unit controls, which are established earlier in the sequence (during EXIT or I IRPT END), are removed to allow processing to continue normally.

The interruptions which are processed by pattern as described in this section are:

(1) E program interruptions
(2) I program interruptions
(3) BCU (CPU INV STR and SAP)
(4) External (Timer, Console, etc.)
(5) Supervisor Call instruction (14.1.5.2) I/O SEQUENCING The processing of CH IRPT's (I/O or channel interruptions) departs from normal sequencing only in that a pause is injected between IRPT CYC 1 and IRPT CYC 2 (*before* the fetch request is made), during which the channel originating the interruption performs its own interruption routine, as shown in FIG. 363 of Application Ser. No. 609,238. The unit address bits used as the old PSW interrupt code are not available until the channel has completed its processing, as indicated by receipt of a CH REL signal, but are set into the PSW when processing resumes with IRPT CYC 2.

When a CH IRPT has top priority (established during EXIT) a channel interrupt response (CH IRPT RSP) trigger is set coincidently with IRPT CYC 1. This trigger remains on (although IRPT CYC 1 turns off on the advent of the next A clock pulse) and serves as a "go" signal, for the channel to service its interruption.

When the channel has completed this processing, it transmits a channel release (CH REL) signal to the interruption controls. The CH REL signal turns on a one-cycle CH IRPT REL trigger which conditions interrupt controls for resumption of the normal interrupt sequence. The CH IRPT RSP trigger turns off at the same time as CH IRPT REL.

(14.1.5.3) TIMER ADVANCE REQUEST SEQUENCING

In the case of a TIM ADV REQ (FIG. 364) of Application Ser. No. 609,238, the interruption controls are used to fetch the timer word and to initiate a recovery. Actual updating takes place within the E unit under control of independent sequencers.

To initiate the updating process, a timer oscillator pulse which sends an INT TIM ADV signal (Interval Timer Advance) in the PDU, trips a single-shot to the interruption controls, causing the TIM ADV REQ trigger to be set. Priority is determined, as usual, during EXIT, and if the request for timer updating has priority, the timer word is fetched in the manner of a PSW.

At the end of IRPT CYC 2, a transfer is made to the E unit controls which wait for the timer word to return to the J register. Upon this transfer, the TIM ADV REQ trigger and the IRPT PRI HOLD trigger are reset to allow detection of other interruptions, when sequencing is resumed following the advance. When the J register is loaded, the data is transferred to the M register decremented in the MA and then sent to the K register. Meanwhile, a store request is made referencing the same address which was previously set into SAR for the timer fetch. A check of the contents of the K register is made following the *store* accept. Upon receipt of a control signal from the E unit and of the store accept, interruption processing continues. A recovery is pre-conditioned and IRPT L CYC is set.

(14.1.5.4) RECOVERY-ONLY SEQUENCING

Processing of PSC (program store compare) and XEQ OP (RCVY) situations (see FIG. 365 of application Ser. No. 609,238) is accomplished during the EXIT cycle by resetting the necessary controls in the I unit with IRPT RST and turning off the BLK TIM and BLK ICM triggers. No further interruption processing is required.

Note that all concurrent I unit detection of program interruptions is halted and is reset on RCVY priority as well as on all other execution interruptions. The PGM STR COMP and XEQ OP triggers are reset as the recovery is initiated.

(14.1.5.5) IPL LOAD PSW SEQUENCING

Those portions of the interruption controls which are capable of fetching and checking a PSW and of initiating a recovery are utilized as a part of the IPL procedure. Sequencing is initiated by an IE IPL START SEQ signal from the IE unit, which forces IRPT CYC 1 on FIG. 366. The usual fetch request is made, and IRPT CYC 2 stays on until the fetch accept is received. Then the normal sequence is broken (no store is to be made), with the IPL BUF (buffer) trigger filling the storage timeout gap. When the word returns to the J REG it is set into the PSW, and sequencing continues in a normal fashion with IRPT CYC 5.

(14.1.5.6) MACHINE CHECK INTERRUPT SEQUENCING

A MCH CHK interrupt is processed exactly as a normal interrupt except for the manner in which entrance is made to IRPT CYC 1. For this purpose, a trigger is used which has two outputs, a normal trigger line and an output which represents the *initial* L clock pulse following trigger turn-on. The latter signal, MCH CHK START, is used to set the interrupt code bits to zero and to turn on IRPT CYC 1; while the normal signal MCH CHK IRPT, sets the PSW address bits. The MCH CHK trigger is reset with IRPT END RST.

(14.1.6) *Wait status*

Bit 14 of the PSW indicates, when it is a one, that the CPU is in the wait state, rather than the running state. In the wait state the CPU does not execute instructions, but remains suspended until an interruption occurs. The only interruptions which may occur are External (Console, Timer, and external signals), and I/O. These interruptions initiate the interruption fixed sequence which results in the loading of a new PSW that may or may not change the running-waiting status of the CPU, depending on the value of bit 14 or the new PSW. In the wait state the timer is advanced normally without affecting the wait status.

Associated with the status bit in the PSW is a WAIT trigger within the interruption controls. This trigger reflects the true status of the CPU since there is a delay between the setting of the PSW wait bit and the halting of processing, and there is also a delay between the resetting of the wait bit and the resumption of normal operation.

After each setting of a new PSW, the wait bit is observed before normal processing may be continued. At the end of the LOAD PSW instruction, the wait bit prevents instruction fetching for the new ICR value and the WAIT trigger is set if no interruptions require servicing. At the end of every interruption sequence which fetches a PSW, the wait bit is again observed and, if it is a ONE, the WAIT trigger is set when no further interruptions are outstanding. Any of the interruptoin signals mentioned above arising in the wait status will reset the WAIT trigger and set EXIT which leads into the interruption fixed sequencing.

If the CPU is in the wait state and the HALT trigger is set, *all* processing is inhibited. This includes external and I/O interruptions and timer advances. All operation is deferred until the HALT trigger is reset, which is accomplished by setting the IRPT PRI HOLD trigger. When processing resumes, the highest priority interruption that is outstanding will be serviced.

(14.1.7) *Storage interlock*

An interlock is provided at the entrance to interruption sequencing for two reasons:

(1) If a *store* operation is in process, no interruptions may be handled until sufficient time is allowed for a SAP check to return. This avoids premature termination of the protection interruption.

(2) If a *fetch* is outstanding, sufficient time must be allowed before entering the interruption routine in order to nullify the effects of the returning word. This is accomplished by the CPU COMM-BUSY line (from the BCU) which designates that the CPU has a storage operation in process. The interlock is provided during the setting of EXIT and I IRPT END which remain on until the BCU control drops.

(14.2) INTERRUPTION CIRCUITRY

The sections hereunder describe circuits which implement interruption handling in this system as briefly described in Section 14.1. The first circuits to be described will be those relating to the entrance routes, that is, to the methods through which interruptions are actually recognized, masking effected, priorities determined, proper fixed-sequence starting latches set, and so forth. As described in above sections, E unit execution interruptions must take precedence over I unit interruptions due to the fact that the E unit is one instruction ahead of the I unit. This does not hold for external interruptions, timer advance requests, input output interruptions, machine check and initial program loading due to the fact that these are asynchronous with respect to the I unit and the E unit, or, as in the case of the machine check, no further sensible processing can take place in any event. It is to be noticed that E unit interruptions are recognized by CTRL L CYC, which exactly spans one machine cycle, whereas I unit interruptions of the I IRPT FM I type are recognized at the I to E transfer, which occurs from the second half of a T2 cycle to the first half of the following cycle. Thus, priority as between these interruptions is settled by the fact that CTRL L CYC appears a half cycle before I to E XFER. Thus, at a given instant of time, as far as normal interruptions are concerned, the interruptions sense that CTRL L CYC would normally have precedence. This is where the discussion of the circuitry begins.

(14.2.1) *Entrance, priorities, and masking*

Due to the fact that the recognition in the interrupt circuitry of a particular interruption is achieved in conjunction to some extent with masking and with establishment of priorities, circuits directly related with the establishment of the interruption 6 sequence include to some extent all three of these factors. Therefore, the discussion in the sections hereunder which request priorities, and then describe the actual receipt of interruption signals and the effect caused thereby.

(14.2.1.1) ABSOLUTE INTERRUPTION PRIORITIES (TABLE)

In the system, the effect of having to recognize an E unit interruption of a first instruction which is being executed prior to recognizing an I unit interruption of a following instruction which is being prepared for execution, the absolute priority which necessarily relates to machine check (failure-oriented) and initial program loading of the PSW, the definitions of interruption priorities as set forth in said System/360 Manual, and all other factors are resolved by the assignment of absolute priority to the various interruptions. The absolute priority assignments take into account the timing of the system, and all other factors which must be considered.

| Absolute Priority | Interruption | Class | Where Pri Granted |
|---|---|---|---|
| 1 | Machine Check (MCH CHK) | (Exceptional) | None. |
| 2 | IPL LOAD PSW | (Exceptional) | None. |
| 3 | Stg. Adr. Protection (CPU SAP) | E IRPT FM I | FIG. 322. |
| 4 | Inv. Store Adr. (CPU INV STR) | E IRPT FM I | FIG. 322. |
| 5 | E Program (E PGM IRPT) | E IRPT FM E | FIG. 328. |
| 6–8 | External: (EXT IRPT) | E IRPT FM E | FIG. 328. |
| 6 | (1) IRPT KEY (CONS IRPT) | E IRPT FM I | None. |
| 7 | (2) Timer (TIM IRPT) | E IRPT FM I | None. |
| 8 | (3) 6 External Signals (EXT SIG) | E IRPT FM I | None. |
| 9 | Timer Adv. Request (TIM ADV REQ) | E IRPT FM I | FIG. 320. |
| 10 | Input/Output (CH IRPT) | E IRPT FM I | FIG. 320. |
| 11 | E Recovery (RCVY) | E IRPT FM I | FIG. 326. |
| 12 | I Program (I PGM IRPT) | E IRPT FM I | FIG. 330. |
| 13 | Supervisor Call (SUP CALL) | E IRPT FM I | FIG. 323. |

NOTE.—CPU SAP will be handled by either I IRPT END or EXIT, in preference to any other IRPT which may have set either of them.

The absolute priority of various instructions is set forth in the preceding table, wherein priority assignments 6–8 relate to external interruptions, which are shown there due to the individual manner in which these are handled, although there is no difference between the CONS IRPT, TIM IRPT, and EXT SIG.

(14.2.1.2) EFFECTIVE INTERRUPTION PRIORITIES AND ENTRANCE ROUTES (TABLE)

There are four different distinct cycles within the operational timing of this system wherein interruptions may actually be sensed for the purpose of acting thereon. These are: CTRL L CYC, IRPT L CYC, I TO XFER (sensed at either T1 or T2), in that order of priority. The various interruptions (and non-interruption functions which are handled by the interruption circuits) are set forth in the following table, highest priority being at the top of the table, and descending to lowest priority at the bottom of the table.

CTRL L CYC—EXIT—B IRPT
    E IRPT FM E and E IRPT EM I
      (includes all except I IRPT FMI, below)
IRPT 1 CYC—EXIT—A IRPT
    ASYNCHRONOUS E IRPT FM I
      EXT IRPT
        CONS IRPT
        TIM IRPT
        EXT SIG
      TIM ADV REQ
      CH IRPT (I/O)
I TO E XFER—I IRPT END-
    T1—I PGM IRPT types of I IRPT FM 1
      INV ADR (relating to instruction address)
      SPEC (relating to instruction address boundary)
      INV OP
    T2—I IRPT FM I
      I PGM IRPT
      PRIV OP (if PSW 15=0)
      XEQ TO XEQ
      SPEC (relating to R1, R2 or operand address of T1)
      SUP CALL (SVC instruction)

(14.2.1.3) A IRPT GROUP AND B IRPT GROUP (FIG. 326, FIG. 327, FIG. 320, FIG. 324 AND FIG 328)

In FIG. 324, THE B interrupt group, which includes all interruptions with priorities from 1 through 11 (which can be seen in the chart of Section 14.2.1.1 to comprise all interruptions except I IRPT FM I) this group is manifested by a signal on the B IRPT line by an OR circuit 1 which is responsive to signals relating to priority groups 1–4, 7–8, 9–10 and 11. These signals appear on IRPT PRI 1–4, IRPT PRI 5–8, IRPT PRI 9–10, and IC RCVY REQ lines. Similarly, an OR circuit 2 generates a signal on the A IRPT line, which signal indicates the asynchronous 1's of the B IRPT FM I group of interruptions; as seen in the chart of Section 14.2.1.1, this comprises the external interruptions (CONS IRPT, TIM IRPT, EXT SIG), timer advance requests and input/output interruptions (CH IRPT). The OR circuit 2 responds to the signal on the IRPT PRI 9–10 line and to a signal on a EXT IRPT line.

The IRPT PRI 1–4 line is energized in FIG. 327 by an inverter 1 in response to a signal on a NOT IRPT PRI 1–4 line in response to an AND circuit 2, the inputs to which comprise signals indicating the absence of the various interruptions having priorities between 1 and 4. Specifically, the AND circuit 2 is responsive to signals on the NOT CPU SAP, NOT CPU INV STR, NOT MCH CHK IRPT, and NOT IPL LCH lines. The output of the AND circuit 2 is also applied to an AND circuit 3 which responds as well to a signal on an E IRPT LCH line from the E unit, so as to recognize the case where there is an E program interruption (E IRPT FM E, with priority of 5) and no interruptions of any higher priority.

The AND circuit 3 indicates that the E program interruptions have the highest priority by generating a signal on the E PGM IRPT PRI line.

In FIG. 320, a signal is generated on the IRPT PRI 5–8 line by an inverter 1 in response to a signal on a NOT IRPT PRI 5–8 line which is generated by an AND circuit 2. The AND circuit 2 responds to signals on the NOT EXT IRPT and NOT E IRPT FM E lines. Thus, the signal on the IRPT PRI 5–8 line is indicative of either an external interruption or an E unit interruption present at the input to the AND circuit 2.

The circuit of FIG. 320 also supplies proper priority as between the external, timer, and channel interruption by means of a pair of AND circuits 3, 4, which can operate only if there is a signal present on the NOT IRPT PRI 5–8 line. The AND circuits 3, 4 also require a signal on the NOT IRPT PRI 1–4 line to indicate that no priority later than that of the external interrupts is outstanding. The AND circuit 3 responds to a signal on the TIM ADV REQ LCH line to generate a signal on the TIM ADV REQ PRI line, indicating that there being no priority between 1 and 4, the timer advance has priority. The AND circuit 4 must also recognize that the timer advance has not been granted priority by means of a signal on a NOT TIM ADV REQ LCH line, and if all of these other inputs are present, then the AND circuit 4 can generate a CH IRPT PRI signal in response to a signal on a CH IRPT OUTST LCH line.

The signal on the IRPT PRI 9–10 line is generated in FIG. 326 by an inverter 1 in response to a NOT IRPT PRI 9–10 signal from an AND circuit 2 which in turn is responsive to signals on the NOT TIM ADV REQ LCH and NOT CH IRPT OUTST LCH lines. Thus, interrupt priority 9–10 will be provided if there is either a timer or a channel interrupt input to the AND circuit 2 in FIG. 326.

The output of the AND circuit 2 in FIG. 326 is also applied to an AND circuit 3 along with other priority signals on the NOT IRPT PRI 1–4 and NOT IRPT PRI 5–8 lines. If there is a signal input on a IC RCVY REQ line, then the AND circuit 3 generates a signal indicating that priority has been granted for instruction counter recovery on a RCVY PRI line.

The IC RSVY REQ signal is generated in FIG. 326 by an AND circuit 4 provided the IC recovery request latch is set as indicated by a signal on the IC RCVY REQ LCH line. The AND circuit 4 also requires, however, an input from an OR circuit 5 which may respond either to the absence of an execute instruction as indicated by a signal on the NOT XEQ OP LCH line, or to the output of an AND circuit 6 which recognizes that there is no I IRPT FM I outstanding by means of signals on the NOT 1 PGM IRPT LCH and NOT BD SUP CALL lines. Thus, although recovery is shown in the chart of Section 14.2.1.1 to have a priority of 11, recovery is not recognized in the interrupt circuit whenever there is an I IRPT FM I. The output of the OR circuit 4 is also applied to an inverter 5–7 so as to generate a signal on a NOT IC RSVY REQ line.

The external interrupt circuits are shown in FIG. 328, wherein a signal is generated on the EXT IRPT line by an OR circuit 1 in response to any one of three AND circuits 2–4, each of which requires an indication that bit 7 of the PSW register is equal to a 1 as indicated by a signal on the PSW 7 line. The reason for this is that no external interrupt may be taken unless the corresponding mask bit (PSW 7) is a 1. The external interruptions include external signals, the interrupt key on the console, and timer interrupts which result from a timer advance which has caused the setting of the timer storage word to change from a positive value to a negative value. These are recognized by the various AND circuits 2–4 in FIG. 328, by responding to signals on the EXT SIG IRPT OUTST, CONS IRPT LCH, and TIM IRPT TGR lines. Thus, if any of the three external type interrupts are present, the OR circuit 1 will generate the signal on the EXT IRPT line. This signal is also applied to an inverter 5 in FIG. 328 which generates a signal on the NOT EXT IRPT line. This signal is further applied to an AND circuit 6 in FIG. 328 which will generate a signal indicating that external interruptions have priority on a EXT IRPT PRI line provided that there is no interrupt priority 1–4 and no E IRPT FM E, as indicated by signals on the NOT IRPT PRI 1–4 and NOT E IRPT FM E lines.

In FIG. 324, in addition to the A IRPT and B IRPT signals, a signal indicating that there is an execution type of interrupt from the I unit is generated on a E IRPT FM I line by an OR circuit 3 which is responsive to signals on the IRPT PRI 1–4, EXT IRPT, IRPT PRI 9–10, and IC RCVY REQ lines. The machine check interruption and initial program loading of a PSW are first of all not interruptions, and secondly do not fall within the E IRPT FM I group; however, the manner in which the signal on the E IRPT FM I line is utilized is such that use of the IRPT PRI 1–4 signal creates no problems, and permits simplicity of circuit design. Thus, the OR circuit 3 recognizes all of the interruptions shown in the table of Section 14.2.1.1 except for E IRPT FM E (E program interruptions) and I IRPT FM I (I program interruptions and supervisor call).

In this section, there has been described the manner in which the A IRPT and B IRPT signals are generated, by means of recognizing interruptions of certain priority groupings, and individual interruption types, and there has also been described some of the circuitry related to that which generates the inputs for the A IRPT and B IRPT signals.

(14.2.1.4) TURNING ON OF THE EXIT TRIGGER (FIG. 358 AND FIG. 333)

The EXIT latch may be set either due to the fact that E last cycle (ELC) has been reached, and together with IE last cycle and branch last cycle has caused CTRL L CYC (control last cycle), or the EXIT latch may be set because of the fact that interrupt last cycle (IRPT L CYC) has been reached, and there is an asynchronous E IRPT FM I, which comprises external, channel, and timer advance type of interruptions.

The exit latch is turned on by a signal on a TON EXIT line which is shown at the top of FIG. 358 to be generated by an AND circuit 1. The AND circuit 1 senses the fact that interrupt priority hold is not on, thereby indicating that the system is no in the wait state with the pulse latch turned on. The interrupt priority hold latch is utilized to prevent even asynchronous interruptions from returning the system from the wait state into the running state, whenever the halt latch is set.

If there is a signal on the NOT IRPT PRI HOLD LCH line, the AND circuit 1 is free to respond to an OR circuit 2 which in turn is responsive to any one of three AND circuits 3–5. Each of these AND circuits indicates a different manner in which entrance into an interruption sequence governed by the exit latch may be made. The AND circuit 3 recognizes control last cycle with a B interrupt, the AND circuit 4 recognizes an interrupt last cycle with an A interrupt, and the AND circuit 5 recognizes than an A interrupt has occurred while the WAIT STAT LCH is on The TON EXIT signal is applied to an AND circuit 1 in FIG. 333 which will operate at A time (due to a signal on the AC line) to cause an OR circuit 2 to set a latch 3. The output of the latch 3 is reflected in a bipolar latch 4 at the start of not L time due to the effect of the complement controlled L clock signal applied to the bipolar latch 4 on a NOT LC line. The output of the bipolar latch 4 comprises a signal on the EXIT line. The OR circuit 2 may also be set by scan control signals because of an AND circuit 5 which responds to signals on the J REG 32 and SC GT WD 5 lines, which causes the AND circuit 5 to operate if there is a 1 in bit 32 of the J register during word 5 of a scan operation. The latch 3 is reset by an OR circuit 6 in response to a signal on the CPU RST line, or in response to an AND circuit 7 which operates at A time provided there is an interrupt pulse reset signal on the IRPT PULSE RST line.

The signal on the EXIT line (referred to elsewhere herein as EXIT) defines the entrance into the interruption 6 sequence for all interruptions except I IRPT FM I, either as a result of CTRL L CYC, or as a result of IRPT L CYC, as illustrated in the chart of Section 14.2.1.2.

The basic functions of an interruption 6 sequence may be performed either by the exit, or by I INTERRUPT END, which is equivalent to exit but relates to I IRPT FM I classes of interruptions as shown in the chart of Section 14.2.1.2. The establishment of the I IRPT END signal is described in the next section, and thereafter, functions which may be generated by either EXIT or I IRPT END are described in following sections.

(14.2.1.5) TURNING ON I IRPT END (FIG. 325, FIG. 329, AND FIG. 333)

In FIG. 325, the signal which will turn on the I INTERRUPT END latch is generated on a TON I IRPT END line by an AND circuit 1 in response to concurrence of an I IRPT FROM I with the I TO E XFER, provided that EXIT has not previously turned on. This is achieved by having the AND circuit 1 respond to the I IRPT FROM I line and to the I TO E XFER line as well as to an inverter 2 which is responsive to a signal on the IRPT RST line. The signal on the IRPT RST line is generated in FIG. 325 by an OR circuit 3 in response to either EXIT or in response to a signal on the I IRPT END LCH line. Inasmuch as EXIT appears at the start of not L time (during early B time), the IRPT RST line will appear before the I TO E XFER signal whenever EXIT has been turned on. Thus, the output of the OR circuit 3 applies to the inverter 2 provides priority as between the CTRL L CYC-EXIT type of interruptions over the I TO E XFER-I IRPT END interruptions in accordance with the chart shown in Section 14.2.1.2.

The signal on the I IRPT FM I line in FIG. 325 is generated by an OR circuit 4 in response to signals on either the SET ID T2 or I PGM IRPT LCH lines. These two signals indicate that two different classes of I IRPT FM I interruptions: the SET ID T2 signal indicates interruptions of the type which are sensed at T2, whereas the I PGM IRPT LCH signal indicates interruptions sensed at T1, as illustrated in the chart of Section 14.2.1.2. Thus, SET ID T2 and I PGM IRPT LCH identify I IRPT FROM I which will permit the I TO E XFER to provide a TON I IRPT END signal provided that IRPT RST has not previously been generated, thus indicating that EXIT is not already on.

The I TO E XFER is also applied to an AND circuit 5 in FIG. 325 along with an inverter 6 which responds to EXIT. This generates a signal on the GT I PGM IRPT line, which is applied to an AND circuit 7 in FIG. 325 The AND circuit 7 is also responsive to the SET ID T2 signal and to a signal on the NOT I PGM IRPT LCH line. Thus the AND circuit 7 differs somewhat from the inputs to the AND circuit 1, in that the AND circuit 7 will not operate if I PGM IRPT has already been set. This is the manner in which the T1 and T2 interruptions are distinguished. Thus, if a T1 type of interruption has already been sensed (prior to the I TO E XFER) then the I PGM IRPT LCH will already have been set so that the AND circuit 7 will be blocked.

In FIG. 329, the signal on the SET ID T2 line is generated by an OR circuit 1 in response to a signal on the BD SUP CALL line, or in response to the output of a latch 2 which is set by an AND circuit 3 at the start of NOT L time provided there is a signal on a BD SPEC IRPT line, which signal indicates that the BOP decode circuit has sensed an invalid boundary specification. The OR circuit 1 may also respond to a signal from an AND circuit 4 which in turn is responsive to signals indicating privilege instruction on a BD PRIV INSTN line provided that the PSW indicates the system to be in the problem (rather than the supervisor) state, as is indicated by a signal on the PSW 15 line. The OR circuit 1 is also responsive to the situation where one execute instruction has as its subject instruction another execute instruction, as is indicated by a signal on the XEQ TO XEQ line. The signal on this line is generated in FIG. 329 by an AND circuit 5 in response to the BOP decode sensing an execute instruction concurrently with a previous execute instruction having set the execute latch. This is indicated by concurrent signals on the XEQ OP LCH line and on the BD XEQ line.

The OR circuit 1 in FIG. 329 is nearly duplicated by an OR circuit 6 (shown immediately adjacent thereto) which senses all of the inputs to the OR circuit 1 except for the supervisor call input on the BD SUP CALL line. The OR circuit 6 therefore recognizes T2 I program type of interruptions (as is seen in the chart of Section 14.2.1.2). The output of the OR circuit 6 is applied to an AND circuit 7 together with a signal on the GT I PGM IRPT line. The effect of the OR circuit 7 is to recognize I program interruptions of the T2 type (which exclude supervisor call) the gating of which is permitted (as shown in FIG. 325 and described hereinbefore) by the lack of EXIT when the I to E transfer appears. Notice that the T2 interruption is not prevented from providing a signal out of the AND circuit 7 even though there may have been a T1 type of interruption; this contrasts with the AND circuit 7 in FIG. 325 which will not provide a T2 set for the PSW if the I program interrupt latch had previously been set by a T1 type of interrupt. The output of the AND circuit 7 in FIG. 329 comprises a T2 I PGM IRPT line which is applied to an OR circuit 8 in FIG. 328, the output of which comprises a signal on the TON I PGM IRPT line. The OR circuit 8 is also responsive to an AND circuit 9 which operates with a turning on of T2 due to the signal on the TON T2 line provided there is a T1 type of interruption as indicated by a signal on the T1 IRPT line. The T1 IRPT line is responsive to an OR circuit 10 in FIG. 329 which, in turn, may be operated by a signal on the IOP INC ADR line (indicating an instruction-related invalid address), by a signal on a ID INV OP line, or by a signal from an OR circuit 11. The OR circuit 11 recognizes two different types of specification interruptions from the I unit. The first of these is manifested by a latch 12 which is set by an AND circuit 13 whenever the instruction counter register has a 1 in bit 23, indicating that the instruction counter is trying to address storage field to the byte level although all instructions are limited to the syllable level (two bytes per syllable).

A further AND circuit in FIG. 329 indicates priority granted to invalid op type of T1 interrupt: the AND circuit 16 is responsive to an inverter 17 whenever there is no output from the OR circuit 11, indicating that there is no invalid specification type of interruption. The AND circuit 16 also requires an input on the NOT IOP INV ADR line; when these two inputs are present, then the AND circuit 16 will generate a signal on the INV OP PRI line in response to a signal on the ID INV OP line.

At the bottom of FIG. 329, an AND circuit 18 generates a signal for setting the PSW in response to interruptions of the T1 type. The AND circuit 18 generates a signal on the T1 SET PSW line in response to signals on the T1 IRPT and NOT EXIT lines. Notice that the signal will appear on the T1 SET PSW line even though a T2 type of interruption may later be sensed; this is so because the T2 type of interruption can again set the PSW thereby changing its setting so as to reflect the condition extant within the T2 type of interruption, effectively erasing the effect of having set the PSW with the interruption code of the T1 type of interruption. The timing of the setting of the PSW is illustrated in the chart of the following section.

Figure 333:
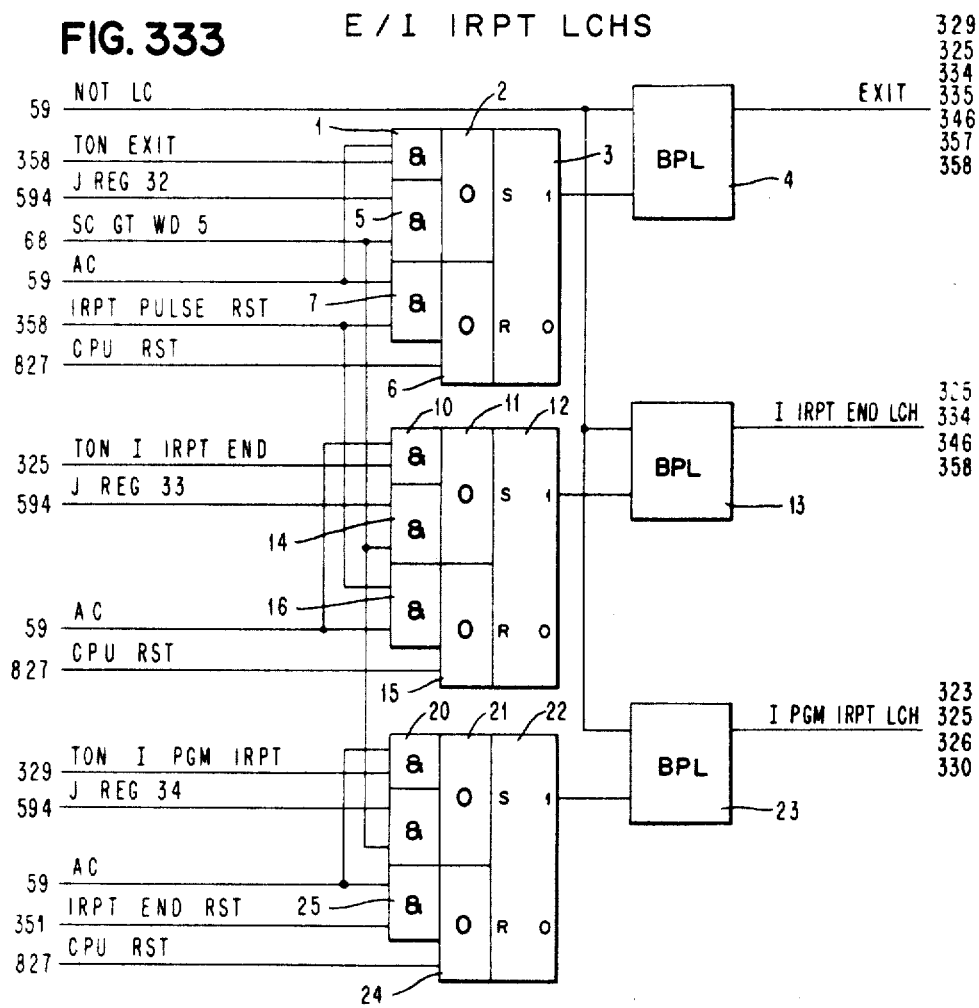

The signal on the TON I IRPT END line which is generated by the AND circuit 1 in FIG. 325 is applied to an AND circuit 10 in FIG. 333 which will cause an OR circuit 11 to be operated at A time thereby to set a latch 12. The output of the latch 12 is reflected in a bipolar latch 13 at the start of not L time, so as to generate a signal on the I IRPT END LCH line. This signal is referred to herein as I IRPT END. The OR circuit 11 is also responsive to an AND circuit 14 which can cause the setting of the latch 12 during scan operations in response to a signal on the SC GD WD 5 line concurrently with a signal on the J REG 33 line. The latch 12 is reset by an OR circuit 15 in response to a signal on the CPU RST line, or in response to an AND circuit 16 which is operated at A time by a signal on a IRPT PULSE RST line. The IRPT PULSE RST signal appears as soon as either EXIT or I IRPT END has caused the interrupt reset provided that no storage requests are outstanding from the CPU, as is developed hereinafter.

Another factor in the setting of I IRPT END is the I program interrupt latch. In FIG. 329, the OR circuit 8 provides a signal on the TON I PGM IRPT, which is applied to an AND circuit 20 in FIG. 333 The AND circuit 20 will respond at A time (AC line) so as to cause an OR circuit 21 to set a latch 22. The output of the latch 22 is reflected in not L time in a bipolar latch 23 so as to generate a signal on the I PGM IRPT LCH line. This signal in turn, is the signal applied to the OR circuit 4 in FIG. 325 which, together with the signal on the SET ID T2 line can cause recognition of an I interruption from I by generating a signal on the I IRPT FM I line. This in turn is one of the signals which is required in order for the AND circuit 1 of FIG. 325 to generate the signal on the TON I IRPT END line. In other words, the OR circuit 8 in FIG. 329 will respond to the AND circuit 9 therein if there is a T1 interrupt, this in turn will cause the setting of the I PGM IRPT LCH in FIG. 333, which in turn will operate the OR circuit 4 in FIG. 325 so as to permit the AND circuit 1 in FIG. 325 to generate the TON I IRPT END signal. On the other hand, in the case of an T2 type of interruption, the OR circuit 1 in FIG. 329 will provide a SET ID T2 signal which is used directly by the OR circuit 4 in FIG. 325 to cause the AND circuit 1 to generate the TON I IRPT END signal. One of the reasons that the T1 type of interrupt has a longer path in the setting of the I IRPT END is because buffering is needed to preserve the interruption indications from T1 until the latter part of T2 when the I to E transfer occurs.

In FIG. 333, the I program interrupt latch 22 is reset by an OR circuit 24 in response to a signal on the CPU RST line, or in response to an AND circuit 25 which operates at A time in response to the IRPT END RST signal. This signal occurs at the end of the interrupt fix sequence; thus the latch 22 will be set during the interrupt fix sequence so as to continue to identify the T1 interruptions, and distinguish them from T2 interruptions.

(14.2.1.6) TIMING CONTROL FOR SETTING INTERRUPTION CODE

One of the characteristics of the interruption-fixed sequence is the setting of the interruption code into the PSW prior to exchanging PSWS. This is effected at different times, and the times differ for bits 16–23 in comparison with the timing for bits 24–31, in some instances. For instance, bits 24–31 of a T1 type of interruption are set at the turn on of T2; bits 24–31 of a T2 type of interruption are set at the I to E transfer; bits 24–31 of channel (I/O) interruptions are set at the turn on of interrupt cycle 2. On the other hand, bits 16–23 of all interruptions are set with the turn on of interrupt cycle 1, and bits 24–31 of all interruptions except channel and I IRPT FM I interruptions are set also at the turn on of interrupt cycle 1. This is all illustrated in the chart which follows.

| SET PSW SIGNAL | T1 SET | T2 SET | EXEC SET | EXEC SET |
|---|---|---|---|---|
| TIMING | TON T2 | I TO E XFER | &, IRPT RST TON IRPT CYC 1 | TON IRPT CYC 2 |
| Interruption | | | | |
| MCH CHK | | | 16-31 | |
| IPL LOAD PSW | | | Does not set IRPT code | |
| CPU SAP | | | 16-31 | |
| CPU INV STR | | | 16-31 | |
| E PGM IRPT | | | 16-31 | |
| EXT IRPT | | | 16-31 | |
| TIM ADV REQ | | | 16-31 | |
| CH IRPT (I/O)* | | *(16-23 set by I16-23ST) | | 24-31 |
| T1 IRPTS * | 24-31 | | 16-23 | |
| T2 IRPTS * | | 24-31 | 16-23 | |
| RCVY | | | Does not set IRPT code | |

| SET PSW SIGNAL | T1 SET | T2 SET | EXEC |
|---|---|---|---|
| INTERRUPTION | | XFER | IRPT |
| MCH CHK | | | 16-3 |
| ipl Load PSW | | Does not | setI |
| CPU SAP | | | 16-3 |
| CPU INVSTR | | | 16-3 |
| E PGM IRPT | | | 16-3 |
| EXT IRPT | | | 16-3 |
| TIM ADV REQ | | | 16-3 |
| 4-31 CH IRPT (I/O)* | | *(16-23 set by IRPT RST) | 16-3 |
| T1 IRPTS * | 24-31 | | 16-2 |
| T2 IRPTS * | | 24-31 | 16-2 |
| —J not | 3 | | set I |

(14.2.1.7) PRIORITY HOLD AND INTERRUPT RESET (FIG. 325, FIG. 358 AND FIG. 349)

Two of the initial main functions of a normal interruption fixed-sequence are the resetting of normal system functions as required so as to permit the interruption functions to take place, stopping the operation of instruction fixing and instruction execution, and the freezing of interruption recognition circuitry so that once an interruption has set either the EXIT or the I IRPT END, no further interruptions will be recognized until the end of the recognition fixed sequence.

In FIG. 325, IRPT RST is generated by the OR circuit 3 in response to either I IRPT END or EXIT. The interrupt reset line (IRPT RST) is used in various parts of the CPU so as to permit handling of the interruptions.

In FIG. 358, a signal is generated on a IRPT TON PRI HOLD line by an OR circuit 6 in response to either TON I IRPT END or TON EXIT. Thus, the signal which will turn on either one of the additional interruption sequence latches will also provide a turn on signal for IRPT PRI HOLD. The output of the OR circuit 6 in FIG. 358 is applied to an OR circuit 1 in FIG. 349. This OR circuit is effective at A time to cause an AND circuit 2 to operate an OR circuit 3 so as to set a latch 4, the output of which is reflected in a bipolar latch 5 that generates a signal on the IRPT PRI HOLD LCH line (hereinafter referred to as IRPT PRI HOLD). The OR circuit 3 in FIG. 349 can also be operated by an AND circuit 6 in response to the scan signals on the SCAN GT WD 6 line so as to permit setting of the latch 4 whenever the bit 27 of the J register is a 1.

Another input to the OR circuit 1 in FIG. 349 is from an AND circuit 7 which operates in response to a signal on the HALT LCH line concurrently with the output of an AND circuit 8. The AND circuit 8 recognizes the wait status of the system, whenever timer advance request has not been set due to signals on the NOT TIM ADV REQ LCH and WAIT STAT LCH lines. Thus, IRPT PRI HOLD can be turned on by the IRPT TON PRI HOLD in response to either EXIT or I IRPT END, or IRPT PRI HOLD can be turned on whenever the machine is in the wait status and the halt latch is set provided that no timer advance request is outstanding.

The latch 4 in FIG. 349 is reset by an OR circuit 9 in response to a signal on the CPU RST line, or in response to an AND circuit 10 which operates at A time provided there is an output signal from an OR circuit 11. The OR circuit 11 is in turn responsive either to interrupt cycle 5 signal on the IRPT CYC 5 LCH line, or to the output of any one of three AND circuits 12-14. The AND circuit 12 recognizes when the system is in the wait stage, the interrupt priority hold latch has been set so as to prevent interruptions from occurring (which is done only when the halt latch is also set when the system is in the wait state), and the AND circuit 12 then will operate if the halt latch is turned off as indicated by a signal on the NOT HALT LCH. Other inputs to the AND circuit 12 include an output from the AND circuit 8 and a signal on the IRPT PRI HOLD LCH line. The AND circuit 13 permits a short interruption sequence in the case of timer advance request by recognizing the turn off of interrupt cycle 2 when timer advance request has priority due to signals on the TOF IRPT CYC 2 and TIM ADV REQ PRI lines. The AND circuit 14 permits an even shorter sequence in the case of recovery only, by recognizing the signal on the IRPT PULSE RST line concurrently with a signal indicating that recovery priority has been granted on the RCVY PRI line.

Thus, interrupt priority hold is used at the start of a fix sequence even though the fix sequence be for timer advance or recovery purposes, and it is also used to recognize the case where the system is in the wait state and the halt latch is set so as to prevent any of the asynchronous interruptions from removing the system from the wait state by blocking the interruptions from being sensed in the interruption circuitry.

(14.2.1.8) IC RECOVERY REQUEST LATCH (FIG. 337)

Normal operation of the IC recovery request latch shown in FIG. 337 commences with a signal on the TON IC RCVY TO IRPT line to an AND circuit 1 which is operative at A time to cause an OR circuit 2 to set a latch 3, the output of which is respected in the bipolar latch 4 at NOT L time so as to generate a signal on the IC RCVY REQ LCH line. The signal on the TON IC RCVY REQ line is generated in FIG. 243 (of application Ser. No. 609,238) whenever a program store compare together with a storage request indicates that storing into an already fetched storage word has taken place, or whenever there is an execute operation, at I to E transfer. The OR circuit 2 in FIG. 337 can also respond to an AND circuit 5 which recognizes bit 26 of the J register during scan word 6 due to signals on the J REG 26 and SCAN GT WD 6 lines. The latch 3 is reset by an OR circuit 6 in response to a signal on the CPU RST line, or in response to an AND circuit 7 which is operative at A time provided there is a signal from an OR circuit 8. The OR circuit 8 responds to a signal on the IRPT PULSE RST line, which indicates that the storage sequence can begin without interference from data returning from memory, or in response to a signal on the BR TOF XEQ OP, which indicates that the system has branched so that an execute operation will not take place, and therefore no execute recovery is required: in effect, the BR TOF XEQ OP cancels the execute recovery.

The output of the circuit of FIG. 337 on the IC RCVY REQ LCH line is applied as an input to the circuit of FIG. 326. As described briefly hereinbefore the IC recovery request latch will not result in the IC recovery request signal in FIG. 326 whenever there is an I interrupt from I (AND circuit 6) or when an execute operation is involved due to the fact that the IC recovery is not known to be required unless those conditions are true. Additionally, recovery priority is not granted in FIG. 326 unless there is no higher priority 1–10. Recovery priority, if granted, is utilized in FIG. 349 to reset interrupt priority hold, and is not needed to generate interrupt control bits for addressing storage words in FIG. 330 nor is it needed in FIG. 359 through FIG. 361 for generating interrupt codes since recovery is not an interrupt, and appears in the interrupt controls only to achieve interrupt reset conditions, which includes unblocking certain of the IC controls, and is also used in FIG. 358 as an input to the circuits which cause the resetting of the MODAR circuit.

(14.2.1.9) CONSOLE INTERRUPT LATCH CIRCUIT (FIG. 331)

In FIG. 331, a signal on a IRPT PB line from the power distribution unit (PDU) control panel area of the system will cause an AND circuit 1 to set a latch 2 immediately upon its being reset at the start of not BR time. The output of the latch 2 is applied to an AND circuit 3 which causes an OR circuit 4 to set a latch 5 at A time due to a running A clock signal on the AR line. The output of the latch 5 is reflected in a bipolar latch 6 upon the occurrence of the NOT LCH PRI signal, which signal indicates that latches within the interrupt input circuitry are allowed to change and to assume states indicative of the inputs thereto. The bipolar latch 6 provides a signal on the CONS IRPT LCH line.

The OR circuit 4 in FIG. 331 may also respond to an AND circuit 7 during scanning word 5 due to the presence of signals on the J REG 31 and SCAN GT WD 5 lines. The latch 5 is reset by an OR circuit 8 in response to a signal on the CPU RST at A time in response to an AND circuit 10. The AND circuit 10 recognizes the case where the console interrupt latch has already been set, and the console interrupt has been granted priority as indicated by a signal on the EXT IRPT PRI line, so that the AND circuit 10 will be operated during cycle 4 of the interrupts due to the signal of IRPT CYC 4 LCH line.

The output of FIG. 331 of the CONS IRPT LCH line is applied to the circuit of FIG. 359, although not shown therein, to be utilized in generating I CPU RST & NOT MCH CHK line, or by an AND circuit 9 which operates interrupt code bit 25 (see said System/360 Manual) in the same fashion that TIM IRPT TGR generates interrupt code bit 24.

(14.2.1.10) MACHINE CHECK CIRCUITS (FIG. 338, FIG. 339, AND FIG. 340)

In this system, when errors or malfunctions are sensed, the errors are first utilized by the maintenance controls within the power distribution unit (PDU) to cause a "log" operation wherein a large number of conditions within the machine are recorded for examination by a maintenance personnel. When the "log" is completed, then the maintenance controls sense a scanning control signal to provide a machine check interruption which permits exchanging of PSWS, and performing a diagnostic or other program in response to the new PSW.

In FIG. 338, the maintenance controls call for a machine check interrupt by sending a signal on a SCAN SET MCH CHK line to an AND circuit 1 which operates when there is also present a signal on the CPU RST line. The signal on the CPU RST line is a function of the "log" being completed, as is described with respect to the PDU maintenance controls. The AND circuit 1 causes the OR circuit 2 to generate a signal on the SET line (this signal being utilized to set a latch 10 in FIG. 340) the output of which comprises a signal on a MCH CHK START line. The MCH CHK START signal is also applied to an OR circuit 11, so that it will generate a signal on a MCH CHK IRPT line. Shortly after generating the set signal, the signal on the CPU RST line disappears so that there is no longer an input to the AND circuit 1 and the output from the OR circuit 2 disappears as well which causes the disappearance of the signal on the SET line, and results in the appearance of a signal on a NOT SET line due to the action of an inverter 3 in FIG. 338.

In FIG. 338, an AND circuit 4 will not have operated due to the fact that when there was a signal on the CPU RST line to activate the AND circuit 1, there obviously was no signal on the NOT SCAN SET MCH CHK line since there was a signal on the SCAN SET MCH CHK line. Also, since the interruption fixed-sequence has not yet begun, there is no signal on a IRPT CYC 6 LCH line so that there is no output from an OR circuit 5. Thus an inverter 6 will generate a signal on a NOT RST line.

In FIG. 340, an AND circuit 12 now has applied thereto signals on the NOT SET, NOT RST, and F2 lines. The circuits of FIG. 338 stabilize with the NOT SET, NOT RST, and F2. However, following the CPU reset, the main system clock is essentially started, and the first signal to come from the clock is an L clock which provides a signal on the LC line at the input to the AND circuit 12 in FIG. 340. This permits the AND circuit 12 to operate causing the latch 13 to be set. When the latch 13 is set, it applies an input to the OR circuit 11 so that in the event that the latch 10 is reset, a signal will continue to appear on the MCH CHK IRPT line. At the end of the first L clock signal, a signal appears on a NOT LC line at the input of the AND circuit 14 in FIG. 340 which also has applied thereto a signal on the F1 line. Therefore, the AND circuit 14 will cause an OR circuit 15 to reset the latch 10. With the latch 10 reset, there is no longer an F2 signal, so that the AND circuit 12 will no longer recognize any L clock signals which is applied thereto. The first L clock signal is therefore defined by the latch 10 being on so that the MCH CHK START signal is apparent; this signal is utilized in FIG. 346 so as to permit an OR circuit 1 therein to provide an input to an AND circuit 2 so as to cause an OR circuit 3 to set a latch 4. Alternatively stated, the machine check start signal permits recognizing the first A clock signal at the AND circuit 2, but inasmuch as the machine check start signal disappears following the end of the first L clock (an L clock spans an A clock) no further A clocks will permit the AND circuit 2 to operate as a result of machine check inputs to the OR circuit 1.

The interruption fixed-sequence will proceed until interrupt cycle 6 is set which provides a signal on the IRPT CYC 6 LCH line in FIG. 338. This perimts the OR circuit 5 in FIG. 338 to generate a signal on the RST line, which signal is applied to an OR circuit 16 in FIG. 340 which in turn resets the latch 13 or that the signal disappears from the MCH CHK IRPT line. This also causes both latches in the circuits of FIG. 340 to be reset thereby having them ready for another machine check interrupt start sequence should the occasion arise. The MCH CHK IRPT line is used to identify the machine check in contrast to any other type of interrupt through the interruption circuits. However, this signal also disappears after IRPT CYC 6 resets F1.

(14.2.1.11) WAIT STATUS LATCH (FIG. 357)

Figure 357:
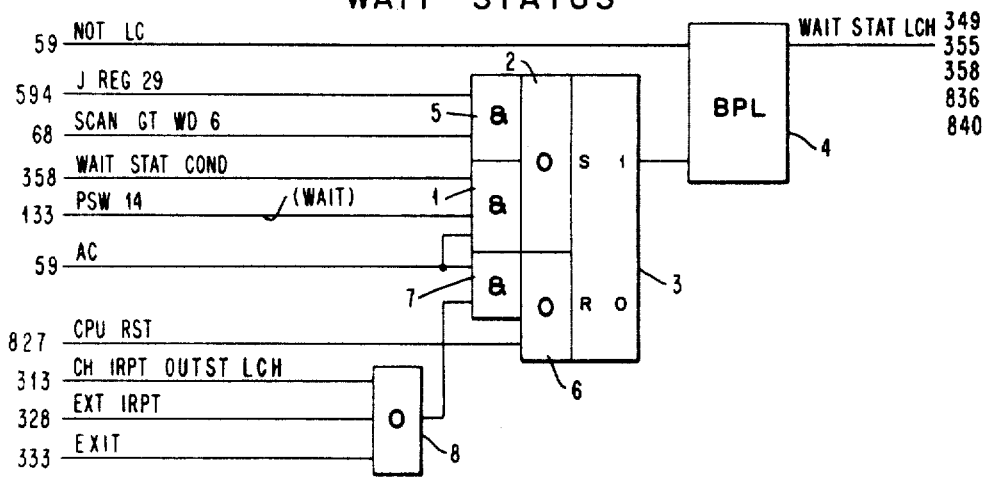

In FIG. 357, an AND circuit 1 may cause an OR circuit 2 to set a latch 3 which in turn sets a bipolar latch 4 at NOT L time thereby to generate a signal on the WAIT STAT LCH line, which is hereinafter referred to as wait status. The latch 1 will sample bit 14 of the PSW, which indicates that the system is to be put into the wait state whenever bit 14 is a 1. In order to sample the PSW, the AND circuit 1 must have a signal present on a WAIT STAT COND line, which signal is generated in FIG. 358. In FIG. 358, an OR circuit 7 responds to either one of two AND circuits 8, 9 so as to permit conditioning of the wait status. The AND circuit 8 is responsive at CTRL L CYC provided there is no B interrupt as indicated by a signal on the NOT B IRPT line. It is to be noticed that this is the converse of the setting condition for the AND circuit 3 in FIG. 358 which will cause the turn on of EXIT at CTRL L CYC provided that there is a signal on the B IRPT line.

At the last cycle of an interruption fix-sequence, an AND circuit 9 will respond to a signal on the IRPT L CYC LCH line provided there is a signal on the NOT A IRPT line. Thus, whenever EXIT would not be turned on, it is possible to have the WAIT STAT COND signal applied to the AND circuit 1 in FIG. 357.

In FIG. 357, the OR circuit 2 can also respond to an AND circuit 5 which is operated by word 6 in a scanning operation due to signals on the J REG 29, and SCAN GT WD 6 line. The latch 3 is reset by an OR circuit 6 in response to a signal on the CPU RST line, or in response to an AND circuit 7 which in turn requires an output of an OR circuit 8. The OR circuit 8 recognizes one of the asynchronous interruption signals, which include external interruptions, channel interruptions, and timer advance request, although EXIT is used as an indication of when a timer advance request has been accepted. The purpose of the OR circuit 8 is described more fully in said System/360 Manual, wherein the wait status is defined as precluding any activity by the system except for timer advance, input output interruptions (CH IRPT) or external interruptions. When one of these interruptions is sensed, the OR circuit 8 will cause the AND circuit 7 to operate the OR circuit 6 so as to reset the latch 3. Thus, the system shifts out of the wait state long enough for PSW exchange and interruption to take place in accordance with the interruption fix-sequence, or long enough to update the timer word. In the case of channel interruptions or external interruptions, PSW's are exchanged, and the new PSW may or may not have a 1 in bit 14 thereof. Thus, the machine may or may not return to the wait state in dependence upon the new PSW which relates to the particular interruption. In many cases, the new PSW will call for a short sequence of instructions in response to the channel or the external interruption, and this short sequence of instructions may well end with a LOAD PSW instruction which causes the return of the original PSW (prior to shifting out of wait) to be returned to the PSW register. At that time, the control last cycle of the last instruction will recognize that PSW bit 14 is a 1, causing the latch 3 to again be set whereby the system returns to the wait state.

Note particularly that a timer advance, since it does not call for the exchange of PSW's, will not remove the system from the wait state other than long enough to permit fetching the timer word, decrementing the timer word in the E unit, and returning the timer word to storage, with or without a timer interruption, in dependence upon whether or not the timer word changed from a positive to a negative value as it was updated.

A simplified, illustrative sketch of the timing of the machine check interrupt start circuits is shown in FIG. 339. This sketch illustrates that CPU reset will cause a SET signal for a short period of time, during which F2 is set, which causes MCH CHK IRPT to appear. The circuits remain in that condition until the first clock signal appears after the restarting of the clock; this is a LC signal which, together with the presence of F2 causes the setting of F1. When F1 is set, the next A clock will cause the setting of IRPT CYC 1, and the circuits will ignore all future clock signals. Near the end of the interruption fix-sequence IRPT CYC 6 will appear to reset F1. Note that F1 continues to generate the MCH CHK IRPT signal even after F2 is turned off.

Once the latch 3 is reset at the start of either a channel or an external interruption, or at the start of a timer advance, the EXIT latch will be set, control last cycle or interrupt last cycle are no longer available so that the signal is not apparent at the WAIT STAT COND line input to the AND circuit 1 in FIG. 357. The latch 3 must therefore remain reset until IRPT L CYC appears which permits a further signal on the WAIT STAT COND line.

The exit signal is allowed to come on in response to channel or external interruptions, or in response to a timer advance request by virtue of an AND circuit 5 in FIG. 358 which does not require either interrupt last cycle or control last cycle, but merely requires that the wait status latch be set and that the halt latch not be set. Then an A interruption (which includes the asynchronous interruptions: channel, external, timer advance) will cause an OR circuit 2 in FIG. 358 to operate an AND circuit 1 thereby generating a TON EXIT signal. This causes EXIT to appear in FIG. 333, and it is applied to set interrupt cycle 1 in FIG. 346, as described hereinafter. Thus, the EXIT signal is also available to operate the OR circuit 8 in FIG. 357 thereby to reset the latch 3 and remove the system from the wait status. However, no interruptions can be taken since there will be no I to E transfer, no control last cycle, and until timer advancing is completed, there will be no interrupt last cycle; thus, the asynchronous interruptions permit resetting the wait status latch so as to enter into the interruption fix-sequence.

(14.2.1.12) INITIAL PROGRAM LOAD BUFFER
(FIG. 347 AND FIG. 352)

In FIG. 347, an AND circuit 1 which is effective to reset the interrupt cycle 2 latch upon the receipt of an accept signal from the BCU whenever the interrupt cycle 2 latch is set also provides a signal to an AND circuit 2 therein. The AND circuit 2 is additionally responsive to the absence of priority for a timer advance request as indicated by a signal on a NOT TIM ADV REQ PRI line concurrently with a signal indicating that initial program loading is required as indicated by a signal on an IPL A line. The IPL A line is generated in FIG. 290 of application Ser. No. 609,238 from the time that the maintenance controls start to turn on an IPL latch in FIG. 289 of application Ser. No. 609,238 until the time that the IPL latch itself is turned off. In other words, the IPL A line indicates that initial program loading of the PSW is required.

Thus, in FIG. 347, when initial program loading is required, an interrupt cycle 2 is on, a receipt of an accept signal from the BCU indicates that the program status word which has been fetched for the initial program load operation will be supplied by the BCU, and therefore that the IPL buffer should be turned on as indicated by the TON IPL BFR signal. This signal is applied to an AND circuit 1 in FIG. 352 which operates at A time to cause an OR circuit 2 to set a latch 3, the output of which is reflected in a bipolar latch or at NOT L time, so as to generate a signal on an IPL BFR LCH line. The OR circuit 2 may also respond to an AND circuit 5 during scan word 6 due to the effect of signals on a J REG 31 and SCAN GT WD 6 lines. The latch 3 is reset by an OR circuit 6 in response to a signal on the CPU RST line, or in response to an AND circuit 7. The AND circuit 7 recognizes the turn on of interrupt cycle 5, which turns on during the normal interruption fix-sequence when the fetched storage word is known to have returned. In a case of initial program loading, the turn on of interrupt cycle 5 is affected in FIG. 351 by an AND circuit 1 which responds to signals on the J LOADED LCH and IPL BFR LCH lines. Since J LOADED appears as a result of a J ADV which is received in the CPU from the BCU, J LOADED indicates that the PSW has been returned to the J register. The AND circuit 1 in FIG. 351 causes the OR circuit 2 to generate a signal on the TON IRPT CYC 5 line, which signal appears at the input of the AND circuit 7 in FIG. 352 so as to permit operation of the OR circuit 6 at A time, thereby resetting the latch 3.

The IPL latch in FIG. 289, from which, together with the turn on of which, the IPL A signal input to the AND circuit 2 in FIG. 347, also causes in FIG. 295 of application Ser. No. 609,238, the generation of an IE IPL START SEQ signal which is applied to the OR circuit 1 in FIG. 346, causing interrupt cycle 1 to be set. Interrupt cycle 1 causes the storage request, and when the accept is received from the BCU, interrupt cycle 2 is turned off and the IPL buffer (FIG. 352) is turned on. The buffer remains on while the storage is actually fetching the new PSW and interrupt cycles 3 and 4 are blocked because of the fact that interrupt cycle 3 is normally set by an AND circuit 1 of FIG. 348, which AND circuit is blocked by the presence of initial program loading due to the effect of a signal on a NOT IPL A line. Since interrupt cycle 3 does not go on, interrupt cycle 4 will not come on; this is desirable because no store cycle is involved in fetching the PSW for an initial program load. When the storage word returns (J LOADED, AND 1, FIG. 351) normal interrupt sequencing resumes by turning on interrupt cycle 5. The turn on interrupt cycle 5 causes setting of the new PSW, in a normal fashion.

(14.2.1.13) TIMER ADVANCE REQUEST
(FIG. 354)

Figure 356:
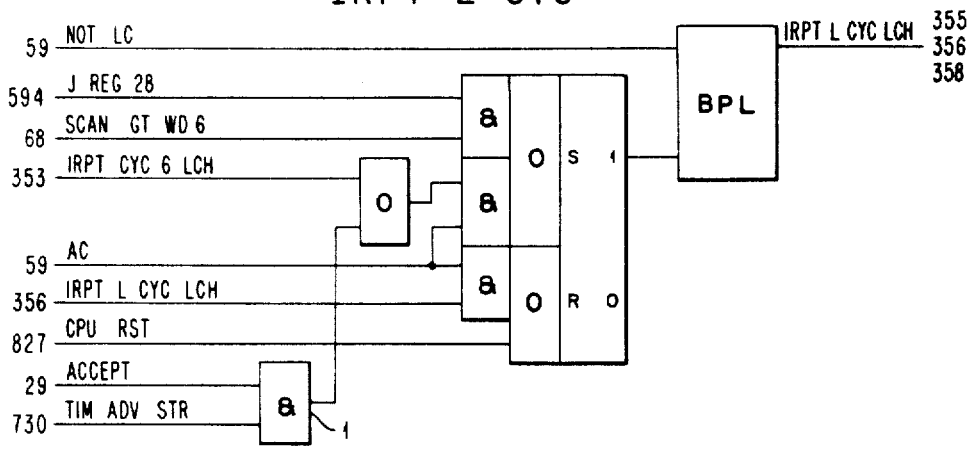

In FIG. 354, an AND circuit 1 responds to a signal on an INT TIM ADV line which is generated in the power distribution unit (PDU) in response to a power line signal (such as the ordinary 60 cycle power which might be utilized to supply operating current to the system). The circuitry which creates the INT TIM IRPT signal is illustrated in FIG. 356. The AND circuit 1 will operate at the start of NOT BR time, immediately following the resetting of a latch 2, so as to cause the latch 2 to be set. With the latch 2 set, an AND circuit 3 will operate on the following A clock due to a signal on the AR line so as to cause an OR circuit to set a latch 5. The output of the latch 5 is reflected in a bipolar latch 6 so as to generate a signal on the TIM ADV REQ LCH line, provided there is a signal on the NOT LCH PRI line, indicating that the asynchronous input latches for the interrupt circuits are not frozen in the latched state. The OR circuit 4 may also respond to an AND circuit 7 whenever there are signals present on the J REG 30 and SCAN GT WD 5 lines. The latch 5 is reset by an OR circuit 8 in response to a signal on a CPU RST.

(14.2.1.14) EXTERNAL SIGNAL LATCHES (FIG. 341 THROUGH FIG. 345)

In FIG. 341, a plurality of bipolar latches 1 are each operated by a signal on a NOT LCH PRI line to reflect the setting of a corresponding one of a plurality of latches 2, each of which is settable by a related OR circuit 3 in response to corresponding scan signals, such as on the SCAN EXT SIG 2 line, or in response to a corresponding one of a plurality of AND circuits 4. Each AND circuit 4 responds to a running A clock signal on the AR line, and to a related external bus in signal such as on the EXT SIG BUS IN 2 line. Each of the latches 2 is reset by a related OR circuit 5 in response to a resetting signal from an AND circuit 6 which responds to signals on the CPU RST and NOT SCAN SET MCH CHK lines, which correspond to the resetting signal used on the timer advance request latch in FIG. 354 and on the console interrupt latch of FIG. 331. Each of the OR circuits 5 also are responsive to a related AND circuit 7, the AND circuit 7 being operated by running A clock signals on the AR line, and by a signal on the EXT IRPT END line concurrently with a related external signal interrupt latch signal such as on the EXT SIG IRPT 2 LCH line. Thus, provided a particular bipolar latch 1 has been set, the appearance of the external interrupt end signal to the AND circuit 7 will cause the corresponding latch 2 to be reset at A time. External interrupt end merely means that priority has been granted to external interrupt, and interrupt cycle 4 has been reached (FIG. 350).

Figures 342, 343, 344, 345:
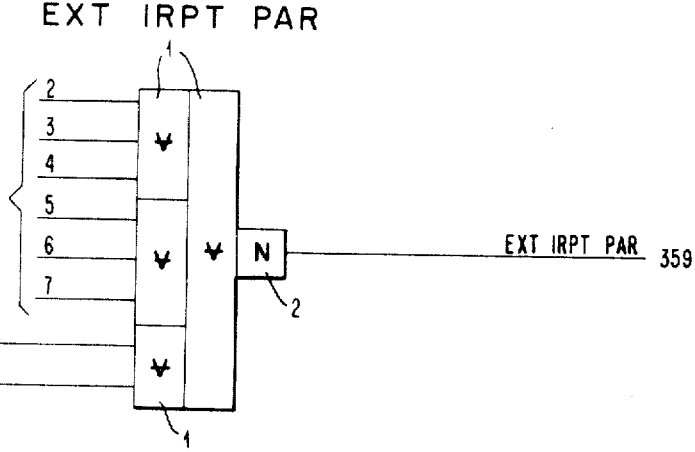

The nomenclature in FIG. 341 through FIG. 345, is hardware oriented, and differs from that shown in said System/360 Manual in accordance with the chart of FIG. 344. In FIG. 344, the external signals 1-6 (as described in said System/360 Manual) are shown in the first column. In the second column, the identification of the external signal bus in lines is shown to correspond conversely to the external signals which they represent: for instance, external signal 1 appears on external signal bus in line 7, external signal 5 appears on external signal bus in line 3, etc. The third column illustrates that external signal latches of FIG. 341 are numbered to correspond with the external signal bus in lines, such that external signal 1 will be lodged in external signal interrupt latch 7. The final column delineates the interruption code bit assignment for the various external signals, as well as for console interrupts and timer advance requests. In fact, since bits 24-31 of the interruption code may be thought of as bits 0-7 of a particular byte of the interruption code, the hardware herein has been given nomenclature consistent with the 0-7 significance of these bits. For instance, timer advance requests interruptions will cause the setting of interrupt code bit 24, which is bit 0 of the byte shown in FIG. 344; similarly, console interruptions would cause the setting of bit 1 of the byte, and external signal 6 would cause the setting of bit 2 of that byte. It is to be noted, however, that the distinction between the various external signals is manifested in the system only in the setting of the interruption code. Thus, a particular external signal will cause the setting of the corresponding latch in FIG. 341, the output of any of these latches will cause an OR circuit 1 in FIG. 345 to generate a signal on the EXT SIG IRPT OUTST line, to indicate to the interruption controls that an external signal interruption is requested. The output of the latches in FIG. 341 is also applied to the circuits of FIG. 359 through FIG. 361 so as to generate a particular interruption code in dependence upon which external signal is present, the particular bit of the interruption code being that shown in the right-most column of FIG. 344. Beyond that, there is no distinction between the particular external signals, any one of them being handled the same way by the interruption circuits.

The output of the external signal interrupt latches in FIG. 341 is applied to an exclusive OR complex 1 in FIG. 342, together with signals on TIM IRPT TGR and CONS IRPT LCH lines. The output of the exclusive OR circuit complex 1 is passed to an inverter 2 so that, if an even number of bits are present at the input to the exclusive OR circuit 1, there will be no output therefrom, so that an inverter 2 will generate a parity signal on the EXT IRPT PAR line. The TIM IRPT TGR line comes from the E unit, and represents a trigger which is set whenever the timer advance results in the timer word changing from a positive value to a negative value, thus indicating that the function represented thereby has been completed. This is the same line that is utilized in FIG. 328 in the generation of the signals on the EXT IRPT and EXT IRPT PRI lines.

(14.2.1.15) TABLE OF INTERRUPTION MASKING

| INTERRUPTION TYPE | PSW BIT | FIG. WHERE MASKED |
|---|---|---|
| Selector Channel 1 | 1 | FIG. 315 |
| Selector Channel 2 | 2 | FIG. 315 |
| Selector Channel 3 | 3 | FIG. 315 |
| Selector Channel 4 | 4 | FIG. 315 |
| Selector Channel 5 | 5 | FIG. 315 |
| Selector Channel 6 | 6 | FIG. 315 |
| External | 7 | FIG. 328 |
| Machine Check | 13 | FIG. U22. |
| Wait State | 14 | FIG. 357 |
| Problem State | 15 | FIG. 329 |
| Fixed-Point Overflow | 36 | FIG. S6. |
| Decimal Overflow | 37 | FIG. V58. |
| Exponent Overflow | 38 | FIG. S8. |
| Lost Significance | 39 | FIG. S8. |

(14.2.2) *Interruption fixed-sequence*

The preceding two sections have described in detail the circuits which provide inputs to the interruption circuit, and which establish the turning on of either the EXIT or I IRPT END latches. The sections hereunder describe fully the basic interruption fix-sequence, and the variations therein which are required in order to handle machine check interruptions, timer advance requests, recoveries, and other special cases. Each of the basic functions of the interruption fix-sequence, some of which are used in all sequences, and others of which are used in only certain of the sequences, are each described.

(14.2.2.1) INTERRUPTION RESET (FIG. 325)

Interruption reset comprises a signal on the IRPT RST line which is generated by an OR circuit 3 in FIG. 325 in response to either I IRPT END LCH or EXIT. The IRPT RST signal is utilized in various places within the system so as to permit performing the interruption fix-sequence, or some appropriate portion thereof, without interference from I unit or E unit functions; particularly, it stops the I unit and the E unit from receiving any further until the new PSW is loaded and the interruption is otherwise completely sequenced. In the case of a recovery, an AND circuit 10 in FIG. 358 responds to the interrupt reset signal and to a signal indicating recovery priority has been granted provided that there is no outstanding storage request from the CPU, all as indicated by signals on the RCVY PRI, IRPT RST, and NOT CPU STG-BUSY lines. The AND circuit 10 generates a signal on a IRPT TO RCVY line which is utilized in the IC FETCH circuitry of FIG. 348 to cause an OR circuit 1 therein to generate the TON IC RCVY signal. Notice that the EXIT signal will not cause the setting of the first interrupt cycle in FIG. 346 in a case of a recovery due to the presence of a signal on a NOT RCVY PRI line. Thus, recovery enters into the interruption circuit merely to provide the interrupt reset signal on the IRPT RST line, so as to achieve a resetting of a number of functions in the CPU, and when the IRPT RST signal appears, then the control is transferred over to the IC control section of the CPU (FIG. 222) of application Ser. No. 609,238. Another AND circuit 11 in FIG. 358 responds to the IRPT RST and NOT CPU STG-BUSY lines to generate signal on an IRPT PULSE RST line as soon as interrupt reset appears provided that no outstanding fetch has been requested by the CPU of the storage unit. The IRPT PULSE RST signal is applied to the EXIT latch of FIG. 333 to reset EXIT, and is also applied to an OR circuit 8 in FIG. 346 to reset the IC RCVY REQ latch. Thus, after a single EXIT cycle within which IRPT RST is generated, the A clock following the setting of EXIT will cause the resetting of both EXIT and IC RCVY REQ.

The IRPT PULSE RST which is generated by IRPT RST, is applied to the EXIT and I IRPT END latches in every interruption sequence; in other words, the EXIT and I IRPT END latches are on for only the first machine cycle of an interruption fix-sequence.

Notice that the actual output in FIG. 333 of EXIT and I IRPT END comprises the output of the bipolar latches 4, 13, respectively, which are not set until the end of L time, and since L time completely spans A time, there is no possibility of IRPT RST being generated by the OR circuit 3 in FIG. 325 until the start of not L time, and therefore there is no possibility of the IRPT PULSE RST being generated by the AND circuit 11 in FIG. 358 until the start of not L time which is at least half A time, so that a second A clock signal (one following the one which is used to set either the EXIT or I INTERRUPT END) must be achieved prior to the resetting of EXIT or I IRPT END.

When recovery priority has not been granted, an AND circuit 12 in FIG. 358 responds to IRPT RST and to a signal on the NOT RCVY PRI line so as to generate a signal on an IRPT SET BLK IC & T1 which permits the setting of the BLK ICM latch in FIG. 208, and also permits the setting of the BLK T1M latch FIG. 203.

(14.2.2.2) SETTING THE INTERRUPTION CODE (FIG. 325, FIG. 329 AND FIG. 359 THROUGH FIG. 361)

Figure 334:
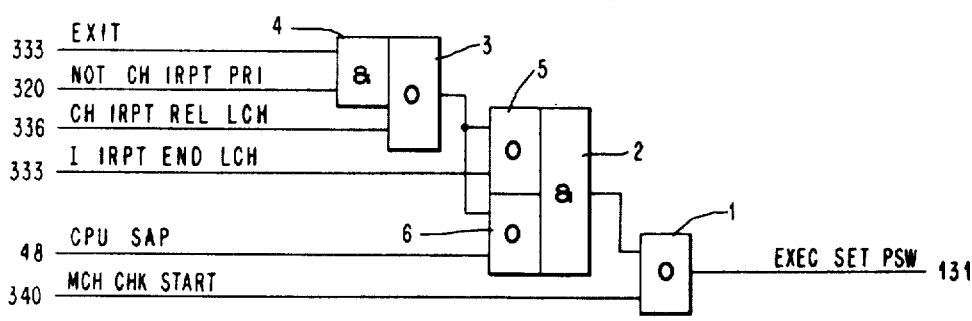

The setting of the interruption code into the PSW is timed as shown in the chart of Section 14.2.1.6. Specifically, the T1 SET PSW line in FIG. 329 and the T2 SET PSW line in FIG. 325 supply setting for bits 24–31, and the EXEC SET PSW line in FIG. 334 provides late setting for bits 24–31. Bits 16–23 of the interruption code are always set by IRPT RST which occurs at the turn on of interrupt cycle 1. Bits 24–31 are sometimes set at the turn on of interrupt cycle 1 (all except I IRPT FM U or CH IRPT) by the EXEC SET PSW.

In FIG. 334, a signal is generated on the EXEC SET PSW line by an OR circuit 1 in response to an AND circuit 2 or in response to a signal on the MCH CHK START line. The AND circuit 2 will operate in response to an OR circuit 3 when there is a signal on the CH IRPT REL LCH, or when there is an output from an AND circuit 4. The AND circuit 4 responds to EXIT together with a signal on a NOT CH IRPT PRI line so as to normally control the generation of the EXEC SET PSW signal. The AND circuit 4 is therefore the means whereby bits 24–31 are set into the PSW in all cases except channel interruptions, and I IRPT FM I interruptions (see the chart of Section 14.2.1.6). The OR circuit 3 responds to the signal on the CH IRPT REL LCH line in order to define the time when the channel has sent the response back to the CPU telling the CPU that the address of the particular unit which has caused the interruption is on the unit address bus in (UABI), and that therefore it is possible to put the unit address into PSW bits 24–31 as an interruption therefor, which occurs at the time of turning on interruption cycle 2 due to the fact that the CH IRPT REL LCH signal is utilized to turn on interrupt cycle 2 in FIG. 347.

A particular case of a storage address interruption being initiated by a store request which immediately preceded an I IRPT FM I interruption is handled by OR circuit 5, 6 in FIG. 334. In the event that a I IRPT FM I has been sensed, and a CPU SAP is received at the interruption controls, the CPU SAP interruption will be handled by the I IRPT END latch rather than by the EXIT latch since this will already have been initiated. In this particular case, the interruption code for CPU SAP will be set into the PSW by the EXEC SET PSW line at the time of the turn on of interrupt cycle 1 as a result of I IRPT END rather than as a result of EXIT. In such a case, bits 24–31 of the interruption code will already have been set for an I IRPT FM I (see the chart of Section 14.2.1.6), but the later setting of the interruption code at the turn on of interrupt cycle 1 will erase what had previously been set therein. Because of the fact that CPU SAP has ultimate priority over I IRPT FM I, interruption code bits 16–23 of the I IRPT FM I will not be set into the PSW at the turn on of interrupt cycle 1 whenever there is a CPU SAP following a I IRPT FM I. Thus, the combination of the timed interruption priority (as between I IRPT FM I) and all other interruptions, combined with the absolute priorities of all of the interruptions (CPU SAP being prior to I IRPT FM I) permits late interruptions of a higher priority from dislodging, or cancelling, previously sensed interruptions of a lower priority, even though the race as between the EXIT latch and the I IRPT END latch has been won by I IRPT END. This race takes place at a time which coincides with the CTRL L CYC and the I TO E XFER, due to the fact that EXIT, through IRPT RST, inhibits the setting of I IRPT END, and due to the fact that the I TO E XFER is about a half cycle later than CTRL L CYC.

The four signals which cause the setting of the interruption code are illustrated in FIG. 131 of application Ser. No. 609,238, which shows that IRPT RST is always used for setting bits 16–23 in that it causes an AND circuit 11 to force an OR circuit 1 to generate a UNLCH PSW 16–23, P line. (FIG. 56 of application Ser. No. 609,238 also illustrates that bits 24–31 of the interruption code are set by any one of the following lines: T2 SET PSW, T1 SET PSW, or EXEC SET PSW, by generating a signal on the UNLCH PSW 24–31, P line.) The actual setting of the interruption code into the PSW is shown in FIG. 134, where it is illustrated that bits 16–20 are not used as interruption control bits in the present architectural definition of a system in accordance with the description in said System/360 Manual. FIG. 134 of application Ser. No. 609,238 also illustrates that IRPT RST is utilized for setting channel identification bits into PSW bits 21–23 whenever CH IRPT PRI has been granted, due to the effect of a gating AND circuit 26.

The PSW register latch circuits shown in FIG. 134 are all connected as as to be reset and then immediately set provided that there is a proper input bit; otherwise, each latch will be reset and left in a reset condition in response to a corresponding UNLCH line. In the case of bits 21–23, the only time that other than 0 is to be set into these bits is in the case of a channel interruption, in which case a particular channel is identified by a proper encoding of the channel interrupt code bit on the CH IRPT CD 1, 2, 4 lines. Thus, for every type of interruption except a channel interruption, the UNLCH PSW 16–23, P line will provide for the resetting of the latches 3–5 in FIG. 134, and nothing will be set into those latches so that those latches will always be set to 0. The same, of course, is true for bits 16–20 of the PSW (shown at the top of FIG. 134) which are not actually used in the interruption code.

When there is a channel interruption, then the IRPT RST together with the CH IRPT PRI will cause the AND circuit 26 to gate the various channel interrupt code bits through corresponding AND circuits 20, 21, 22 so as to set related latches 3–5. Bits 24–31 of the interruption code are set by interrupt code input bits from FIG. 359 and FIG. 361. These are gated into the latches by the signal on the UNLCH PSW 24–31, P line, in response to either T1 SET PSW, T2 SET PSW, or EXEC SET PSW, as shown in FIG. 131. Any bit which is not present on one of the interrupt code lines will not cause the corresponding latch 6, 7 to again be set, so that that latch will represent a 0 in the interruption code of the PSW.

Note that only the channel identification information is placed in bits 21–23 of the interruption code, and that bits 24–31 of the interruption code are all supplied by the circuits of FIG. 359 and FIG. 361.

In FIG. 359, a plurality of OR circuits 1, 2 each generate bits representing interruption codes in response to various inputs. The OR circuits 1 are each responsive to three AND circuits 3–5 in response to SUP CALL PRI, CH IRPT PRI, or EXT IRPT PRI, respectively. Each of the OR circuits 2 also responds to an AND circuit 3–5, and also responds to an additional AND circuit 6 which relates to E PGM IRPT PRI, which when granted indicates any one of the E IRPT FM I type of interruption.

The generation of interruption code bits 24–28 is shown completely in FIG. 359 due to the fact that these bits can be set only by E IRPT FM I, EXT SIG, and CH IRPT types of interruptions. However, bits 29–31 are also utilized in establishing the interruption code for INV OP, PRIV OP, XEQ TO XEQ, INV ADR, and INV SPEC types of interruptions. Therefore, the bit 29–bit 31 output of FIG. 359 is combined in FIG. 361 with additional encoding signals from FIG. 360. The application of the encoding signals to FIG. 360 is such that the invalid operation, privileged operation, execute, invalid address, and specification type of interruptions will each generate a corresponding signal on the output of FIG. 360, whether the interruption be sensed at T1 or T2 (such as SPEC PRI). The output of FIG. 360 is combined with bits 29 through bits 31 and parity of the output of FIG. 359. This takes place in FIG. 361, which comprises merely a plurality of OR circuits 1, which recognize the output of FIG. 360, or any appropriate output from FIG. 359. The operation of the circuit of FIG. 359 through FIG. 361 is such as to effect the establishment of an interrupt code bit for each one as shown in the table of interruption codes in the following sections. Although not described elsewhere herein, certain of the inputs to FIG. 359 are shown in FIG. 322 and FIG. 323. These comprise signals on the SAP PRI and INV STR PRI lines as well as a signal on the SUP CALL PRI lines. If a signal appears on a CPU SAP line, there is automatically generated a signal on the SAP PRI line. This is due to the fact that whenever a storage address protection interruption occurs, it automatically has priority, since there could not possibly be a machine check (the system having been reset immediately before machine check) and there could not possibly be the need to load the PSW in an initial program loading operation (since the machine has not done anything prior to the loading of the IPL PSW). In FIG. 322, an AND circuit 1 will generate a signal on an INV STR PRI line provided there is no CPU SAP interruptions as indicated by a signal on a NOT CPU SAP line, and there is a signal on a CPU INV STR line. In FIG. 323, an AND circuit 2 will generate a signal on a SUP CALL PRI line provided that there is no other interruption, or other input to the interruption circuits. Specifically, the AND circuit 2 will respond only with signals present on the following lines: BD SUP CALL, NOT IRPT PRI 1–4, NOT IRPT PRI 5–10, NOT IC RCVY REQ, and NOT I PGM IRPT LCH. Other inputs to the circuits of FIG. 359 through FIG. 361 appear in FIG. 326 through FIG. 320 and FIG. 324 through FIG. 329.

(14.2.2.3) TABLE OF INTERRUPTION CODES

The interruption codes which are generated in FIG. 359 through FIG. 361 are characterized by certain particulars, including the fact that a machine check interruption will set the interruption code to all zeros, and E IRPT FM E will always set a 1 bit into bit 28 of the interruption code, the external interruptions set bits which comprise a single bit in one of the eight interruption code positions, the timer interruption being bit 24, the console interruption being bit 25, and the external signals 1–6 setting bits 26–31, respectively. In the case of a supervisor call instruction, the R1 and R2 fields are set into bits 24–27 and 28–31. When an IO interruption (CH IRPT) is involved, the unit address bus in supplies the address of a particular unit for the particular channel so that the eight bits 24–31 comprise an identification of the particular unit which has caused the interruption.

14.2.2.4 TABLE OF INTERRUPTION CODES

| PSW BITS | | | | | | | | INTERRUPTION | E | IRPT | FM | E |
|---|---|---|---|---|---|---|---|---|---|---|---|---|
| 24 | 25 | 26 | 27 | 28 | 29 | 30 | 31 | | | | | |
| 0 | 0 | 0 | 0 | 0 | 0 | 0 | 0 | Machine Check | | | | |
| 0 | 0 | 0 | 0 | 0 | 0 | 0 | 1 | Invalid Operation | | | | |
| 0 | 0 | 0 | 0 | 0 | 0 | 1 | 0 | Privileged Operation | | | | |
| 0 | 0 | 0 | 0 | 0 | 0 | 1 | 1 | Execute | | | | |
| 0 | 0 | 0 | 0 | 0 | 1 | 0 | 0 | STG ADR Protection | | | | |
| 0 | 0 | 0 | 0 | 0 | 1 | 0 | 1 | Invalid Address | | | | |
| 0 | 0 | 0 | 0 | 0 | 1 | 1 | 0 | Specification | | | | |
| 0 | 0 | 0 | 0 | 0 | 1 | 1 | 1 | Data | | | | |
| 0 | 0 | 0 | 0 | 1 | 0 | 0 | 0 | Fixed-Point Overflow | | x | | |
| 0 | 0 | 0 | 0 | 1 | 0 | 0 | 1 | Fixed-Point Divide | | x | | |
| 0 | 0 | 0 | 0 | 1 | 0 | 1 | 0 | Decimal Overflow | | x | | |
| 0 | 0 | 0 | 0 | 1 | 0 | 1 | 1 | Decimal Divide | | x | | |
| 0 | 0 | 0 | 0 | 1 | 1 | 0 | 0 | Exponent Overflow | | x | | |
| 0 | 0 | 0 | 0 | 1 | 1 | 0 | 1 | Exponent Underflow | | x | | |
| 0 | 0 | 0 | 0 | 1 | 1 | 1 | 0 | Significance | | x | | |
| 0 | 0 | 0 | 0 | 1 | 1 | 1 | 1 | Floating-Point Divide | | x | | |
| 1 | 0 | 0 | 0 | 0 | 0 | 0 | 0 | Timer | | | | |
| 0 | 1 | 0 | 0 | 0 | 0 | 0 | 0 | Console (IRPT KEY) | | | | |
| 0 | 0 | x | x | x | x | x | x | External Signals 1-6 | | | | |
| | | R1 | | | R2 | | | Supervisor Call | | | | |

Unit Address Bits 0—I/O

(14.2.3) PSW address generation (FIG. 330)

In FIG. 330 are shown circuits which generate address bits for storing the old PSW and for fetching the new PSW. Addresses which represent various interruptions, and the source of the initial PSW, as well as the time are shown in the following chart:

| IRPT TYPE | IRPT CTRL TO ADDRESS ADDER | | | | DEC ADR | PAR REQ | STR PSW | GT FTCH ADR TO AA | PSW | IRPT PRI |
|---|---|---|---|---|---|---|---|---|---|---|
| | 25 | 26 | 27 | 28 | | | | | | |
| IPL PSW | 0 | 0 | 0 | 0 | 0 | 1 | | X | NEW | 2 |
| EXT | 0 | 0 | 1 | 1 | 24 | 1 | X | | OLD | 6, 7, 8 |
| SVC | 0 | 1 | 0 | 0 | 32 | 0 | X | | OLD | 13 |
| PGM | 0 | 1 | 0 | 1 | 40 | 1 | X | | OLD | 5, 12 |
| MCH | 0 | 1 | 1 | 0 | 48 | 1 | X | | OLD | 1 |
| I/O | 0 | 1 | 1 | 1 | 56 | 0 | X | | OLD | 10 |
| TIMER | 1 | 0 | 1 | 0 | 80 | 1 | X | X | T | 9 |
| EXT | 1 | 0 | 1 | 1 | 88 | 0 | | X | NEW | 6, 7, 8 |
| SVC | 1 | 1 | 0 | 0 | 96 | 1 | | X | NEW | 13 |
| PGM | 1 | 1 | 0 | 1 | 104 | 0 | | X | NEW | 5, 12 |
| MCH | 1 | 1 | 1 | 0 | 112 | 0 | | X | NEW | 1 |
| I/O | 1 | 1 | 1 | 1 | 120 | 1 | | X | NEW | 10 |

T: Timer word=32 bits; all PSWS=64 bit storage words.

In FIG. 330, an OR circuit 1 provides a gating signal for bits 26–28 and the parity bit of the interruption address. This is operative during interrupt cycle 1 and during the store PSW portion of the interruption sequence due to signals on the IRPT CYC 1 LCH and STR PSW lines. Remove parity above bits 26–28 are gated by the output of the OR circuit by a corresponding AND circuits 2–4. Each of the AND circuits 2, 3, 4 provide an output signal on corresponding IRPT CTRL BITS lines as necessary in order to satisfy the conditions shown in the foregoing chart. For instance, the AND circuit 4 will generate bit 28 for external, program, or channel interruptions due to the presence of signals on the EXT IRPT PRI, PTM RIPT PRI, and CH IRPT PRI lines at the input of an OR circuit 5. In the preceding chart, it is seen that bit 28 is a 1 for external, program, and channel (I/O) interruptions, both when the new PSW is fetched and when the old PSW is stored. Similarly, an AND circuit 3 responds to an OR circuit 6 which generates bit 27 and responds to external, machine check, or channel interruptions, or in response to a timer advance request. The AND circuit 2 responds to an OR circuit 7 provided there is a program interruption which is indicated by an AND circuit 8. The AND circuit 8 responds to an OR circuit 9 which in turn responds to an AND circuit 10. The AND circuit 10 merely recognizes I program interruptions due to the elimination of interruptions having a priority of 1–11, in accordance with the chart in Section 14.2.1.1, and the OR circuit 9 also responds to E program interruptions and to interruptions having a priority between 1 and 4. However, the AND circuit 8 removes interruptions having a priority of 1 and 2 due to the presence of signals on a NOT MCH CHK IRPT and NOT IPL LCH lines. Thus, the output of the AND circuit 8 is equivalent to program interruptions priority, which together with supervisor call machine check or channel interruptions will cause bit 26 to be generated by the AND circuit 2. An AND circuit 11 at the top of FIG. 330 recognizes when PSWS are being fetched, with the exception of the IPL PSW, due to signals on the IRPT CYC 1 LCH and NOT IPL LCH lines. This provides a bit 25 for fetching the timer and for fetching all of the PSWS except the IPL PSWS in accordance with the foregoing chart.

At the bottom of FIG. 330, parity bit for bits 25–28 of the PSW address is generated by an OR circuit 12 in response to either one of two AND circuits 13, 14. Circuit 13 is operative during interrupt cycle 1 provided there is an output from an OR circuit 15 which in turn is responsive to an OR circuit 16. The OR circuit 16 responds to supervisor call parity or channel interrupt priority, and the OR circuit 16 is additionally responsive to a T1M advance request or to initial program loading. Thus a parity bit will be generated during cycle 1 for fetch address relating to IPL timer, supervisor call, and output operations.

Circuit 14 is operative during a storing of PSW in response to any interruption type operation except for the supervisor call and channel (I/O) interruptions due to the effect of an inverter 17 which responds to the OR circuit 16. A parity bit is provided for external, program, and machine check interrupts when the corresponding PSW is being stored as indicated by a signal on the STR PSW line. Note that the parity bit is not generated in FIG. 330 for the storing of the updated timer, due to the fact that a timer advance inhibits the setting of interrupt cycle 3 since control is transferred to the E unit at that time, and when the E unit is finished, the interruption controls is resumed with interrupt cycle 5. Setting of the address adder for storing the timer word remains he same as it was when the timer word was fetched, and so no new generation is required for the storing of the timer word.

At the bottom of FIG. 330, an AND circuit 18 provides a signal to cause the setting of the length code in the PSW to 00 whenever the storage address protection interruption occurs, due to the fact that it is impossible to tell whether the storage address protection results from a store instruction currently by an execute or a previous store instruction. This in turn results from the fact that E last cycle can be set (ending previous execution) as soon as a store request is accepted by the BCU even though the actual storage cycle may not commence for some time. Since the correct store instruction cannot be identified, the length is set to 00 to indicate that fact.

(14.2.4) Interruption cycles

The interruption cycles within the interruption fixed-sequence are characterized by the various functions which each of the cycles must perform. Interruption cycle 1 provides the address for fetching the PSW or the timer word; interruption cycle 2 provides an interruption fetch together with the setting of marks in anticipation of later storing of either the old PSW or the updated timer word; interruption cycle 3 automatically follows interruption cycle 2 unless a timer advance initial program loading is involved, and provides moving of the right half of the PSW through the incrementer to the K register high order half, cycle 3 goes off when an accept signal is received for the interruption fetch request; interruption cycle 4 generates a storage request and resets external signal latches as well as gating the left half of the PSW through the incrementer to the K register; during both interruption cycle 3 and interruption cycle 4, storage keys are inhibited to have a CPU SAP at this time; interruption cycle 5 comes on when an accept is received for the timer word or old PSW store request, and is utilized therefore as a means of recognizing the fetch request must have been previously received, since the storage unit first provides the new PSW and then must be available in order for the accept signal to cause the cycle 5 latch to be set. Interruption cycle 6 automatically follows interruption cycle 5.

The interrupt last cycle provides a means for leaving the interruption fixed-sequence, or entering into another interruption fixed-sequence in the event of an asynchronous interruption.

(14.2.4.1) INTERRUPTION CYCLE 1 (FIG. 346)

In FIG. 346, an OR circuit 1 recognizes the various conditions which can cause the setting of interrupt cycle 1. The OR circuit 1 is responsive to signals on the MCH CHK START and IE IPL START SEQ lines or in response to either one of two AND circuits, 5, 6, the AND circuit 5 being operated in other than recovery situations whenever the EXIT latch is turned on if there is no storage request. Outstanding from the CPU. This is effected by signals on the NOT RCVY PRI, EXIT, and NOT CPU COMM-BUSY lines. Similarly, an AND circuit 6 will operate when the latch is not on due to the effect of an inverter 7, in response to I IRPT END. The inverter 7 provides priority to the exit latch over the I IRPT END latch. The output of the OR circuit 1 can be gated through an AND circuit 2 at A time so as to cause an OR circuit 3 to set a latch 4. The output of the latch 4 is reflected in a bipolar latch 9 at not L time so as to generate a signal on the IRPT CYC 1 LCH line. The OR circuit 3 may also respond to an AND circuit 10 during scan operations due to signals on the J REG 24 and SCAN GT WD 5 line. The latch 4 is reset by an OR circuit 11 in response to a signal on the CPU RST, or in response to an AND circuit 12 so as to set a latch 4 to be turned off one cycle after it is turned on due to the presence of a signal on the IRPT CYC LCH line.

(14.2.4.2) INTERRUPTION CYCLE 2 (FIG. 347)

In FIG. 347, an OR circuit 3 will cause an AND circuit 4 to operate an OR circuit 5 so as to set a latch 6, the output of which is reflected in a bipolar latch 7 at not L time so as to generate a signal on the IRPT, CYC 2 LCH line. The OR circuit 3 is responsive to a signal on the CH IRPT REL LCH line, or to an AND circuit 8 which responds to a signal on the NOT CH IRPT RESP LCH and IRPT CYC 1 LCH lines. The OR circuit 3 and the AND circuit 8 differentiate between channel interruptions and other interruptions, due to the fact that in order for a channel interruption to be handled, it is necessary for the interruption control to signal the channel that the interruption has been accepted (granted priority) and a response must propagate from the CPU back to the channel; thereafter, the channel must indicate that it received the response by sending a release signal back to the CPU. This is controlled by the CH IRPT RESP and CH IRPT REL latches which are shown in FIG. 335 and FIG. 336, and described in the next two sections.

The OR circuit 5 may also respond to an AND circuit 9 during scanning operations when there are signals present on the J REG 25 and SCAN GT WD 5 lines. The latch 6 is reset by an OR circuit 10 in response to a signal on the CPU RST line, or in response to an AND circuit 11 if operated at A time by a signal on the AC line when there is an output from an AND circuit 1. The AND circuit 1 is responsive to an accept signal which indicates that the PSW fetch request has been accepted by the BCU, when interruption cycle 2 is on. This is effected by signals on the accept and IRPT CYC 2 LCH lines.

When interruption cycle 2 is set, an AND circuit 12 will generate an interruption fetch request by means of a signal on a IRPT FTCH REQ line provided there is also a signal from the OR circuit 3 (the same signal which causes the setting of the latch 6 in the first place). In other words, during scanning operations, the interruption fetch request will not be generated by the AND circuit 12 even though interruption cycle 2 is set. Another AND circuit 13 provides for turning on timer cycle 1 in the E unit by generating a signal on a TON TIM CYC 1 line in response to a signal on the TIM ADV REQ PRI line.

When the AND circuit 1 generates a signal for turning off the latch 6, it also generates a signal on the TOF IRPT CYC 2 line, which provides inputs to a plurality of AND circuits 14, 15, 2. The AND circuit 14 causes mark bits to be set for storing the higher order half of a storage word, and the AND circuit 15 provides for the setting of mark bits to permit storing of the low order half of a storage word. The AND circuits 14 and 15 are responsive to signals on the NOT IPL K line which indicates that the initial program loading operation is not involved and that therefore a storage operation will be involved. Additionally, the AND circuit 15 requires a signal on the NOT TIM ADV REQ PRI line so as to prevent the provision of mark bits for the low order half of the storage word during a timer advance operation; this is due to the fact that the timer word comprises 32 bits which include only the high order half of a storage word.

In the event that an initial program loading operation is involved, then the AND circuit 2 will cause the turning on of the IPL buffer which substitutes for interruption cycles 3 and 4 (they being storage cycles) and providing a time delay sufficient to assure the fetching of a PSW for initial program loading.

(14.2.4.3) CHANNEL INTERRUPTION RESPONSE AND RELEASE (FIG. 335 AND FIG. 336)

In FIG. 335, when the EXIT latch is turned on, an AND circuit 1 will recognize the situation of a channel interruption having been granted priority, and will cause an OR circuit 2 to set a latch 3, the output of which is reflected in the bipolar latch 4 at the start of not L time so as to generate a signal on a CH IRPT RESP LCH line. The OR circuit 2 is also responsive to scanning signals form an AND circuit 5 which is connected to J REG 26 and SCAN GT WD 5 lines. The latch 3 is reset by an OR circuit 6 in response to a signal on the CPU RST line, or in response to an AND circuit 7 which is operated at A time provided there is a signal on the CH IRPT REL LCH line. In other words, when EXIT is turned on as a result of a CH IRPT, the CH IRPT RESP latch is turned on; when the channel release signal is returned from the channel to the CPU, so that the CH IRPT REL latch is turned on, then the CH IRPT RESP latch will be turned off.

In FIG. 336, an AND circuit 1 senses a CH REL signal which is a signal from a channel indicating that it has received the response and that it is ready to proceed with the interruption. This signal causes the setting of a latch 2 at not B time, the output of which is applied to an AND circuit 3. The AND circuit 3 also requires inputs on a AC line, as well as signals indicating that the response latch has set but the release latch has not set on the NOT CH IRPT REL LCH and CH IRPT RESP LCH lines. The output of the AND circuit 3 is applied to an OR circuit 4 and is utilized to set a latch 5, the output of which causes a bipolar latch 6 to be set at not L time so as to generate the signal on the CH IRPT REL LCH line. The OR circuit 4 is also responsive to an AND circuit 7 which operates during scanning operations due to signals on the SCAN GT WD 5 and J REG 27 lines. The latch 5 is reset in FIG. 336 by an OR circuit 8 in response to a signal on the CPU RST line, or in response to an AND circuit 9 which is operative at A time due to a signal on a CH IRPT REL LCH line. In other words, as soon as the bipolar latch 6 in FIG. 336 has been set, a latch 5 will be reset at the following A time. Thus, the CH IRPT REL signal is available for only one cycle.

(14.2.4.4) INTERRUPTION CYCLE 3 (FIG. 348)

In FIG. 348, an AND circuit 1 causes another AND circuit 2 to operate an OR circuit 3 so as to set a latch 4 the output of which is reflected in a bipolar latch 5 at not L time so as to generate a signal on a IRPT CYC 3 LCH line. The OR circuit 3 is also operated by scanning signals due to the J REG 24 and SCAN GT WD 6 lines at the input to an AND circuit 6. The latch 4 is reset by an OR circuit 7 in response to a signal on a CPU RST line, or in response to an AND Circuit 8 which is operated at A time once the bipolar latch 5 has been set. Thus, interrupt cycle 3 will remain on for just one cycle.

The AND circuit 1 recognizes an accept signal from the BCU during interrupt cycle 2 when neither a timer advance nor an initial program loading operation are involved. This is due to signals on the ACCEPT, IRPT CYC 2 LCH, NOT TIM ADV REQ PRI and NOT IPL A lines. The signal on the IRPT CYC 3 LCH line is completely coincident with a signal on a STR PSW line, which causes the initiation of storage operations so as to store the old PSW in other than timer or initial program loading operations.

The IRPT CYC 3 LCH line is applied to an OR circuit 2 in FIG. 332 so as to inhibit the storage keys during store operation, whereby there would be no storage address protection check as a result of storing a PSW during an interruption.

(14.2.4.5) INTERRUPTION CYCLE 4 (FIG. 350)

In FIG. 350, an AND circuit 1 responds to a signal on the IRPT CYC 3 LCH line at A time so as to cause an OR circuit 2 to set a latch 3, the output of which is reflected in a bipolar latch 4 at not L time so as to generate the interruption cycle 4 signal on the IRPT CYC 4 LCH line. This line is utilized with an OR circuit 5 to generate a IRPT STR REQ signal, the other input to the OR circuit 5 being IRPT CYC 3. Interruption cycle 4 is also applied to an AND circuit 6 which recognizes the end of an external interruption at that point by generating a EXT IRPT END signal in response to a signal on the EXT IRPT PRI line. This causes the resetting of the external signal latches in FIG. 341.

The OR circuit 2 is also repsonsive to an AND circuit 7 during scan operations due to signals on the J REG 25 and SCAN GT WD 6 lines. The latch 3 is reset by an OR circuit 8 in response to a signal on the CPU RST line, or in response to an AND circuit 9. The AND circuit 9 recognizes an accept signal during A time of interruption cycle 4 due to signals on a AC, ACCEPT, and IRPT CYC 4 LCH lines. In other words, interruption cycle 4 will act until an accept signal is received from the BCU, and then will be turned off.

The same condition is recognized by an AND circuit 3 in FIG. 351, and causes the turning on of interruption cycle 5, as described in Section 14.2.4.6.

(14.2.4.6) INTERRUPTION CYCLE 5 (FIG. 351)

In FIG. 351, either one of two AND circuits 1, 3 can cause a pair of related OR circuits 2, 4 to generate identical signals on the TON IRPT CYC 5 and IRPT SET PSW lines. The output of the OR circuit 2 is applied to an AND circuit 5 so as to cause an OR circuit 6 to set a latch 7, the output of which is reflected in a bipolar latch 8 at not L time so as to generate a signal on the IRPT CYC 5 LCH and IRPT END RST lines. These lines are applied to an OR circuit 9 and, together with a SET PSW line, can cause the generation of a signal on a RST CH IRPT line. This line is utilized in the IE unit to reset the channel priority circuits FIG. 189, FIG. 215 and FIG. 217 (of application Ser. No. 609,238).

The OR circuit 6 can also be operated by an AND circuit 10 in response to scan signals present on the J REG 28 and SCAN GT WD 5 lines. The latch 7 is reset by an OR circuit 11 in response to a signal on the CPU RST line, or in response to an AND circuit 12 which causes the resetting of the latch 7 at the first A time following the turn on of the bipolar latch 8; this causes IRPT CYC 5 LCH to remain on for a single cycle only.

At the bottom of FIG. 351, an OR circuit 13 provides for the resetting of the J loaded circuitry in the E unit by providing for the generation of a I TOF J LD signal in FIG. 191 of application Ser. No. 609,238.

The turn on of interruption cycle 5 by the OR circuit 2 in FIG. 351 coincides with the operation of the OR circuit 4 therein, which provides for the setting of the PSW by generating a signal on the IRPT SET PSW line. The signal is also applied to an OR circuit 13 so as to provide for the IRPT RST J LOADED signal described hereinbefore.

(14.2.4.7) INTERRUPTION CYCLE 6 (FIG. 353)

In FIG. 353, the coincidence of A time and IRPT CYC 5 will cause an AND circuit 1 to operate an OR circuit 2 so as to set a latch 3 the output of which is reflected in a bipolar latch at the start of not L time so as to generate a signal on a IRPT CYC 6 LCH line. The OR circuit 2 can also respond to scan signals supplied on J REG 29 and SCAN GT WD 5 lines to an AND circuit 5. The latch 3 is reset by an OR circuit 6 in response to a signal on a CPU RST line, or by an AND circuit 7 at A time of IRPT CYC 6. In other words, interrupt cycle 6 appears at the end of a L time following an A time of cycle 5, and disappears at the end of L time following an A time in cycle 6. The latch is therefore on for one cycle.

(14.2.4.8) MISCELLANEOUS CIRCUITS (FIG. 332 AND FIG. 358)

In FIG. 332, and AND circuit 1 responds to an accept signal during a timer advance store provided that the machine is running as indicated by a NOT PSW 14 signal, thereby causing an OR circuit 3 to generate a signal on a IRPT TO RCVY 2 line. This is utilized to initiate an IC recovery in the IC fetch control circuits. Another input to the OR circuit 3 is an AND circuit 4 which responds when the machine is runing to interrupt cycle 4. In other words, by the time that the interruption fixed-sequence has reached cycle 4, it is anticipated that the PSW will be set for the turning on of cycle 5, and that a recovery so as to fetch instructions in accordance with the new PSW can be initiated at that time.

An OR circuit 2 inhibits the storage protection keys during a timer advance store, or during the regular interruption storage cycles 3 and 4.

An OR circuit 5 will cause the left half of the PSW to be passed through the incrementer to the K register during interrupt cycle 4, or when there is a signal on a IE GT LH PSW TO INCR line, the purpose of which is described in the IE sections herein.

An OR circuit 6 responds to either interrupt cycle 4 or interrupt cycle 5 to cause the gating of the incrementer extender error, which error would accompany the high order bits of either the left half or the right half of the PSW as it is seen passed through the incrementer to the K register. An OR circuit 7 responds to an interrupt cycle 3 or interrupt cycle 5 to cause the passage of a PSW to the incrementer.

Setting of the PSW can be in response to the power distribution unit, maintenance control changing of the instruction counter, interruptions, or I execution operations. Thus, an OR circuit 8 will cause the setting of PSW 0–39 in response to an AND circuit 9, or in response to interrupt or IE control over the PSW. An AND circuit 9 responds to the interrupt in IE controls, and additionally to an AND circuit 10. The AND circuit 10 will operate when the maintenance controls are setting an instruction counter, by causing the OR circuit 9 to generate a signal on the SET PSW 40–63. The manner in which the various PSW controls of FIG. 332 control the PSW are described in more detail in the PSW section.

(14.2.5) *Interrupt controls in IC fetch and sequence area*

In FIG. 233 of application Ser. No. 609,238, a signal is generated on a I IRPT BLK BCU line by an AND circuit 1 in response to I TO E XFER concurrently with I IRPT FM I. An AND circuit 2 responds to a pair of inverters 3, 4 so that when there is no I IRPT FM I nor any E IRPT FM I, the inverters 3, 4 will cause the AND circuit 2 to generate a signal on a NOT IRPT FM I line. Another AND circuit 5 is responsive to the inverter 4 and to a further inverter 6 so as to generate a signal on a NOT E IRPT line in response to the absence of signals on the E IRPT FM I and E IRPT FM E lines. These lines also operate an OR circuit 7 so as to cause an AND circuit 8 to generate a signal on a E IRPT BLK BCU line in response to a signal on a CTRL L CYC line. In other words, if there is an I IRPT M PT FM I at the I TO E XFER, or if there is an E IRPT FM E at the CTRL L CYC, then there will be a signal present at the input of an OR circuit 9 in FIG. 234 of application Ser. No. 609,238 on either an E IRPT BLK BCU or an I IRPT BLK BCU line. The OR circuit 9 is also responsive to IRPT RST, and to a signal on a IRPT BLK BCU REQ line which is generated by an AND circuit 13 in FIG. 358 in response to a concurrence of signals on the A IRPT and IRPT L CYC LCH lines. In other words, any one of three entrance routes into the interruption fixed-sequence, as well as interrupt reset, can cause the OR circuit 9 to operate an inverter 10, whereby there will be no signal on the NO IRPTS line. On the other hand, provided that none of the entrance conditions for interruptions have been met, there will of course also be no interrupt reset, so that the OR circuit 9 will have no signal and the inverter 10 will provide a signal on the NO IRPTS line, which signal is utilized in permitting the advancing of the sequence within the I unit.

Sections 15–22 are contained in the case relating to said environmental system, which is identified in Section 2 herein.

While the invention has been shown and described with respect to an illustrative embodiment thereof, it should be obvious to those skilled in the art that various changes and omissions in the form and detail thereof may be made therein without departing from the spirit and scope of the invention.

What is claimed is:

1. In a data processing system having a plurality of instruction control cycles and a plurality of instruction execution cycles, said control and execution cycles being selectable on various combinations, said system including an interruption sequence means for performing a variable set of functions in dependence upon the nature of an interruption of the operation of said system, an interruption entrance control device, comprising:

a plurality of means for sensing system conditions requiring interruption during at least one of said instruction control cycles, and a plurality of means for sensing conditions in said system during at least one of said instruction execution cycles requiring interruption of the operation of said system;

an instruction control cycle interruption registering means and an instruction execution cycle registering means responsive respectively to said instruction control sensing means and to said instruction execution sensing means;

an instruction interrupt entrance means and an execution interrupt entrance means settable by corresponding control and execution sensing and registering means aforesaid; and means responsive to either of said last named means for entering a related interruption sequence.

2. The device described in claim 1, additionally comprising:

means responsive to invalid storage operation and to said instruction interrupt entrance means for entering an interruption sequence of a type related to said execution interrupt entrance means.

3. The device described in claim 1, additionally comprising:

means for entering an interruption sequence notwithstanding the operation of one of said entrance means.

4. The device described in claim 2, additionally comprising:

means for entering an interruption sequence notwithstanding the operation of one of said entrance means.

5. The device described in claim 3, additionally comprising:

machine check means for entering said interruption sequence directly.

6. The device described in claim 4, additionally comprising:

machine check means for entering said interruption sequence directly.

7. The device described in claim 3, additionally comprising:

initial program starting means for entering said interruption directly.

8. The device described in claim 4, additionally comprising:

initial program starting means for entering said interruption directly.

9. In data processing system having a plurality of instruction control cycles and a plurality of instruction execution cycles, said control and execution cycles being selectable on various combinations, said system including a program status word, the content of some portion of which is to be established in the event of an interruption of the operation of said system, said program status word being replaceable by a different program status word in the event of an interruption, said establishing and replacing being done within a defined interruption fixed sequence of a variable nature, an interruption entrance control device, comprising:

a plurality of means for sensing system conditions requiring interruption during at least one of said instruction control cycles, and a plurality of means for sensing conditions in said system during at least one of said instruction execution cycles requiring interruption of the operation of said system;

an instruction control cycle interruption registering means and an instruction execution cycle registering means responsive respectively to said instruction control sensing means and to said instruction execution sensing means;

an instruction interrupt registering means and an execution interrupt registering means settable by corresponding control and execution sensing and registering means aforesaid; and means responsive to either of said last named means for entering an interruption sequence, said sequence causing the setting of a portion of said program status word and the replacement of said word, after setting, by a new program status word.

10. The device described in claim 9, additionally comprising:

means responsive to invalid storage operation and to said instruction interrupt entrance means for entering an interruption sequence of a type related to said execution interrupt entrance means.

11. The device described in claim 9, additionally comprising:
means for entering an interruption sequence notwithstanding the operation of one of said entrance means.

12. The device described in claim 10, additionally comprising:
means for entering an interruption sequence notwithstanding the operation of one of said entrance means.

13. The device described in claim 11, additionally comprising:
machine check means for entering said interruption sequence directly.

14. The device described in claim 12, additionally comprising:
machine check means for entering said interruption sequence directly.

15. The device described in claim 11, additionally comprising:
initial program starting means for entering said interruption directly.

16. The device described in claim 12, additionally comprising:
initial program starting means for entering said interruption directly.

References Cited

UNITED STATES PATENTS

| | | | |
|---|---|---|---|
| 3,293,610 | 12/1966 | Epperson | 340—172.5 |
| 3,309,672 | 3/1967 | Brun | 340—172.5 |

ROBERT C. BAILEY, *Primary Examiner.*

R. B. ZACHE, *Assistant Examiner.*